United States Patent
Kawakami et al.

(10) Patent No.: US 7,527,683 B2
(45) Date of Patent: May 5, 2009

(54) INK FOR INK-JET RECORDING, INK SET, AND INK-JET RECORDING METHOD

(75) Inventors: Hiroshi Kawakami, Shizuoka (JP); Kaoru Tojo, Shizuoka (JP); Toshiki Fujiwara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 10 days.

(21) Appl. No.: 11/442,175

(22) Filed: May 30, 2006

(65) Prior Publication Data

US 2006/0268086 A1   Nov. 30, 2006

(30) Foreign Application Priority Data

| May 27, 2005 | (JP) | ............ P.2005-156190 |
| Oct. 20, 2005 | (JP) | ............ P.2005-306412 |
| Feb. 28, 2006 | (JP) | ............ P.2006-053251 |

(51) Int. Cl.
*C09D 11/00* (2006.01)
*C09D 11/02* (2006.01)
*B41J 2/01* (2006.01)

(52) U.S. Cl. ............. 106/31.48; 106/31.43; 106/31.49; 106/31.58; 106/31.59; 347/100

(58) Field of Classification Search ............. 106/31.48, 106/31.59, 31.49, 31.43, 31.58; 347/100
See application file for complete search history.

(56) References Cited

U.S. PATENT DOCUMENTS

| 6,855,195 | B2 * | 2/2005 | Nishita et al. | 106/31.48 |
| 7,025,818 | B2 * | 4/2006 | Miyamoto et al. | 106/31.58 |
| 7,048,789 | B2 * | 5/2006 | Taguchi et al. | 106/31.43 |
| 7,077,894 | B2 * | 7/2006 | Taguchi et al. | 106/31.43 |
| 7,083,666 | B2 * | 8/2006 | Taguchi et al. | 106/31.43 |
| 7,108,743 | B2 * | 9/2006 | Fujiwara et al. | 106/31.48 |
| 7,109,336 | B2 * | 9/2006 | Fujiwara et al. | 544/324 |
| 2005/0057629 | A1 * | 3/2005 | Taguchi et al. | 347/100 |
| 2005/0178288 | A1 * | 8/2005 | Taguchi | 106/31.13 |
| 2006/0009357 | A1 * | 1/2006 | Fujiwara et al. | 503/227 |
| 2007/0176992 | A1 * | 8/2007 | Arai et al. | 347/100 |

FOREIGN PATENT DOCUMENTS

| EP | 1251154 A1 | 10/2002 |
| EP | 1508597 A1 | 2/2005 |
| JP | 2002-371079 A | 12/2002 |
| WO | WO 02/083662 A2 | 10/2002 |
| WO | WO 02/083795 A2 | 10/2002 |
| WO | WO 03-062330 A1 | 7/2003 |
| WO | WO 03/066756 | * 8/2003 |

* cited by examiner

*Primary Examiner*—Helene Klemanski
(74) *Attorney, Agent, or Firm*—Sughrue Mion, PLLC

(57) ABSTRACT

An ink for ink-jet recording includes: at least one of an azo dye having a specific structure; and at least one of a betaine surfactant and a nonionic surfactant, and an ink set includes the ink, and an ink-jet recording method used the ink.

18 Claims, No Drawings

INK FOR INK-JET RECORDING, INK SET, AND INK-JET RECORDING METHOD

BACKGROUND OF THE INVENTION

1. Field of the Invention

The present invention relates to an ink for ink-jet recording, an ink set containing the same, and a recoding method using the same. In particular, it relates to a magenta ink for ink-jet recording having excellent storage stability of a recorded image, having high image quality of hue, color density and the like, and also having excellent discharge stability of an ink.

2. Background Art

In recent years, with spread of computers, an ink-jet printer is widely utilized in not only offices, but households in order to print and/or draw on papers, films, cloths or the like.

An ink-jet recording method includes a method of discharging liquid droplets by applying pressure from a piezo element, a method of discharging liquid droplets by generating gas bubbles in an ink by heat, a method of using an ultrasonic wave, or a method of suction discharging liquid droplets by static force. An aqueous ink, an oily ink or a solid (melting type) ink is used as those inks for ink-jet recording.

Of those inks, the aqueous ink is relatively excellent in the point of possibility of achieving good balance of production/handling property/odor/safety, and the like, as compared with the oily ink or the solid (melting type) ink. Therefore, the aqueous ink is a mainstream of the current inks for ink-jet recording.

It is required for a dyestuff used in those inks for ink-jet recording that solubility in a solvent (ink medium) is high, high density recording is possible, hue is good, fastness properties to light, heat, air, water or chemicals are excellent, fixing property to an image receiving material is good, resulting in suppressed bleeding, storage stability as an ink is excellent, there is no toxicity, purity is high, and it can be available inexpensively. However, it is extremely difficult to seek for a dyestuff satisfying the above various requirements in high level. In particular, excellent hue and fastness properties conflict with each other in many cases. It is difficult for coloring materials for magenta ink to obtain materials satisfying the above requirements. In particular, it involves difficulty to find out the dyestuff satisfying both excellent magenta hue and light fastness durable to an oxidizing atmosphere.

Therefore, despite that various dyes and pigments for ink-jet are already proposed, and are put into practical use, it is the present situation that a dyestuff satisfying the above all requirements is not yet found.

In the conventionally well known dyes or pigments, to which color index (C.I.) number is assigned, it is difficult to achieve good balance between hue and fastness properties, required in an ink for ink-jet recording.

Azo dyes derived from an aromatic amine and a five-membered heterocyclic amine, described in JP-A-55-161856 (the term "JP-A" as used herein means an "unexamined published Japanese patent application") shown below are proposed as a dye improving fastness properties. However, those dyes have unfavorable hue in yellow and cyan regions, and therefore had the problem of deteriorating color reproducibility.

In JP-A-61-36362 and JP-A-2-212566, it is disclosed that an ink for ink-jet recording for the purpose of simultaneous pursuit of hue and light fastness properties. However, the dyestuff used in each Document is not sufficient in solubility in water where it is used as a water-soluble ink. Further, where the dyestuff described in each Document is used as a water-soluble ink for ink-jet, there is the problem in fastness properties to humidity and heat.

As a means for solving those problems, an improved magenta dyestuff and an ink using the same, described in JP-T-11-504958 (the term "JP-T" as used herein means a published Japanese translation of a PCT patent application) are proposed. However, those inks for ink-jet recording are insufficient in color reproducibility and fastness properties of output image.

Further, it was revealed that there is the case that in the case of recording an ink-jet-only glossy paper for a photographic picture quality and sticking the paper on a wall in a room, storage stability of the image quality markedly deteriorates. The present inventors presume that this phenomenon is due to any oxidizing gas in air, such as ozone. Further, the phenomenon is difficult to occur when air flow is shielded by the action of, for example, placing the paper in a glass-made frame. However, use conditions are restricted.

This phenomenon is particularly remarkable in an ink-jet-only glossy paper for photographic picture quality, and this was a great problem in the current ink-jet recording method in which photographic picture quality is one of the important characteristics.

To develop a dyestuff durable to an oxidizing gas such as ozone, the present inventors have broken away from the conventional couplers of phenol, naphthol, aniline or the like, and have reached the thought to use a nitrogen-containing heterocyclic compound as the coupler. It is found out that in the azo dyestuff comprising a pyrazole diazo component and a pyridine coupler, described in JP-A-2002-371079, WO 02/83662 A1, WO 02/83795 A1 and WO 2003/062330 A1 fastness properties are considerably improved, and it is found out that in the ink composition containing the azo dyestuff, described in Patent Document 8, ozone resistance and light resistance are considerably improved. However, those do not yet reach the sufficiently satisfactory level.

On the other hand, the above-described ink for ink-jet recording using a water-soluble dye has the above-described advantages, but is liable to bring about the disadvantage that bleeding is easy to cause in printed characters or images. In particular, bleeding markedly develops under high humidity conditions, and its resolution is demanded.

SUMMARY OF THE INVENTION

It is an object of the invention to provide a magenta ink for ink-jet recording having excellent weather resistance and also having suppressed bleeding of recorded images even under environmental conditions of high humidity. It is an another object of the invention to provide a magenta ink for ink-jet recording, wherein hue as a magenta ink is secured, discharge stability is high, and there is no defect in water resistance and image quality, desirably in addition to the above.

The present inventors have made detailed investigations on dyestuff derivatives having good hue and high fastness properties, and as a result, have found that the above object can be achieved by combining an azo dye having a specific dyestuff skeleton that has not conventionally been known, represented by the following general formula (I) with a specific surfactant, and using the same.

That is, the invention achieves the object by an ink for ink-jet recording, containing the azo dye described below and a specific surfactant in combination, its production method, and an ink-jet recording method using the ink.

1. An ink for ink-jet recording, comprising: at least one of azo dye represented by formula (1); and at least one of a betaine surfactant and a nonionic surfactant,

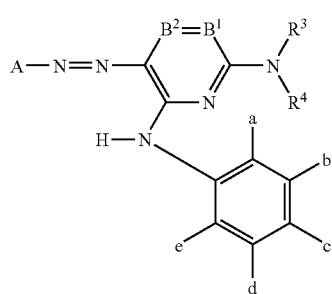

Formula (1)

wherein A represents a five-membered heterocyclic group; $B^1$ and $B^2$ each represent one of $-CR^1=$ and $-CR^2=$, or one of $B^1$ and $B^2$ represent nitrogen atom and other represents one of $-CR^1=$ and $-CR^2=$; $R^3$ and $R^4$ each independently represent one member selected from the group consisting of a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsufonyl group, and an sulfamoyl group; $R^1$ and $R^2$ each independently represent one member selected from the group consisting of a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group, and a heterocyclic thio group; $R^1$ and $R^2$ may be combined to form one of a five-membered ring and six-membered ring; $R^3$ and $R^4$ may be combined to form one of a five-membered ring and six-membered ring; a and e each independently represent one of an alkyl group, an alkoxy group and a halogen atom, and in case that both a and e are an alkyl group, the total number of carbon atoms constituting the alkyl group is 3 or more, and a and e may be further substituted; b, c and d each independently is the same as defined in $R^1$ and $R^2$, a and b may be condensed with each other to form a cyclic structure, and e and d may be condensed with each other to form a cyclic structure; the compound represented by the formula (1) has at least one ionic hydrophilic group.

2. The ink for ink-jet recording as described in the item 1, wherein the azo dye is represented by formula (2):

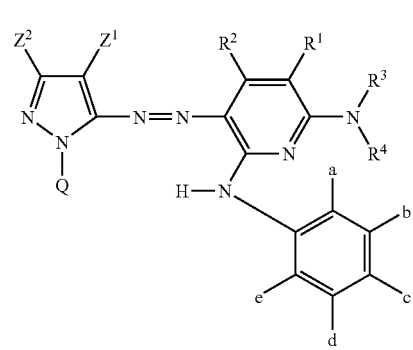

Formula (2)

wherein $Z^1$ represents an electron attractive group having a Hammett's substituent constant, $\sigma_p$ value, of 0.20 or more; $Z^2$ represents one member selected from the group consisting of a hydrogen atom, an aliphatic group, an aromatic group, and a heterocyclic group; $R^1$, $R^2$, $R^3$, $R^4$, a, b, c, d and e each are the same as defined in the formula (1); and Q represents one member selected from the group consisting of a hydrogen atom, an aliphatic group, an aromatic group, and a heterocyclic group; the compound of the formula (2) has at least one ionic hydrophilic group.

3. The ink for ink-jet recording as described in any one of the item 1 or 2, wherein the betaine surfactant comprises: a cationic site being a quaternary nitrogen atom; and an anionic site being one of a carboxyl group and a sulfo group.

4. The ink for ink-jet recording as described in any one of the items 1 to 3, wherein the betaine surfactant is one of a first compound having an imidazolium structure, the imidazolium structure substituted one of a carboxyl-containing alkyl group and a sulfo-containing alkyl group on N-position thereof; and a second compound having an ammonium structure, the ammonium structure substituted one of a carboxyl group-containing alkyl group and a sulfo group-containing alkyl group on N-position thereof.

5. The ink for ink-jet recording as described in the item 4, wherein the first compound is a compound represented by formula (A):

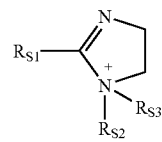

Formula (A)

wherein $R_{S1}$ and $R_{S2}$ each represent an alkyl group, and $R_{S3}$ represents one of a carboxyl-containing alkyl group and a sulfo-containing alkyl group.

6. The ink for ink-jet recording as described in the item 4, wherein the second compound is a compound represented by formula (B):

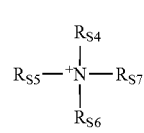

Formula (B)

wherein $R_{S4}$, $R_{S5}$ and $R_{S6}$ each independently represent one member selected from the group consisting of an alkyl group, an aryl group and a heterocyclic group, and may be connected with each other to form a cyclic structure; and $R_{S7}$ represents one of a carboxyl-containing alkyl group and a sulfo-containing alkyl group.

7. The ink for ink-jet recording as described in claim 6, wherein $R_{S4}$, $R_{S5}$ and $R_{S6}$ each independently represent an alkyl group, and $R_{s7}$ represents -L-COO— in which L represents a linking group.

8. The ink for ink-jet recording as described in the item 6 or 7, wherein L of substituent $R_{s7}$ represents $CH(R_{s8})$, and $R_{38}$ represents one of a hydrogen atom and an alkyl group having carbon atoms of 8 or more, and either of $R_{S4}$, $R_{S5}$, $R_{S6}$ and $R_{S8}$ is an alkyl group having carbon atoms of 8 or more.

9. The ink for ink-jet recording as described in the item 1 or 2, wherein the betaine surfactant comprises: at least one of a compound including carboxylic groups of two or more in one molecule thereof, and a salt of the compound.

10. The ink for ink-jet recording as described in the item 9, wherein the betaine surfactant is one member selected from the group consisting of an alkyliminodiacetic acid and a salt thereof, an alkylnitriletriacetic acid and a salt thereof, an alkylnitriletriacetic acid and a salt thereof, and an alkyliminotripropionic acid and a salt thereof.

11. The ink for ink-jet recording as described in the item 1 or 2, wherein the nonionic surfactant is a polyoxyethylene compound represented by one of formula (I) and (II):

Formula (I)

wherein $R^{21}$ represents an alkyl group having carbon atoms of 5 to 40, and $m_1$ represents an average addition mole number of ethylene oxide group, and the average addition mole number is from 2 to 40;

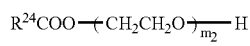

Formula (II)

wherein $R^{24}$ represents an alkyl group having carbon atoms of 5 to 40, and $m_2$ represents an average addition mole number of ethylene oxide group, and the average addition mole number is from 2 to 40.

12. The ink for ink-jet recording as described in the item 11, wherein the nonionic surfactant is a compound represented by formula (I-1):

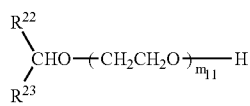

Formula (I-1)

wherein $R^{22}$ and $R^{23}$ each represent a saturated hydrocarbon having carbon atoms of 4 to 10, and the sum of carbon atoms of $R^{22}$ and $R^{23}$ is from 8 to 18, and $m_{11}$ represents an average addition mole number of ethylene oxide group, and the average addition mole number is from 3 to 20.

13. The ink for ink-jet recording as described in the item 11, wherein the nonionic surfactant is a compound represented by the following formula (II-1):

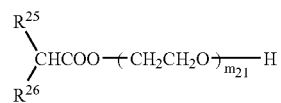

Formula (II-1)

wherein $R^{25}$ and $R^{26}$ each represent a saturated hydrocarbon having carbon atoms of 2 to 20, and $m_{21}$ represents an average addition mole number of ethylene oxide group, and the average addition mole number is from 2 to 40.

14. The ink for ink-jet recording as described in the item 1 or 2, wherein the nonionic surfactant is a compound represented by formula (III):

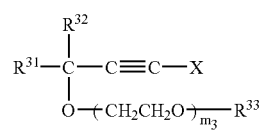

Formula (III)

wherein $R^{31}$ and $R^{32}$ each independently represent an alkyl group having carbon atoms of 1 to 18; $R^{33}$ represents one member selected from the group consisting of a hydrogen atom, an alkyl group having carbon atoms of 1 to 6, and a phenyl group; and X represents a hydrogen atom;

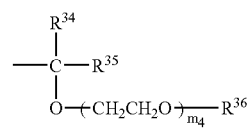

wherein $R^{34}$ and $R^{35}$ each independently represent an alkyl group having carbon atoms of 1 to 18; $R^{36}$ represents one member selected from the group consisting of a hydrogen atom, an alkyl group having carbon atoms of 1 to 6, and phenyl group; $m_3$ and $m_4$ each represent an average addition mole number of ethylene oxide group, and $m_3+m_4$ is from 0 to 100, with proviso that in case that $m_3$ is zero, $R^{33}$ represents a hydrogen atom, and in case that $m_4$ is zero, $R^{36}$ represents a hydrogen atom; and in case that X is a hydrogen atom, $m_3$ is from 0 to 100.

15. The ink for ink-jet recording as described in the item 14, wherein the nonionic surfactant is a compound represented by formula (III-1):

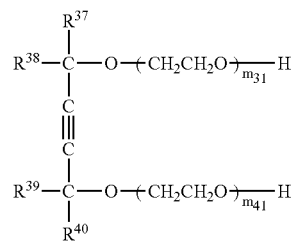

Formula (III-1)

wherein $R^{37}$, $R^{38}$, $R^{39}$ and $R^{40}$ each independently represents an alkyl group having carbon atoms of 1 to 6, and $m_{31}$ and $m_{41}$ each represent an average addition mole number of ethylene oxide group, and $m_{31}+m_{41}$ is from 0 to 40.

16. An ink-jet recoding method comprising discharging an ink for ink-jet recording as described in any one of the items 1 to 15.

17. An ink-jet recoding method comprising discharging a droplet of an ink for ink-jet recording as described in any one of the items 1 to 15 on a receiver material according to a recording signal, the receiver material comprising a support having an image-receiving layer, the image-receiving layer including a white inorganic pigment particle.

18. An ink set comprising an ink as described in any one of the items 1 to 15.

The ink for ink-jet recording of the invention containing a magenta dye represented by the formula (1) and a specific betaine and/or nonionic surfactant is that decomposition of an azo dye is suppressed to an environmental active gas (ozone and the like), thus being excellent in weatherability, and further, bleeding of recorded image is suppressed even under an environmental condition of high humidity. A magenta ink for ink-jet recording, wherein hue as a magenta ink is secured, discharge stability is high, and there is no defect in water resistance and image quality, desirably in addition to the above can be provided.

DETAILED DESCRIPTION OF THE INVENTION

Further, where the electroconductivity is adjusted by adding a salt or the like, it can be adjusted by adding various organic salts or inorganic salts.

Examples of the inorganic salt that can be used include inorganic compounds such as a potassium halide, a sodium halide, sodium sulfate, potassium sulfate, sodium hydrogensulfate, potassium hydrogensulfate, sodium nitrate, potassium nitrate, sodium hydroghencarbonate, potassium hydrogencarbonate, sodium phosphate, sodium monohydrogenphosphate, boric acid, potassium dihydrogenphosphate, and sodium dihydrogenphosphate, and organic compounds such as sodium acetate, potassium acetate, potassium tartrate, sodium tartrate, sodium benzoate, potassium benzoate, sodium p-tluenesulphonate, potassium saccharate, potassium phthalate, and sodium picolinate.

Further, the electroconductivity can be adjusted by selecting an aqueous medium components described hereinafter.

(Azo Dye)

In the azo dye (compound) represented by the general formula (1), A represents a five-membered heterocyclic group. Examples of a hetero atom in the five-membered heterocyclic group include N, O and S. Preferably, the five-membered heterocyclic group is a nitrogen-containing five-membered heterocyclic group, and an aliphatic ring, an aromatic ring or other heterocyclic ring may be condensed to the heterocyclic ring.

Examples of the preferable heterocyclic ring in the heterocyclic group represented by A include a pyrazole ring, an imidazole ring, a triazole ring, a thiazole ring, an isothiazole ring, a thiadiazole ring, a benzothiazole ring, a benzoxazole ring, and a benzoisothiazole ring. Each heterocyclic ring may further have a substituent. Of those, a pyrazole ring, an imidazole ring, an isothiazole ring, a thiadiazole ring, a benzothiazole ring and a triazole ring represented by the following formulae (a) to (g) are preferable.

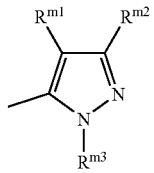

Formula (a)

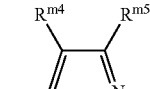

(b)

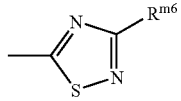

(c)

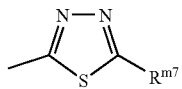

(d)

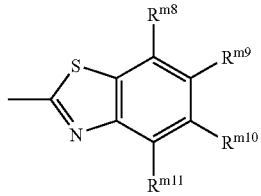

(e)

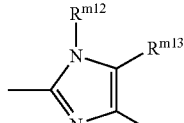

(f)

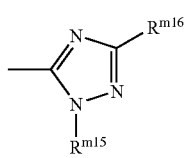

(g)

In the above general formulae (a) to (g), $R^{m1}$ to $Rm^{16}$ are the same as defined in $R^1$ or $R^2$ in the general formula (1).

$R^3$ and $R^4$ each independently represent a hydrogen atom, an aliphatic group (a substituted or unsubstituted alkyl group, a substituted or unsubstituted alkenyl group, a substituted or unsubstituted alkynyl group, and the like), an aromatic group (a substituted or unsubstituted phenyl group, a substituted or unsubstituted naphthyl group, and the like), a heterocyclic group, an acyl group, an alkoxycarbonyl group, an aryloxycarbonyl group, a carbamoyl group, a sulfonyl group (an alkylsulfonyl group and an arylsufonyl group), or a sulfamoyl group. Of those, a hydrogen atom, an alkyl group, a cycloalkyl group, an aralkyl group, an alkenyl group, an aryl group, a heterocyclic group, a sulfonyl group, an acyl group, and a carbamoyl group are preferable. Each substituent may further be substituted.

$B^1$ and $B^2$ represent —$CR^1$= and —$CR^2$=, respectively, or one of $B^1$ and $B^2$ represents a hydrogen atom, and other represents —$CR^1$= or —$CR^2$=. The case that $B^1$ and $B^2$ represent —$CR^1$= or —$CR^2$= is preferable from the point that further excellent performance can be exhibited.

$R^1$ and $R^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkyl- or arylsulfonylamino group, an aryloxycarbonylamino group, a nitro group, an alkyl- or arylthio group, an alkyl- or arylsulfonyl group, an alkyl- or arylsulfinyl group, a sulfamoyl group, a sulfo group, or a heterocyclic thio group. Each group may further be substituted. $R^1$ and $R^2$, or $R^3$ and $R^4$ may be combined to form a five- or six-membered ring.

a and e each independently represent an alkyl group, an alkoxy group, or a halogen atoms, and when a and e are simultaneously an alkyl group, the total number of carbon atoms constituting the alkyl moiety is 3 or more, and those may be further substituted. b, c and d each independently are the same as defined in $R^1$ and $R^2$, and a and b may be condensed with each other, and e and d may be condensed with each other. However, the compound of the general formula (1) has at least one ionic hydrophilic group.

In the invention, of the compound represented by the general formula (1), the compound represented by the general formula (2) is preferable.

In the general formula (2), $Z^1$ represents an electron attractive group having a Hammett's substituent constant, $\sigma_p$ value, of 0.20 or more.

The electron attractive group of $Z^1$ is an electron attractive group having a Hammett's substituent constant, $\sigma_p$ value, of 0.20 or more, and preferably 0.30 or more. The upper limit of the $\sigma_p$ value is preferably 1.0 or lower.

Example of the electron attractive group having the $\sigma_p$ value of 0.20 or more include an acyl group, an acyloxy group, a carbamoyl group, an alkyloxycarbonyl group, an aryloxycarbonyl group, a cyano group, a nitro group, a dialkylphosphono group, diarylphosphono group, diarylphosphinyl group, an alkylsulfinyl group, an arylsulfinyl group, an alkylsulfonyl group, an arylsulfonyl group, sulphonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, a heterocyclic group, a halogen atom, an azo group, a selenocyanate group, and an aryl group substituted with other attractive group having the $\sigma_p$ value of 0.20 or more. $Z^1$ is preferably a cyano group, a nitro group or a halogen atom. A halogen atom or a cyano group is more preferable, and a cyano group is most preferable.

$Z^2$ represents a hydrogen atom, an aliphatic group, an aromatic group or a heterocyclic group. $Z^2$ is preferably a hydrogen atom, an alkyl group, a cycloalkyl group, an aralkyl group, an aryl group, a heterocyclic group, an acyl group, an alkenyl group, or a sulfonyl group. An alkyl group is more preferable. Each substituent may further be substituted.

The alkyl group include alkyl groups having substituents, and unsubstituted alkyl groups. The alkyl group is preferably an alkyl group having from 1 to 12 carbon atoms excluding carbon atoms in the substituent, and more preferably an alkyl group having from 1 to 6 carbon atoms. Examples of the substituent include a hydroxyl group, an alkoxy group, a cyano group, a halogen atom, and an ionic hydrophilic group.

Examples of the alkyl group include a methyl group, an ethyl group, a butyl group, an isopropyl group, a t-butyl group, a hydroxyethyl group, a methoxy group, a cyanoethyl group, a trifluoromethyl group, 3-sulfopropyl group and 4-sulfobutyl group.

The cycloalkyl group includes a cycloalkyl group having substituents and unsubstituted cycloalkyl groups. The cycloalkyl group is preferably a cycloalkyl group having from 5 to 12 carbon atoms excluding carbon atoms in the substituent. Example of the substituent includes an ionic hydrophilic group. Example of the cycloalkyl group includes a cyclohexyl group.

The aralkyl group includes an aralkyl group having substituents and unsubstituted aralkyl groups. The aralkyl group is preferably an aralkyl group having from 7 to 12 carbon atoms excluding carbon atoms in the substituent. Example of the substituent includes an ionic hydrophilic group. Examples of the aralkyl group include a benzyl group and a 2-phenethyl group.

The aryl group includes an aryl group having substituents and unsubstituted aryl groups. The aryl group is preferably an aryl group having from 6 to 12 carbon atoms excluding carbon atoms in the substituent. Examples of the substituent include an alkyl group, an alkoxy group, a halogen atom, an alkylamino group, an amide group, a carbamoyl group, a sulfamoyl group, a sulfonamide group, a hydroxyl group, an ester group, and an ionic hydrophilic group. Examples of the aryl group include a phenyl group, a p-tolyl group, a p-methoxyphenyl group, an o-chlorophenyl group, and a m-(3-sulfopropylamino)phenyl group.

The heterocyclic group includes heterocyclic groups having substituents and unsubstituted heterocyclic groups. The heterocyclic group is preferably a five-membered or six-membered heterocyclic group. Examples of the substituent include an amide group, a carbamoyl group, a sulfamoyl group, a sulfonamide group, a hydroxyl group, an ester group and an inonic hydrophilic group. Examples of the heterocyclic group include a 2-pyridyl group, a 2-thenyl group, a 2-thoazolyl group, a 2-benzothiazolyl group and a 2-furil group.

The acyl group includes acyl groups having substituents and unsubstituted acyl groups. The acyl group is preferably an acyl group having from 1 to 12 carbon atoms excluding carbon atoms in the substituent. Example of the substituent includes an ionic hydrophilic group. Examples of the acyl group include an acetyl group and a benzoyl group.

The alkenyl group includes alkenyl groups having substituents and unsubstituted alkenyl groups. The alkenyl group is preferably an alkenyl group having from 5 to 12 carbon atoms excluding carbon atoms in the substituent. Example of the substituent includes an ionic hydrophilic group. Examples of the alkenyl group include a vinyl group and an allyl group.

The sulfonyl group includes an alkylsulfonyl group such as a methanesulfonyl group, and an arylsulfonyl group such as a phenylsulfonyl group.

However, $R^3$ and $R^4$ are not simultaneously a hydrogen atom.

Q represents a hydrogen atom, an aliphatic group, or a heterocyclic group. Q is preferably an alkyl group, a cycloalkyl group, an aralkyl group, an alkenyl group, an aryl group, or a heterocyclic group. Those substituents each may further be substituted. The details of those substituents are the same as defined in $R^1$ and $R^2$ above.

Q is preferably an aryl group or a heterocyclic group, substituted with an electron attractive group.

The Hammett's substituent constant, $\sigma_p$ value, used herein is described below.

Hammett's rule is an empirical rule advocated by L. P. Hammett in 1935 in order to quantitatively address the influence of a substituent affecting reaction or equilibrium of benzene derivatives, and today, the validity of the rule is widely admitted. There are $\sigma_p$ value and $\sigma_m$ value for the substituent constant required in the Hammett's rule, and those values can be found in many general literatures, and are described in detail in, for example, J. A. Dean, *Lange's Handbook of Chemistry*, Vol. 12, 1979 (McGraw-Hill), and *Region of Chemistry*, Extra Edition, 122, pp. 96-103, 1979 (Nankodo). In the invention, each substituent is limited or explained by Hammett's substituent constant $\sigma_p$, but this does not mean that the known value shown in the above-described literatures is limited to only a certain substituent, but it should be understood that even if the value is not known in literatures, it contains substituents which will be included in a range in the case of measuring based on the Hammett's rule.

The electron attractive group of Q is an electron attractive group having the Hammett's substituent constant, $\sigma_p$ value, of 0.20 or more, and preferably 0.30 or more. The upper limit of the $\sigma_p$ value is preferably 1.0 or lower.

Examples of the electron attractive group having the $\sigma_p$ value of 0.20 or more include an acyl group, an acyloxy group, a carbamoyl group, an alkyloxycarbonyl group, an aryloxycarbonyl group, a cyano group, a nitro group, a dialkylphosphono group, diarylphosphono group, diarylphosphinyl group, an alkylsulfinyl group, an arylsulfinyl group, an alkylsulfonyl group, an arylsulfonyl group, sulphonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, a heterocyclic group, a halogen atom, an azo group, a selenocyanate group, and an aryl group substituted with other attractive group having the $\sigma_p$ value of 0.20 or more. Q is preferably a cyano group, a nitro group or a halogen atom. The heterocyclic group may not be substituted with the electron attractive group.

$R^1$ to $R^4$, a, b, c, d and e are the same as defined regarding $R^1$ to $R^4$, a, b, c, d and e of the general formula (1).

Regarding the general formula (1), preferable examples of the combination of the substituents are shown below. The preferable combinations are the case that A is a pyrazole ring, an imidazole ring, an isothiazole ring, a thiadiazole ring, or a benzothiazole ring (of those, preferably a pyrazole ring), $B^1$ is, an unsubstituted carbon atom, $B^2$ is an unsubstituted or alkyl-substituted carbon atom, $R^3$ and $R^4$ are a hydrogen atom, an alkyl group, an aralkyl group, an aryl group, a heterocyclic group, a sulfonyl group, or an acyl group, a and e are an alkyl group or a halogen atom, when a and e are simultaneously an alkyl group, the alkyl group is an unsubstituted alkyl group, the total of the number of carbon atoms of a and e is 3 or more (preferably 5 or less), and a, b, c, and d each are a hydrogen atom, a halogen atom, an alkyl group, or an ionic hydrophilic group (preferably each being a hydrogen atom, an alkyl group having 1 to 4 carbon atoms or an ionic hydrophilic group).

In the general formula (1), the case of the general formula is most preferable.

In $Z^1$, a cyano group is most preferable.

In $Z^2$, an alkyl group or an aryl group is most preferable. Further, of the alkyl groups, an alkyl group having from 3 to 4 carbon atoms (preferably, an isopropyl group or a t-butyl group) is preferable. In the aryl group, a phenyl group and a phenyl group having further substituent at any one of 2-position, 4-position or 6-position counted from the pyrazole mother nucleus side are preferable.

Regarding the general formula (2), preferable examples of the substituents are shown below. The preferable combinations are the case that $Z^1$ is a cyano group; $Z^2$ is an isopropyl group, a t-butyl group or a phenyl group (preferably a t-butyl group); $R^1$ is a hydrogen atom; $R^2$ is a hydrogen atom or an alkyl group having 1 to 4 carbon atoms (preferably a methyl group); $R^3$ and $R^4$ each are a hydrogen atom, an alkyl group, an aralkyl group, an aryl group, a heterocyclic group, a sulfonyl group, or an acyl group, preferably a hydrogen atom, a heterocyclic group (preferably a benzoxazole ring, a benzothizole ring (preferably an unsubstituted or sulfo-substituted benzothiazole ring)), or an alkyl- and/or sulfo-substituted phenyl group; a and e each are an alkyl group, and a+e is an alkyl group having 3 or more (preferably 5 or less) carbon atoms, which may be substituted, preferably an unsubstituted alkyl group having 4 or more and 5 or less carbon atoms; b, c and d each are a hydrogen atom, a halogen atom, an alkyl group, an ionic hydrophilic group (preferably each being a hydrogen atom, an alkyl group having 1 to 4 carbon atoms, or a sulfo group); and Q is a heterocyclic group (preferably a benzoxazole ring, a benzothizole ring (preferably a sulfamoyl- or sulfo-substituted benzoxazole ring or benzothiazole ring)).

The azo dye represented by the general formula (1) and the general formula (2) has at least one (preferably 3 or more and 6 or less) ionic hydrophilic group in the molecule. The ionic hydrophilic group includes a sulfo group, a carboxyl group, phosphono group, a quaternary ammonium group and the like. As the ionic hydrophilic group, a carboxyl group, a phosphono group and a sulfo group are preferable, and of those, a carboxyl group and a sulfo group are preferable. In particular, it is most preferable that at least one is a sulfo group. A carboxyl group, a phosphono group and a sulfo group may be in a form of a salt, and examples of a counter ion forming the salt include an ammonium ion (for example, lithium ion, sodium ion or potassium ion) and an organic cation (for example, tetramethylammonium ion or tetramethylguanidium ion or tetramethylphosphonium ion). Of those counter ions, an alkali metal ion is preferable.

It is preferable that the azo dye has 3 or more and 6 or less ionic hydrophilic groups in the molecule. It is more preferable to have 3 or more and 6 or less sulfo groups, and it is further preferable to have 3 or more and 5 or less sulfo groups.

(Production Method of Azo Dye)

The azo dye represented by the general formula (1) is obtained by any one of the following methods 1 and/or 2.

The method 1 is a method including the following steps:

(a) a step of reacting aminopyrazole and a diazotizing agent to form a diazonium salt;

(b) a step of reacting the diazonium salt formed in the above step (a) with a coupling agent to form a compound having a substituent introduced therein, and a step of reacting the compound formed in the above step (b) with an alkylating agent, an arylating agent or a heterylating agent to form the general formula (1) precursor.

In the method 1, it is preferable to use a dilute hydrochloric acid aqueous solution of sodium nitrite as the diazotizing agent used in step (a). Further, isopentyl nitrite and nitrosylsulfuric acid can be used as the diazotizing agent. As the coupling agent used in step (b), it is most preferable to use a nitrogen-containing six-membered heterocyclic coupler. As a base used together with the alkylating agent, the arylating agent or the heterylating agent in step (b), there can be mentioned organic salt bases such as diisopropylethyl amine, and inorganic base salts such as potassium carbonate, sodium carbonate, sodium hydrogencarbonate, potassium hydrogencarbonate, sodium hydroxide and potassium hydroxide.

Method 2 is a method including a step of introducing a water-soluble group into the general formula (1) precursor by an electrophilic reaction. The electrophilic reaction is preferably a method described in detail below.

The electrophilic reaction in the method 2 includes sulfonation, Mannich reaction and Friedel-Crafts reaction. Of those, sulfonation is preferable.

As the method of sulfonating the general formula (1) precursor, the precursor can be sulfonated using a sulfonating agent such as concentrated sulfuric acid, fuming sulfuric acid of from 10% to 60%, chlorosulfonic acid, sulfur trioxide and amidosulfuric acid. Further, a solvent may be used, and acetic acid, acetic anhydride, sulfolane, ethyl acetate, ether, carbon tetrachloride, acetonitrile and the like may be used as the solvent.

In the general formula (1) precursor, it is preferable that $R^3$, $R^4$ and b (d), c are sulfonated. Where the substituents of $R^3$, $R^4$ and b (d), c have plural reaction points to be sulfonated, a sulfonated dye having different substitution position may be contained. In this case, the sulfonated dye having different substitution position may be contained to the mainly sulfonated dye in a range of from 0.1 to 20% in terms of HPLC area %. The reaction temperature is desirably from 15 to 80° C., and more desirably in a range of from 10 to 70° C. The reaction time is desirably from 30 minutes to 10 hours, and more desirably between 1 hour and 6 hours.

In the production method of the general formula (1) precursor, as the deoxygenation condition it is desirable to produce by filling the reaction system with an inert gas such as nitrogen or argon, and further it is preferable to conduct bubbling in the reaction liquid with those inert gases.

Aminopyrazol that is the starting material used in step (a) of the method 1 can be synthesized by the method described in, for example, U.S. Pat. No. 3,336,285, *Heterocycles*, vol. 20, p 519 (1983) and JP-B-6-19036.

The pyridine coupler (coupling agent) which is the starting material used in step (b) of the method 1 can be synthesized by the method described in, for example, JP-A-51-83631, JP-A-49-74718, and JP-B-52-46230.

Specific examples of the azo dye used in the ink for ink-jet recording of the invention are described below, but it should be understood that the invention is not construed as being limited thereto.

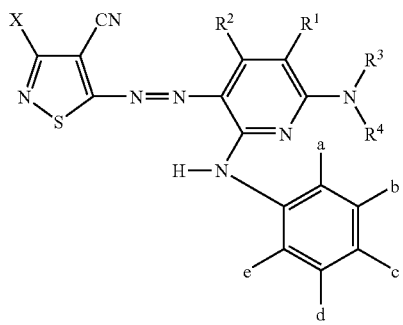

| Compound | X | $R^1$ | $R^2$ | $R^3$ | $R^4$ | a | b | c | d | e |
|---|---|---|---|---|---|---|---|---|---|---|
| a-1 | $CH_3$ | CN | $CH_3$ | H | 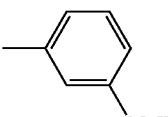 | $CH_3$ | H | $SO_3H$ | H | $C_2H_5$ |
| a-2 | " | $CONH_2$ | H | " | 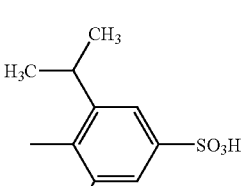 | iPr | " | " | " | iPr |
| a-3 | " | H | $CH_3$ | 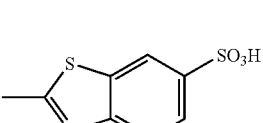 | " | " | " | " | " | " |

-continued
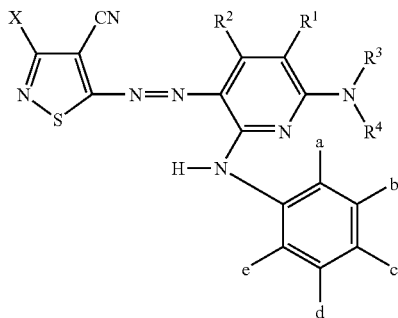
| Compound | X | R¹ | R² | R³ | R⁴ | a | b | c | d | e |
|---|---|---|---|---|---|---|---|---|---|---|
| a-4 | " | " | " | " | ![C₂H₅, C₂H₅, SO₃H substituted phenyl] | C₂H₅ | " | " | " | C₂H₅ |
| a-5 | " | " | " | " | ![C₂H₅, CH₃, C₂H₅, SO₃H substituted phenyl] | " | " | CH₃ | SO₃H | " |
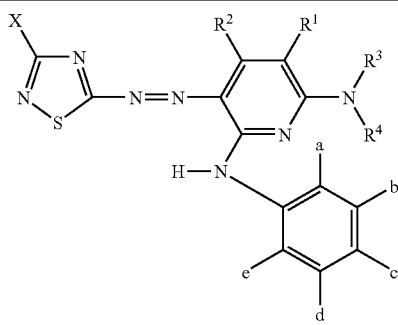
| Compound | X | R¹ | R² | R³ | R⁴ | a | b | c | d | e |
|---|---|---|---|---|---|---|---|---|---|---|
| b-1 | —SCH₃ | CN | CH₃ | H | ![3-SO₃H phenyl] | CH₃ | H | SO₃H | H | C₂H₅ |
| b-2 | —S—CH₂CH₂SO₃HCONH₂ | H | " | " | ![3,5-diisopropyl-4-SO₃H phenyl] | iPr | " | " | " | iPr |

-continued
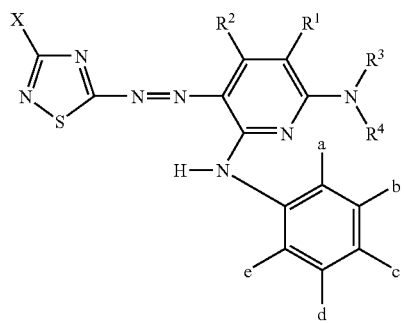
| Compound | X | R¹ | R² | R³ | R⁴ | a | b | c | d | e |
|---|---|---|---|---|---|---|---|---|---|---|
| b-3 | ![m-toluenesulfonic] (3-methylphenyl-SO₃H) | H | CH₃ | 2-methylbenzothiazole-6-SO₃H | " | " | " | " | " | " |
| b-4 | CH₃-S-CH₂CH₂-SO₃H | " | " | " | 3,5-diethyl-4-methylphenyl-SO₃H | C₂H₅ | " | " | " | C₂H₅ |
| b-5 | —SCH₃ | " | " | " | 2,4-diethyl-3,6-dimethylphenyl-SO₃H | C₂H₅ | " | CH₃ | SO₃H | " |
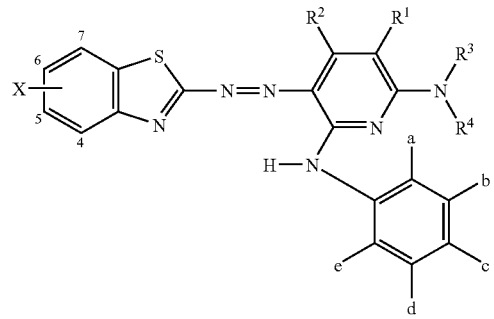
| Compound | X | R¹ | R² | R³ | R⁴ | a | b | c | d | e |
|---|---|---|---|---|---|---|---|---|---|---|
| c-1 | 5-Cl | CN | CH₃ | H | 3-sulfophenyl-CH₃ | CH₃ | H | SO₃H | H | C₂H₅ |

-continued
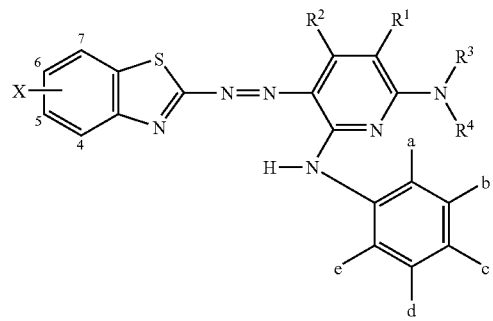
| Compound | X | R¹ | R² | R³ | R⁴ | a | b | c | d | e |
|---|---|---|---|---|---|---|---|---|---|---|
| c-2 | 5, 6-diCl | $CONH_2$ | H | " | 3,5-diisopropyl-4-methylphenylsulfonic acid | iPr | " | " | " | iPr |
| c-3 | 5-$CH_3$ | H | $CH_3$ | 2-methylbenzothiazole-6-sulfonic acid | " | " | " | " | " | " |
| c-4 | 6-Cl | " | " | " | 3,5-diethyl-4-methylphenylsulfonic acid | $C_2H_5$ | " | " | " | $C_2H_5$ |
| c-5 | 5, 6-diCl | " | " | " | 3,5-diethyl-2-methyl-6-sulfophenyl | " | " | $CH_3$ | $SO_3H$ | " |

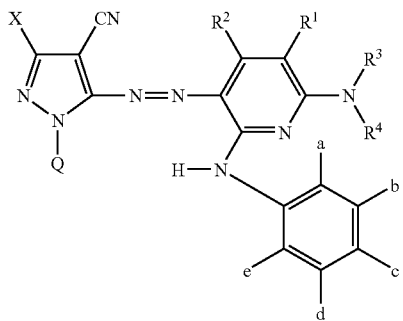

| Compound | X | Q | R¹ | R² | R³ |
|---|---|---|---|---|---|
| d-1 | phenyl (—C₆H₅) | 2-methylbenzothiazole-6-SO₃H | CN | CH₃ | H |
| d-2 | t-Bu | " | CONH₂ | H | " |
| d-3 | " | " | H | CH₃ | 2-methylbenzothiazole-6-SO₃H |
| d-4 | " | " | " | " | " |
| d-5 | " | " | " | " | " |
| d-6 | t-Bu | 2-methylbenzothiazole-6-SO₃H | H | CH₃ | 2-methylbenzothiazole-6-SO₃H |
| d-7 | " | " | " | " | " |
| d-8 | " | " | " | " | " |
| d-9 | " | 2-methylbenzothiazole-6-SO₂NH-(3,5-dicarboxyphenyl) | " | " | 2-methylbenzothiazole-6-SO₂NH-(3,5-dicarboxyphenyl) |
| d-10 | " | " | " | " | " |

| Compound | R⁴ | a | b | c | d | e |
|---|---|---|---|---|---|---|
| d-1 | 4-methylphenyl-SO₃H (p-tolyl sulfonic acid) | CH₃ | H | SO₃H | H | C₂H₃ |
| d-2 | 3,5-diisopropyl-4-methylphenyl-SO₃H | iPr | " | " | " | iPr |
| d-3 | " | " | " | " | " | " |
| d-4 | 2-methylbenzothiazole-6-SO₃H | C₂H₃ | " | " | " | C₂H₃ |

-continued
| | | | | | | | |
|---|---|---|---|---|---|---|---|
| d-5 | 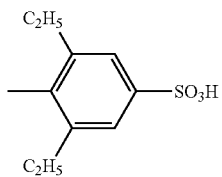 | " | " | CH₃ | SO₃H | " | |
| d-6 | 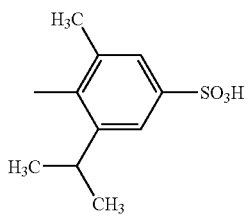 | CH₃ | H | SO₃H | H | iPr | |
| d-7 | 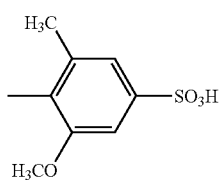 | " | " | " | " | OCH₃ | |
| d-8 | 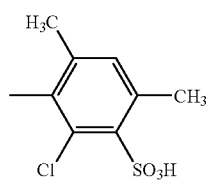 | " | " | CH₃ | SO₃H | Cl | |
| d-9 | 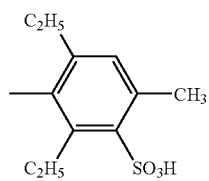 | C₂H₅ | " | " | " | C₂H₅ | |
| d-10 | 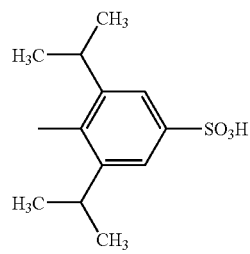 | iPr | " | SO₃H | " | iPr | |

-continued

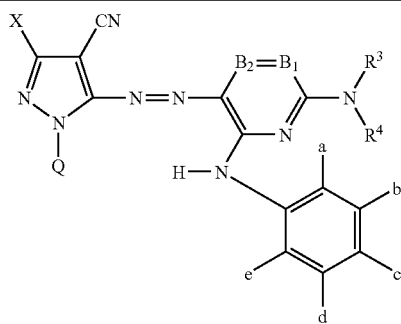

| Compound | Q | B₁ | B₂ | R³ |
|---|---|---|---|---|
| d-11 | 2-methylbenzoxazole-6-SO₃H | N | C—CH₃ | H |
| d-12 | 2-methylbenzothiazole-6-SO₃H | " | C—NHCOCH₃ | " |
| d-13 | " | C—H | N | " |
| d-14 | 2-methylbenzothiazole-6-SO₂NH-(3,5-dicarboxyphenyl) | C—H | N | 2-methylbenzothiazole-6-SO₃H |
| d-15 | " | N | C—NHCOCH₃ | " |

| Compound | R⁴ | a | b | c | d | e |
|---|---|---|---|---|---|---|
| d-11 | 3,5-diethyl-2,6-dimethyl-4-SO₃H-phenyl | C₂H₅ | H | CH₃ | SO₃H | C₂H₅ |
| d-12 | " | " | " | " | " | " |
| d-13 | 3,5-diisopropyl-4-methyl-SO₃H-phenyl | iPr | " | SO₃H | H | iPr |
| d-14 | 3-ethyl-4,5-dimethyl-SO₃H-phenyl | CH₃ | " | " | " | C₂H₅ |
| d-15 | " | " | " | " | " | " |

-continued

| Compound | X | Q | R¹ | R² | R³ | R⁴ |
|---|---|---|---|---|---|---|
| d-16 | t-Bu | 2-methylbenzothiazole-5-SO₃H | H | CH₃ | 2-methylbenzothiazole-5-SO₃H | 2,6-diethyl-4-methyl-3-SO₃H-phenyl |
| d-17 | " | 2-methylbenzothiazole-6-SO₃H | " | " | 2-methylbenzothiazole-6-SO₃H | 2,6-diethyl-4-methylphenyl |
| d-18 | " | " | " | " | 2-methylbenzothiazole-4,6-diSO₃H | 2,6-diethyl-4-methyl-3-SO₃H-phenyl |
| d-19 | " | 2-methylbenzoxazole-6-SO₃H | " | " | 2-methylbenzoxazole-6-SO₃H | " |
| d-20 | " | 2-methylbenzothiazole | " | " | 2-methylbenzothiazole | " |

| Compound | a | b | c | d | e |
|---|---|---|---|---|---|
| d-16 | C₂H₅ | H | CH₃ | SO₃H | C₂H₅ |
| d-17 | " | " | " | " | " |
| d-18 | " | " | " | " | " |
| d-19 | " | " | " | " | " |
| d-20 | " | " | " | " | " |

The synthesis examples of the azo dye represented by the general formula (1) are described below, but the invention is nor limited to those methods.

As the synthesis method of the compound represented by the general formula (1), an example of compound (d-5) is shown below.

(Synthesis of Compound (d-5))

(1) Synthesis of Compound (d-5a)

24.1 g (0.147 mol) of 5-amino-3-tert-butyl-4-cyanopyrazole (1), 45 ml of concentrated hydrochloric acid, 30 ml of acetic acid and 45 ml of propionic acid were stirred at an inner temperature of 0° C., and 10.1 g (0.147 mol) of sodium nitride dissolved in 20 ml of water was added dropwise over 10 minutes. The resulting mixture was stirred for 30 minutes in such a state. 84.7 g (0.147 mol) of a coupler component (2) was dissolved in 231 ml of methanesulfonic acid, 147 ml of acetic acid and 221 ml of propionic acid. The resulting solution was stirred at 0° C., and the diazonium salt was added thereto over 30 minutes. After addition of the diazonium salt, the reaction liquid was stirred for 30 minutes. 750 g of ice was added to 2,250 ml of water and stirred, and the reaction liquid obtained above was gradually added thereto. The precipitated compound (d-5a) was suction filtered, and isolated. The yield (amount) was 73.8 g, and the yield was 85%.

(2) Synthesis of Compound (d-5b)

26.6 g (157 mmol) of the heterylating agent (3), 21.7 g of potassium carbonate and 147 ml of DMSO were added to 21.7 g of the compound (d-5a), and the resulting mixture was stirred under heating at an inner temperature of 92° C. for 4 hours while bubbling with nitrogen. After completion of stirring, the reaction mixture was cooled to room temperature, and compound (d-5b) precipitated from the reaction system was suction filtered, and isolated. The crude crystals were dispersed in 3 liters of water to dissolve excess potassium carbonate. Suction filtration was conducted to obtain the desired compound (d-5a). The yield (amount) was 20.0 g, and the yield was 63.5%. λmax=558 nm (DMF solution). m/Z (POSI)=858.

(3) Synthesis of Compound (d-5)

2 g (2.33 mmol) of the compound (d-5b) was dispersed in 7 g of sulfolane, a product of Tokyo Kasei Co., and 1.7 g of sulfane (sulfur trioxide) was added dropwise at an inner temperature of 15° C. After completion of the dropwise addition, reaction was conducted at an inner temperature of 70° C. for 2 hours. After completion of the reaction, the reaction liquid was cooled to 20° C., and 2 ml of water was added dropwise thereto. The reaction liquid was cooled to an inner temperature of 5° C., 3.3 ml of 25 wt % sodium hydroxide aqueous solution was added dropwise, and 0.8 ml of 28 wt % methanol solution of sodium methoxide was further added dropwise. Further, 4 ml of methanol was added dropwise, and an inorganic salt precipitated was filtered off, and washed with 2 ml of methanol. 2 g of potassium acetate and 5.6 ml of methanol were added to the filtrate, and 22.5 ml of ethanol was further added to crystallize a dye. Suction filtration and washing with ethanol were conducted to obtain a crude crystal compound (d-5). The crude crystal containing the inorganic salt was desalination purified with Sephadex LH-20 gel chromatography (eluent: water/methanol=1:1 (v/v)), a product of Pharmacia Corporation, to obtain compound (d-5). The amount obtained was 2 g, and the yield was 66%. λmax (DMSO) =567.1 nm, ε=46,900.

The ink for ink-jet recording of the invention (sometimes referred to as "ink of the invention") comprises at least one azo dye of the general formula (1) dissolved or dispersed in an aqueous medium, and contains the azo dye in an amount of preferably from 0.2 to 20 mass %, more preferably from 0.3 to 15 mass %, and most preferably from 0.5 to 10 mass %.

The magenta dye containing an azo group of the general formula (1) used in the invention is that an oxidation potential of the dye in the aqueous medium of the ink is nobler than 1.0 V vs SCE, preferably nobler than 1.1 V vs SCE, and more preferably nobler than 1.2 V. The means for increasing the potential is selection of a dye structure of the type having a chromophore represented by (heterocycle A)-N=N-(heterocycle B), selection of an azo dye having an azo group having an aromatic nitrogen-containing six-membered heterocycle as a coupling component directed bonded to at least one side thereof, selection of an azo dye having a cycloaromatic amino group- or heterocyclic amino group-containing structure as an auxochrome, and α-hydrogen removal of an azo dye. In particular, the dye of the general formula (2) exhibits noble potential.

The measurement method of oxidation potential used herein is a measurement method on the basis of SCE (standard saturated calomel electrode) as a reference electrode in an aqueous solution having a dye dissolved therein or a water mixed solvent system, and various measurement methods such as a direct current polarography using a graphite electrode or a platinum electrode as a working electrode, a polarography by a dropping mercury electrode, a cyclic voltammetry method (CV), a rotating ring disc electrode method, and a comb electrode method can be utilized. The oxidation potential is obtained by dissolving a sample to be tested in a solvent such as dimethyl formamide or acetonitrile, containing a supporting electrolyte such as sodium perchlorate or tetrapropylammonium perchlorate in an amount of from $1\times10^{-2}$ to $1\times10^{-6}$ mol·dm$^{-3}$, and measuring as a value to SCE (standard saturated calomel electrode) using the above measurement method. Further, the supporting electrode and solvent used can appropriately be selected according to the oxidation potential or solubility of the sample to be tested. The supporting electrode and solvent that can be used are described in Shoya Fujishima; *Electrochemical Measurement Method*, pp 101-118, (1984), Gihodo Shuppan Co.

The value of oxidation potential may deviate in about several 10 mV by the influence of liquid junction potential, liquid resistance of sample solution, or the like. However, by making correction using a standard sample (such as hydroquinone), reproducibility of the value of potential measured can be secured, and the same measurement value can be obtained by either of the above-described potential measurement methods.

In the azo dye having an oxidation potential nobler than 1.0 V vs SCE, another oxidation resistance standard is a forced discoloration rate constant to ozone gas, and the preferable azo dye has the forced discoloration rate constant of $5.0\times10^{-2}$ (hr$^{-1}$) or less, preferably $3.0\times10^{-2}$ (hr$^{-1}$) or less, and more preferably $1.5\times10^{-2}$ (hr$^{-1}$) or less.

The forced discoloration rate constant to ozone gas is measured as follows. An image is obtained by printing only the objective ink on a reflection type image receiving medium. Coloring region in which reflection density of a color of the domain spectroscopic absorption region of the ink, measured through a filter of status A is from 0.90 to 1.10 is selected as an initial density point. This initial density is set as a starting density (=100%). The image is discolored using an ozone discoloration tester constantly maintaining ozone concentration at 5 mg/l, time until the density being 80% of the initial density is measured, and the reverse number (hour$^{-1}$) of this time is obtained. The reverse number is used as a discoloration reaction rate constant on the assumption that the relationship between discoloration density and time follows the rate equation of a first-order reaction. Therefore, the discoloration rate constant obtained is a discoloration rate constant in a coloring region printed by the ink, and in the invention, this value is used as a discoloration rate constant of an ink.

A print patch for test can use a patch on which black square mark of JIS Code 2223 is printed, a stepwise color patch of Macbeth chart, and optional step density patches by which measurement area is obtained.

Reflection density of a reflection image (stepwise color patch) printed fro measurement is a density obtained by a measurement light through a status A filter with a densitometer satisfying ISO 5-4 (geometric conditions of reflection density).

In a test chamber for measurement of a forced discoloration rate constant to ozone gas, an ozone generator (for example, high pressure discharging system which applies an alternating current voltage in dry air) that can constantly maintain the inside ozone gas concentration at 5 mg/l is provided, and aeration temperature is adjusted to 25° C.

The forced discoloration rate constant is a measure of susceptibility of oxidation due to organic vapor from photochemical smog, motor vehicle emission, coated surface of furniture, carpets, and the like, and an oxidizing atmosphere in environment, such as generated gas in a picture frame in bright room, and is a measure by ozone gas which is the representative of those oxidizing atmospheres.

Hue of the magenta ink is described below. As the magenta ink, it is excellent in the point of hue that λmax is from 500 to 580 nm. Further, it is preferable that a half-value width between a long wave side and a short wave side in the maximum absorption wave is small, i.e., a sharp absorption. Specifically, this is described in JP-A-2002-309133. Further, sharpness of absorption can be embodied by introducing a methyl group into α-position.

Besides the specific azo dyes according to the invention, other coloring materials can be added to the magenta ink of the invention for the purpose of, for example, adjusting hue. Further, the ink set of the invention is characterized to contain the ink for ink-jet recording of the invention, and to constitute the ink set for color filter, a cyan ink, a yellow ink and a black ink, containing other coloring materials can be used in combination with the magenta ink of the invention. The respective coloring material can be used without particular limitation.

Examples of the dye as the coloring material contained in the ink composition that can preferably used in the ink set of the invention are described below, but the invention is not limited thereto.

(Yellow Dye)

Examples of the yellow dye are described in WO 2005/075573, JP-A-2004-83903 (Paragraphs 0024 to 0062), JP-A-2003-277661 (Paragraphs 0021 to 0050), JP-A-2003-277662 (Paragraphs 0042 to 0047), JP-A-2003-128953 (Paragraphs 0025 to 0076), JP-A-2003-41160 (Paragraphs 0028 to 0064), US-A-2003/0213405 (Paragraph 0108), and Japanese Patent Application No. 2005-151254 (Paragraphs 0015 to 0051).

(Magenta Dye)

The magenta dye is preferably a heterocyclic azo dye, and examples thereof are described in WO 2002/83795 (pages 35 to 55), WO 2002/83662 (pages 27 to 42), JP-A-2004-149560 (Paragraphs 0046 to 0059), and JP-A-2004-149561 (Paragraphs 0047 to 0060).

(Cyan Dye)

The cyan dye includes a phthalocyanine dye, and an associative phthalocyanine dye is preferable. The associative phthalocyanine dye preferably has an associative group. The associative group means a group having at least a bonding site (or a functional group) where hydrogen bond is possible at least between atoms. The bonding site can have at least one site in one group. Examples of the bonding site include a hydroxyl group, an amino bond, an amide bond, and an oxide bond, and hydrogen bond is formed between the same species or between different species. The associative group may be that hydrogen bond is possible between the phthalocyanine dye and optional additives.

To decrease reactivity to ozone which is an electrophilic agent, it is desirable that the oxidation potential is nobler than 1.0 V (vs SCE) by partially substituting carbon atom in a phthalocyanine skeleton with hetero atoms as in azaphthalocyanine, or introducing an electrophilic group into the phthalocyanine skeleton. The oxidation potential is preferable as being nobler. It is preferable that the oxidation potential is nobler than 1.1 V (vs SCE), and It is more preferable that the oxidation potential is nobler than 1.15 V (vs SCE).

Examples of the associatibe phthalocyanine dye are described in WO 2002/60994, WO 2003/811, WO 2003/62324, JP-A-2003-213167, JP-A-2004-75986, JP-A-2004-323605, JP-A-2004-315758, JP-A-2004-315807, and JP-A-2005-179469.

The phthalocyanine dye can be synthesized according to the above-described publications, and also JP-A-2004-315729, JP-A-2005-41856, and JP-A-2004-323511. Further, starting materials, dye intermediates and synthesis routes are not limited by those.

The ink set of the invention can be used in applications other than an ink-jet recording. For example, it can be used in materials for display image, image forming materials of interior decoration materials, and image forming materials of exterior decoration materials, as described in JP-A-2004-331871, Paragraphs 0727 to 0731.

Other than the above-described dyes, dyes described in the following publications can be used in an ink composition for each color: JP-A-10-130557, JP-A-9-255906, JP-A-6-234944, JP-A-7-97541, EP 982371, WO 00/43450, WO 00/43451, WO 00/43452, WO 00/43453, WO 03/106572, WO 03/104332, JP-A-2003-238862, JP-A-2004-83609, JP-A-2002-302619, JP-A-2002-327131, JP-A-2002-265809, WO 01/48090, WO 2004/087815, WO 02/090441, WO 03/027185, WO 2004/085541, JP-A-2003321627, JP-A-2002-332418, JP-A-2002-332419, WO 02/059216, WO 02/059215, WO 2004/087814, WO 2004/046252, WO 2004/046265, U.S. Pat. Nos. 3,479,444, US 665263, WO 03/106572, WO 03/104332, WO 00/58407, Japanese Patent No. 3,558,211, Japanese Patent No. 3,558,212, Japanese Patent No. 3,558,213, JP-A-2004-285351, JP-A-2004-323605, and WO 04/104106.

Examples of the dye that can be contained in the ink composition used in the ink set of the invention can be mentioned below.

Examples of the yellow dye include aryl or heteryl azo dyes having, as a coupling component, phenols, naphthols, pyrazolones, pyridones or open chain active methylene compounds; azomethine dyes having open chain active methylene compounds as a coupling component; methane dyes such as benzilidene dye or monomethine oxonol dye; and quinone dyes such as naphthoquinone dyes or anthraquinone dyes. As dye species other than the above, quinophthalone dye, nitro-nitroso dye, acridine dye, acridinone dye, and the like can be mentioned. Those dyes may be a dye that first develops yellow by dissociating part of chromophore. In this case, a counter anion may be an inorganic cation such as an alkali metal or an ammonium ion, may be an organic cation such as a pyridinium ion or a quaternary ammonium ion, and also may be a polymer cation having those as a partial structure.

Examples of the magenta dye include aryl or heteryl azo dyes having phenols, naphthols, anilines or the like as a coupling component; azomethine dyes having pyrazolones, pyrazotriazoles or the like as a coupling component; methane dyes such as arylidene dyes, styryl dyes, melocyanine dyes or oxonol dyes; carbonium dyes such as diphenylmethane dyes, triphenylmethane dyes or xanthene dyes; quinine dyes such as naphthoquinone type, anthraquinone type or anthrapyridone type; and condensed polycyclic dyes such as dioxadine dyes. Those dyes may be one that first develops magenta by dissociating part of chromophore. In this case, the counter cation may be an organic cation such as a pyridinium ion or a quaternary ammonium ion, and also may be a polymer cation having those as a partial structure.

The dyestuff containing the azo dye used in the invention is substantially water-soluble or water-dispersible. Specifically, degree of dissolution or degree of dispersion of the dyestuff in water at 20° C. is 2 mass % or more, and preferably 5 mass % or more.

As other water-soluble dyes, a direct dye, an acidic dye, an edible dye, a basic dye, a reactive dye and the like can be used together.

Of those, preferable water-soluble dyes are as follows.

C.I. Direct Red 1, 2, 4, 9, 11, 23, 26, 31, 39, 62, 63, 72, 75, 76, 79, 80, 81, 83, 89, 92, 95, 111, 173, 184, 207, 211, 212, 214, 218, 219, 223, 224, 225, 226, 227, 232, 233, 240, 241, 242, 243, 247, 254

C.I. Direct Violet 7, 9, 47, 48, 51, 66, 90, 93, 94, 95, 98, 100, 101

C.I. Direct Yellow 4, 8, 9, 11, 12, 27, 28, 29, 33, 35, 39, 41, 44, 50, 53, 58, 59, 68, 86, 87, 93, 95, 96, 98, 100, 106, 108, 109, 110, 120, 130, 132, 142, 144, 157, 161, 163

C.I. Direct Blue 1, 10, 15, 22, 25, 55, 67, 68, 71, 76, 77, 78, 80, 64, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 290, 291

C.I. Direct Black 9, 17, 19, 22, 32, 51, 56, 62, 69, 77, 80, 91, 97, 108, 112, 113, 114, 117, 118, 121, 122, 125, 132, 146, 154, 166, 168, 173, 199

C.I. Acid Red 1, 8, 35, 42, 52, 57, 62, 80, 81, 82, 87, 94, 111, 114, 115, 118, 119, 127, 128, 131, 143, 144, 151, 152, 154, 158, 186, 245, 249, 254, 257, 261, 263, 266, 289, 299, 301, 305, 336, 337, 361, 396, 397

C.I. Acid Violet 5, 34, 43, 47, 48, 90, 103, 126

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227

C.I. Acid Blue 9, 25, 40, 41, 62, 72, 76, 78, 80, 82, 87, 92, 106, 112, 113, 120, 127:1, 129, 138, 143, 175, 181, 185, 205, 207, 220, 221, 230, 247, 249, 258, 260, 264, 271, 277, 278, 279, 280, 288, 290, 326

C.I. Acid Black 7, 24, 29, 48, 52:1, 172

C.I. Reactive Red 3, 6, 13, 17, 19, 21, 22, 23, 24, 29, 35, 37, 40, 41, 43, 45, 49, 55, 63, 106, 107, 112, 113, 114, 126, 127, 128, 129, 130, 131, 137, 160, 161, 174, 180

C.I. Reactive Violet 1, 3, 4, 5, 6, 7, 8, 9, 16, 17, 22, 23, 24, 26, 27, 33, 34

C.I. Reactive Yellow 2, 3, 13, 14, 15, 17, 18, 23, 24, 25, 26, 27, 29, 35, 37, 41, 42

C.I. Reactive Blue 2, 3, 5, 7, 8, 10, 13, 14, 15, 17, 18, 19, 21, 25, 26, 27, 28, 29, 38, 82, 89, 158, 182, 203, 216, 220, 244

C.I. Reactive Black 4, 5, 8, 14, 21, 23, 31, 32, 34.

C.I. Basic Red 12, 13, 14, 15, 18, 22, 23, 24, 25, 27, 29, 35, 36, 38, 39, 45, 46

C.I. Basic Violet 1, 2, 3, 7, 10, 15, 16, 20, 21, 25, 27, 28, 35, 37, 39, 40, 48

C.I. Basic Yellow 1, 2, 4, 11, 13, 14, 15, 19, 21, 23, 24, 25, 28, 29, 32, 36, 39, 40

C.I. Basic Blue 1, 3, 5, 7, 9, 22, 26, 41, 45, 46, 47, 54, 57, 60, 62, 65, 66, 69, 71

C.I. Basic Black 8

Other the dyes represented by the above formula, dyes described in the following publications can preferably be used.

Anthrapyridone dyes described in JP-A-10-130557, JP-A-9-255906, JP-A-6-234944, JP-A-7-97541, European Patent 982371, WO 00/43450, WO 00/43451, WO 00/43452, WO 00/43453, WO 03/106572, WO 03/104332, JP-A-2003-238862, JP-A-2004-83609, JP-A-2002-302619, JP-A-2002-327131, JP-A-2-002-265809, WO 04/087815, WO 02/090441, WO 03/027185, WO 04/085541, JP-A-2003-321627, JP-A-2002-332418, JP-A-2002-332419, WO 02/059216, WO 02/059215, WO 04/087814, WO 04/046252, WO 04/046265, U.S. Pat. No. 6,652,637B, WO 03/106572, WO 03/104332, JP-T-2002-540281 (the term "JP-T" as used herein means a published Japanese translation of a PCT patent application", Japanese Patent 3,558,213, Japanese Patent 3,558,212, Japanese Patent 3,558,211, JP-A-2004-285351, JP-A-2004-323605, WO 04/104108, JP-A-2003-192930, WO 99/48981, EP 1063268A, and the like; azo dyes described in EP 682088B1, WO 94/16021A, WO 96/24636A, U.S. Pat. No. 6,468,338, WO 03/106572A, JP-A-9-124965, JP-A-6-220377, JP-A-6-234944, WO 98/44053, WO 00/58407, EP 1378549A, EP 755984A, EP 1052274A, AND EP 1048701A; chelate azo dyes described in JP-A-2000-160079, JP-A-10-130557, WO 01/48090A, WO 01/62854A, WO 2004/7622A, EP 1086999A, EP 982371A; EP 1243627A, EP 1243626A, EP 1394227A, JP-A-2003-34758, WO 02/34844A, and WO 04/87815.

Further, pigments can be used together in the magenta ink of the invention or other ink to be combined as an ink set.

The pigments used in the invention can utilize the commercially available products, and also the conventional products described in various literatures. The literatures include *Color Index* (The Society of Dyers and Colourists), *Newly-Revised Printed Pigment Handbooks*, Japan Society of Colour Material (1989), *Advanced Pigment Applied Technology*, CMC Shuppan (1986), *Printing Ink Technology*, CMC Shuppan (1984), and W. Herbst and K. Hunger, *Industrial Organic Pigments* (VCH Verlagsgesellschaft, 1993). Specifically, organic pigments include azo pigments (azo lake pigment, insoluble azo pigment, condensed azo pigment, and chelate azo pigment), polycyclic pigments (phthalocyanine pigment, anthraquinone pigment, perylene and perynone pigments, indigo pigment, quinacridone pigment, dioxadine pigment, isoindolinone pigment, quinophthalone pigment, diketopyrrolopyrrole pigment, and the like), dyed lake pigments (lake pigments of acidic or basic dyes), and azine pigments. Examples of the inorganic pigment include yellow pigments such as C.I. Pigment Yellow 34, 37, 42, 53, and the like; red pigments such as C.I. Pigment Red 101, 108 and the like; blue pigments such as C.I. Pigment Blue 27, 29, 17:1, and the like; black pigments such as C.I. Pigment Black 7, magnetite, and the like; and white pigments such as C.I. Pigment White 4, 6, 18, 21, and the like.

As a pigment having preferable hue for the image formation, a phthalocyanine pigment in a blue or cyan pigment, an anthraquinone-based indanthrone pigment (for example, C.I. Pigment Blue 60) and a dyeing lake pigment-based triaryl carbonium pigment are preferable. In particular, a phthalocyanine pigment (preferable examples are a copper phthalocyanine such as C.I. Pigment Blue 15:1, 15:2, 15:3, 15:4 or 15:6; monochloro- to low chlorinated copper phthalocyanine; am aluminum phthalocyanine such as pigments described in European Patent 860475; a non-metallic phthalocyanine which is C.I. Pigment Blue 16; and a phthalocyanine wherein a core metal is Zn, Ni or Ti, and of those, C.I. Pigment Blue 15:3 and 15:4, and aluminum phthalocyanine are preferable) are most preferable.

In red to violet pigments, an azo pigment (preferable examples are C.I. Pigment Red 3, 5, 11, 22, 38, 48:1, 48:2, 48:4, 49:1, 52:1, 53:1, 57:1, 63:2, 144, 146 and 184, and of those, C.I. Pigment Red 57:1, 146, and 184 are preferable), a quinacridone-based pigment-(preferable examples are C.I. Pigment Red 122, 192, 202, 207 and 209, and C.I. Pigment Violet 19 and 42, and of those, C.I. Pigment Red 122 is preferable), a dyeing lake pigment-based triaryl carbonium pigment (preferable examples are xanthene-based C.I. Pigment Red 81:1, and C.I. Pigment Violet 1, 2, 3, 27 and 29), a dioxadine-based pigment (for example, C.I. Pigment Violet 23 and 27), a diketopyrrolopyrrole-based pigment (for example, C.I. Pigment Red 254), a perylene pigment (for example, C.I. Pigment Violet 29), an anthraquinone-based pigment (such as C.I. Pigment Violet 5:1, 31 and 33), and a thioindigo-based pigment (for example, C.I. Pigment Red 38 and 88) are preferably used.

As a yellow pigment, an azo pigment (preferable examples are monoazo pigment-based C.I. Pigment Yellow 1, 3, 74 and 98, disazo pigment-based C.I. Pigment Yellow 12, 13, 14, 16, 17 and 83, total azo-based P.I. Pigment Yellow 93, 94, 95, 128 and 155, and benzimidazolone-based C.I. Pigment Yellow 120, 151, 154, 156 and 180, and of those, pigments which do not use a benzidine-based compound as a raw material are preferable), an isoindoline isoindolinone-based pigment (preferable examples are C.I. Pigment Yellow 109, 110, 137 and 139), a quinophthalone pigment (preferable example is C.I. Pigment Yellow 138), a flapantolone pigment (for example, C.I. Pigment Yellow 24) are preferably used.

As a black pigment, an inorganic pigment (preferable examples are carbon black and magnetite) and aniline black can be mentioned as the preferable examples.

Besides, an orange pigment (such as C.I. Pigment Orange 13 or 16) or a green pigment (such as C.I. Pigment Green 7) may be used.

The pigments than can be used in the invention may be the above-described pigments as are, or may be pigments that have been subjected to a surface treatment. A method of surface coating a resin or a wax, a method of depositing a surfactant, a method of bonding a reactive substance (for example, a silane-coupling agent, an epoxy compound, a polyisocyanate, or radicals generated from diazonium salt), and the like are considered as the surface treatment method, and are described in the following literatures and patents.
(1) Properties and Application of Metallic Soap (Saiwai Shobo)
(2) Printing Ink Printing (CMC Publishing Co., 1984)
(3) The Newest Pigment Applied Technology (CMC Publishing Co., 1986)
(4) U.S. Pat. Nos. 5,554,739 and 5,571,311
(5) JP-A-9-151342, 10-140065, 10-292143, and 11-166145

In particular, a self-dispersible pigment prepared by acting a diazonium salt to carbon black described in the U.S. patents in the above (4) or an encapsulated pigment prepared by the method described in the Japanese publications in the above (5) is particularly useful for the reason that a dispersion stability is obtained without using a superfluous dispersing agent in an ink.

In the invention, the pigment may further be dispersed using a dispersing agent. The dispersing agent can use conventional various dispersing agents, for example, a surfactant-type low molecular dispersing agent or a high molecular dispersing agent, according to the pigments used. Examples of the dispersing agent include ones described in JP-A-3-69949, European Patent 549486, and the like. Further, in using the dispersing agent, pigment derivatives called a synergist may be added in order to accelerate adsorption of the dispersing agent in the pigment.

Particle diameter of the pigment that can be used in this technique is in a range of preferably from 0.10 to 10 μm, and further preferably from 0.05 to 1 μm, after dispersion.

The method of dispersing the pigment can use the conventional dispersion techniques used when producing an ink or a toner. The dispersing machine can mention a vertical or horizontal agitator mill, an attritor, a colloid mill, a ball mill, a three-roll mill, a pearl mill, a super mill, an impeller, a disperser, a KD mill, a dynatron, a pressure kneader, and the like. The details are described in *The Newest Pigment Applied Technology* (CMC Publishing Co., 1986).

Next, the surfactant that can be contained in the ink for inkjet recording of the invention is described.

By containing the surfactant in the ink for ink-jet recording of the invention to adjust liquid properties of the ink, discharge stability of the ink can be improved, and excellent effect can be provided in improvement of water resistance of an image, bleeding prevention of a printed ink, and the like.

In the ink for ink-jet of the invention containing the magenta dye represented by the general formula (1), by dissolving and/or dispersing the betaine surfactant and/or the nonionic surfactant as a surfactant in an aqueous medium which is an ink medium, the above-described various effects, particularly the effect of maintaining the fastness properties of a dyestuff, thereby preventing the recorded image from bleeding, are remarkable.

The term "aqueous medium" used herein means a material obtained by adding additives such as a surfactant, a wetting agent, a stabilizer or a preservative, according to need, to water or a mixture of water and a small amount of a water-miscible organic solvent.

The betaine surfactant contained in the ink of the invention basically has a hydrophilic group, and improves dissolution and dispersibility of the magenta dye in the aqueous medium, thereby maintaining the fastness properties of the dyestuff and preventing the recorded image from bleeding. The betaine surfactant is contained, for example, in the case of using for dispersion of an oil-soluble dye.

The "betaine surfactant" used herein shows a compound having both a cationic site and an anionic site in its molecule, and having a surface activity. The cationic site can mention an aminic nitrogen atom, a nitrogen atom of a heteroaromatic ring, a boron atom having four bonds to carbon, a phosphor atom, and the like. Of those, a nitrogen atom of an ammonium structure or a nitrogen atom of a heteroaromatic ring (preferably an imidazolium structure) is preferable. Of those, a quaternary nitrogen atom is particularly preferable. The anionic site can mention a hydroxyl group, a thio group, a sulfonamide group, a sulfo group, a carboxyl group, an imide group, a phosphoric group, a phosphonic group and the like. Of those, a carboxyl group and a sulfo group are particularly preferable. A carboxyl group- or sulfo group-containing surfactant is preferable. The charge as the whole of molecule may be any of cation, anion or neutrality, but neutrality is preferable.

The betaine surfactant is preferably the above-described compound A or compound B. and in particular, the compound represented by either of the general formula (A) or the general formula (B) is preferable.

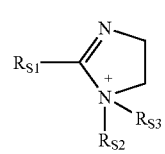

Formula (A)

In the general formula (A), $R_{s1}$ and $R_{s2}$ each represent an alkyl group, and $R_{s3}$ represents an alkyl group containing a carboxyl group or an alkyl group containing a sulfo group.

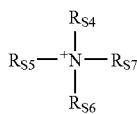

Formula (B)

In the general formula (B), $R_{s4}$, $R_{s5}$ and $R_{s6}$ each independently an alkyl group, an aryl group or a heterocyclic group, and may be combined with each other to form a cyclic structure. $R_{s4}$, $R_{s5}$ and $R_{s6}$ each independently an alkyl group (which may be substituted. A group having preferably from 1 to 20 carbon atoms, and more preferably from 1 to 16 carbon atoms. For example, a methyl group, an ethyl group, a propyl group, a butyl group, a hexyl group, an octyl group, a dodecyl group, a cetyl group, a stearyl group, or an oleyl group), an aryl group (which may be substituted. A group having preferably from 6 to 20 carbon atoms, and more preferably from 6 to 14 carbon atoms. For example, a phenyl group, a tolyl group, a xylyl group, a naphthyl group, a cumyl group, or a dedecylphenyl group), or a heterocyclic group (which may be substituted. A group having preferably from 2 to 20 carbon atoms, and more preferably from 2 to 12 carbon atoms. For example, a pyridyl group or a quinolyl group), and may be combined with each other to form a cyclic structure. Specific examples of the cyclic structure include a pyperidine ring and a morpholine ring. As $R_{s4}$, $R_{s5}$ and $R_{s6}$, an alkyl group is particularly preferable.

$R_{17}$ represents an alkyl group containing a carboxyl group or an alkyl group containing a sulfo group. $R_{17}$ represents a substituent containing a carboxyl group or a sulfo group (preferably, an alkyl group, an aryl group or a heterocyclic group, containing a carboxyl group or a sulfo group). The alkyl group, aryl group and heterocyclic group include the same groups as defined in $R_{14}$, $R_{s5}$ and $R_{s6}$, and the same groups as defined are preferable. $R_{s7}$ is preferably a group represented by -L-COO—. L represents a divalent linking group. Example of this is preferably a divalent linking group containing an alkylene group or an arylene group as a basic structural unit. The linking main chain portion may contain a hetero atom such as oxygen atom and nitrogen atom. L is preferably an alkylene group (methylene and ethylene are preferable, and methylene is more preferable).

Various substituents can be substituted on $R_{s4}$, $R_{s5}$, $R_{s6}$ or L. For example, an alkyl group (preferably from 1 to 20 carbon atoms, more preferably from 1 to 12 carbon atoms, and particularly preferably from 1 to 8 carbon atoms, and for example, each group of methyl, ethyl, isopropyl, tert-butyl, n-octyl, n-decyl, n-hexadecyl, cyclopropyl, cyclopentyl and cyclohexyl is mentioned), an alkenyl group (preferably from 2 to 20 carbon atoms, more preferably from 2 to 12 carbon atoms, and particularly preferably from 2 to 8 carbon atoms, and for example, each group of vinyl, allyl, 2-butenyl and 3-pentenyl is mentioned), an alkynyl group (preferably from 2 to 20 carbon atoms, more preferably from 2 to 12 carbon atoms, and particularly preferably from 2 to 8 carbon atoms, and for example, a propargyl group and a 3-pentynyl group are mentioned), an aryl group (preferably from 3 to 60 carbon atoms, more preferably from 6 to 20 carbon atoms, and particularly preferably from 6 to 12 carbon atoms, and for example, each group of phenyl, p-methylphenyl and naphthyl is mentioned), an amino group (preferably from 0 to 20 carbon atoms, more preferably from 0 to 12 carbon atoms, and particularly preferably from 0 to 6 carbon atoms, and for example, each group of amino, methyamino, diethylamino, diphenylamino and dibenzylamino is mentioned), an alkoxy group (preferably from 6 to 20 carbon atoms, more preferably from 6 to 16 carbon atoms, and particularly preferably from 6 to 12 carbon atoms, and for example, an phenyloxy group and 2-nephthyloxy group are mentioned), an acyl group (preferably from 1 to 20 carbon atoms, more preferably from 1 to 16 carbon atoms, and particularly preferably from 1 to 12 carbon atoms, and for example, each group of acetyl, benzoyl, formyl and pyvaroyl is mentioned), an alkoxycarbonyl group (preferably from 2 to 20 carbon atoms, more preferably from 2 to 16 carbon atoms, and particularly preferably from 2 to 12 carbon atoms, and for example, a methoxycarbonyl group and an ethoxycarbonyl group are mentioned), an aryloxycarbonyl group (preferably from 7 to 20 carbon atoms, more preferably from 7 to 16 carbon atoms, and particularly preferably from 7 to 10 carbon atoms, and for example, a phenyloxycarbonyl group is mentioned), an acyloxy group (preferably from 2 to 20 carbon atoms, more preferably from 2 to 16 carbon atoms, and particularly preferably from 2 to 10 carbon atoms, and for example, an acetoxy group and a benzoyloxy group are mentioned), an acylamino group (preferably from 2 to 20 carbon atoms, more preferably from 2 to 16 carbon atoms, and particularly preferably from 2 to 10 carbon atoms, and for example, an acetylamino group and a benzoylamino group are mentioned), an alkoxycarbonylamino group (preferably from 2 to 20 carbon atoms, more preferably from 2 to 16 carbon atoms, and particularly preferably from 2 to 12 carbon atoms, and for example, a methoxycarbonylamino group is mentioned), an aryloxycarbonylamino group (preferably from 7 to 20 carbon atoms, more preferably from 7 to 16 carbon atoms, and particularly preferably from 7 to 12 carbon atoms, and for example, a phenyloxycarbonylamino group is mentioned), a sulfonylamino group (preferably from 1 to 20 carbon atoms, more preferably from 1 to 16 carbon atoms, and particularly preferably from 1 to 12 carbon atoms, and for example, a methanesulfonylamino group and a benzenesulfonylamino group are mentioned), a sulfamoyl group (preferably from 0 to 20 carbon atoms, more preferably from 0 to 16 carbon atoms, and particularly preferably from 0 to 12 carbon atoms, and for example, each group of sulfamoyl, methylsulfamoyl, dimethylsulfamoyl and phenylsulfamoyl is mentioned), a carbamoyl group (preferably from 1 to 20 carbon atoms, more preferably from 1 to 16 carbon atoms, and particularly preferably from 1 to 12 carbon atoms, and for example, each group of carbamoyl, methylcarbamoyl, diethylcarbamoyl and phenylcarbamoyl is mentioned), an alkylthio group (preferably from 1 to 20 carbon atoms, more preferably from 1 to 16 carbon atoms, and particularly preferably from 1 to 12 carbon atoms, and for example, a methylthio group and an ethylthio group are mentioned), an arylthio group (preferably from 6 to 20 carbon atoms, more preferably from 6 to 16 carbon atoms, and particularly preferably from 6 to 12 carbon atoms, and for example, a phenylthio group is mentioned), a sulfonyl group (preferably from 1 to 20 carbon atoms, more preferably from 1 to 16 carbon atoms, and particularly preferably from 1 to 12 carbon atoms, and for example, a mesyl group and a tosyl group are mentioned), a sulfinyl group (preferably from 1 to 20 carbon atoms, more preferably from 1 to 16 carbon atoms, and particularly preferably from 1 to 12 carbon atoms, and for example, a methanesulfinyl group and a benzenesulfinyl group are mentioned), an ureido group (preferably from 1 to 20 carbon atoms, more preferably from 1 to 16 carbon atoms, and particularly preferably from 1 to 12 carbon atoms, and for example, each group of ureido, methylureido and phenylureido is mentioned), an amide phosphate group (preferably from 1 to 20 carbon atoms, more preferably from 1 to 16 carbon atoms, and particularly preferably from 1 to 12 carbon atoms, and for example, amide diethylphosphate group and an amide phenylphosphate group are mentioned), a hydroxyl group, a mercapto group, a halogen atom (for example, a fluorine atom, a chlorine atom, a bromine atom and an iodine atom), a cyano group, a sulfo group, a carboxyl group, a nitro group, a hydroxamic group, a sulfino group, a hydradino group, an imino group, a heterocyclic group (preferably from 1 to 30 carbon atoms, and more preferably from 1 to 12 carbon atoms, a group containing, for example, nitrogen atom, oxygen atom or sulfur atom as a hetero atom, and specifically, each group of imidazolyl, pyridyl, quinolyl, furyl, thienyl, pyridyl, morphorino, benzoxazole, benzimodazolyl, benzothiazolyl and azepinyl is mentioned), and a silyl group (preferably from 3 to 40 carbon atoms, more preferably from 3 to 30 carbon atoms, and particularly preferably from 3 to 24 carbon atoms, and for example, a trimetylsilyl group and a triphenylsilyl group are mentioned). Those substituents may further be substituted. Further, where at least 2 substituents are present, those may be the same or different. Further, in a possible case, those may be connected with each other to form a ring. Further, a plurality of betaine structure may be contained via $R_{s4}$, $R_{s5}$, $R_{s6}$ or L.

In the compound represented by the general formula (B) used in the invention, the case that a group having 8 or more carbon atoms is contained in either of groups represented by $R_{s4}$, $R_{s5}$, $R_{s6}$ and L is preferable. Above all, a compound containing a long chain alkyl group having 8 or more carbon atoms in $R_{s4}$, $R_{s5}$ or $R_{s6}$ is particularly preferable. Where L represents $CH(R_{s8})$ wherein $R_{s8}$ represents a hydrogen atom or an alkyl group having 8 or more carbon atoms, the case is more preferable that either of $R_{s4}$, $R_{s5}$, $R_{s6}$ or $R_{s8}$ is an alkyl group having 8 or more carbon atoms.

In the compound represented by the general formula (A) used in the invention, $R_{s1}$ and $R_{s2}$ each independently represent an alkyl group, and $R_{s3}$ represents a carboxyl group- or sulfo group-containing alkyl group.

The alkyl group represented by $R_{s1}$ and $R_{s2}$ is the same as defined in $R_{s4}$, $R_{s5}$ and $R_{s6}$.

$R_{s3}$ is the same as defined in $R_{s7}$. $R_{s3}$ is preferably a carboxyalkyl group and a sulfoalkyl group (the alkyl moiety in the group has preferably from 1 to 6 carbon atoms, and more preferably from 1 to 4 carbon atoms).

The addition amount (including the amount using for dispersing the dye) of the betaine surfactant represented by the general formula (A) or the general formula (B) has a wide range, but is preferably from 0.01 to 20 mass %, more preferably from 0.01 to 15 mass %, further preferably from 0.01 to 10 mass %, and particularly preferably from 0.01 to 5 mass %.

Specific example of the betaine dye preferably used in the invention is described below, but the invention is mot limited thereto.

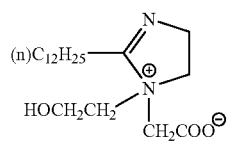
W-1

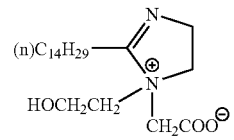
W-2

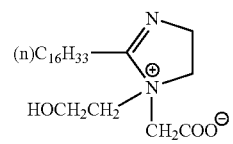
W-3

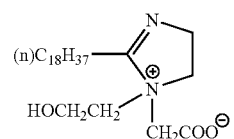
W-4

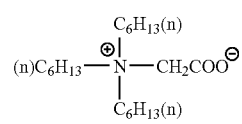
W-5

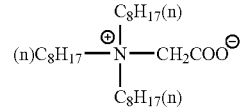
W-6

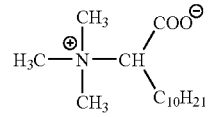
W-7

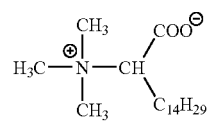
W-8

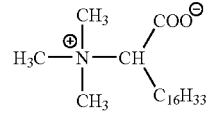
W-9

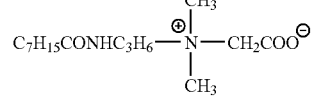
W-10

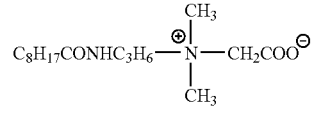
W-11

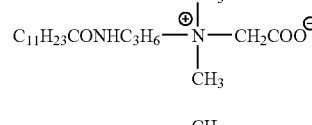
W-12

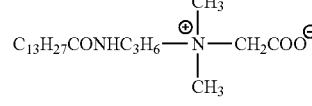
W-13

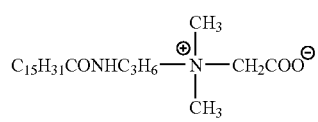 W-14

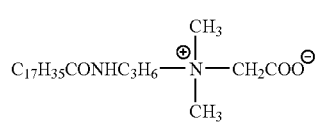 W-15

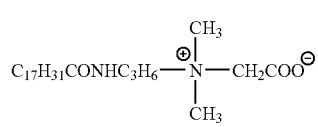 W-16

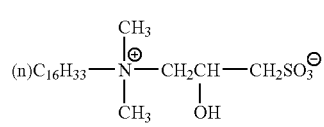 W-17

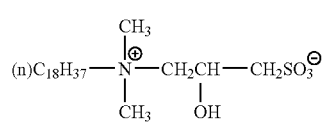 W-18

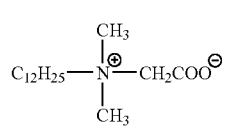 X-1

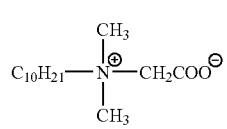 X-2

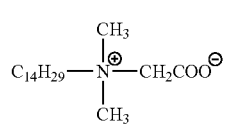 X-3

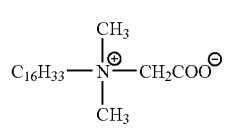 X-4

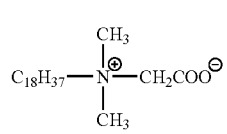 X-5

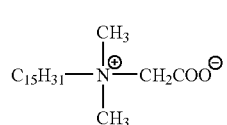 X-6

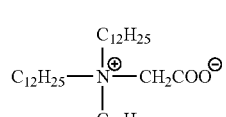 X-7

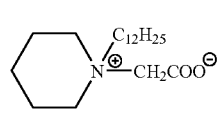 X-8

 X-9

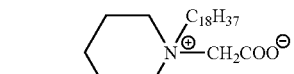 X-10

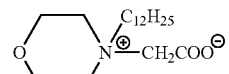 X-11

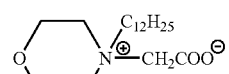 X-12

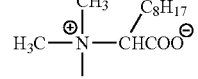 X-13

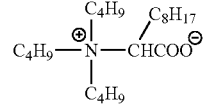 X-14

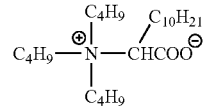 X-15

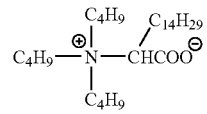 X-16

Further, the betaine surfactant having at least two carboxylic group and/or its salt in one molecule is also preferably used as the betaine surfactant.

Specific examples of those include an lkyliminodiacetic acid, an alkyliminodipropionic acid, an alkylnitriletriacetic acid, an alkyliminotripropionic acid, ethylene diamine tetraacetic acid, and its derivative. Those compounds may be used in the form of an acid or in the form of a salt. Further, an acid and a salt may be mixed in one molecule. Those compounds have a plurality of carboxylic groups in one molecule. Therefore, when bonded to a dye molecule, apparent carboxylic groups of the dye increase. For this reason, bonding between the dye and a mordant or a cellulose fiber is strong, and as a result, resistance to ink bleeding and water resistance are improved.

Specific examples of those betaine surfactants having a plurality of carboxylic groups in one molecule are described below, but the invention is not construed as being limited thereto.

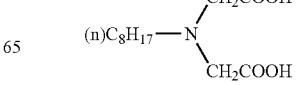 X2-1

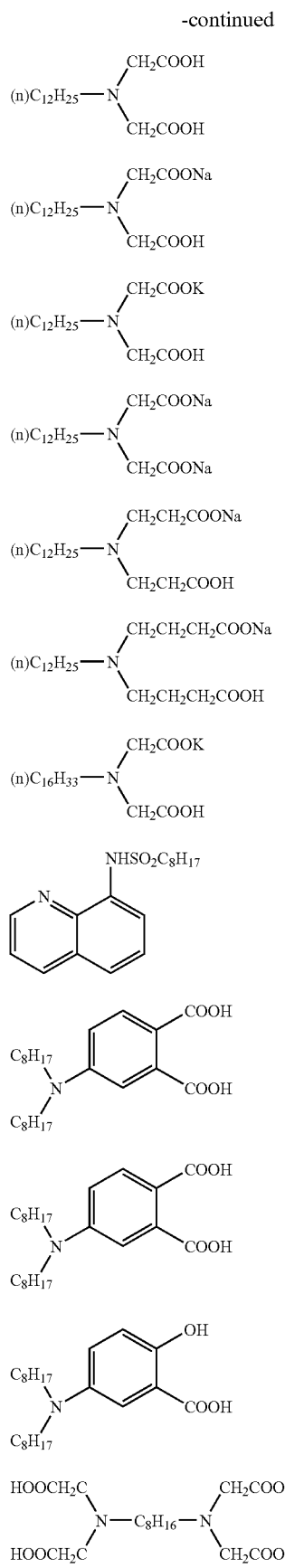
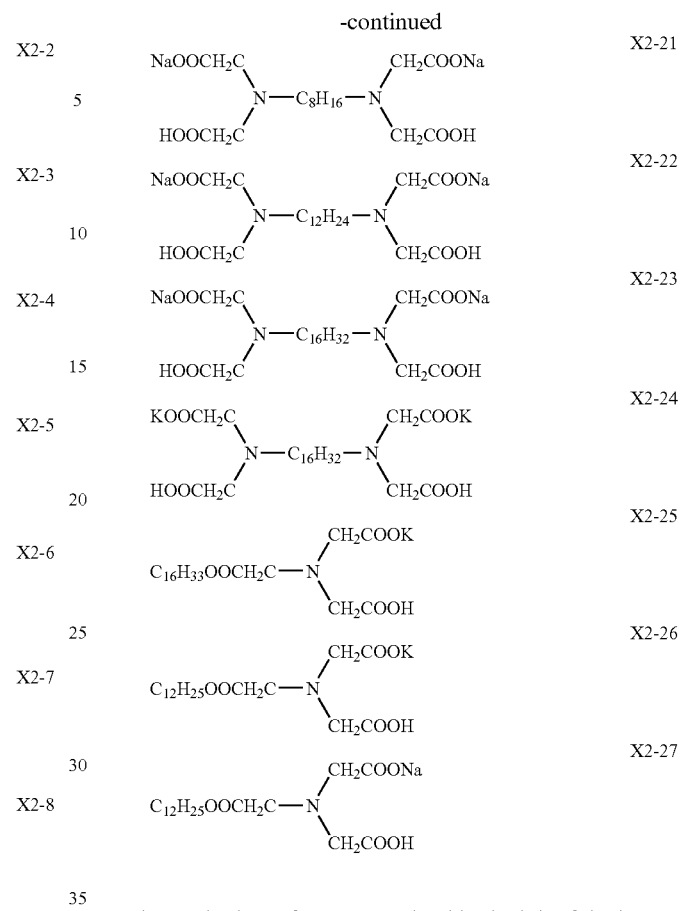

The nonionic surfactant contained in the ink of the invention has basically the same effects as described in the above-described betaine surfactant with respect to dispersibility, compatibility, fastness properties to dyestuff, image bleeding inhibition property and the like of the magenta dye represented by the general formula (1). In particular, the nonionic surfactant is preferable from the point of ink discharge stability or permeability to paper.

Particularly, the compound represented by the following general formula (I) or (II) or general formula (III) is preferable.

The compound represented by the general formula (I) is described.

Formula (I)

In the general formula (I), $R^{21}$ represents an alkyl group having from 5 to 40, preferably from 8 to 18, carbon atoms, may be linear or branched, and may be substituted.

Examples of the group that can be substituted on the alkyl group represented by $R^{21}$ include an aryl group (for example, each group of phenyl, o-tolyl, p-tolyl and p-t-butylphenyl), an alkoxy group (for example, each group of methoxy, ethoxy and n-butoxy), and a halogen atom (for example, chlorine atom and bromine atom).

Specific examples of the alkyl group represented by $R^{21}$ include each group of n-pentyl, n-hexyl, n-octyl, n-decyl, n-dodecyl, n-pentaadecyl, n-octadecyl, 2-ethylhexyl, 1-ethylpentyl, 1-n-butylpentyl, 1-n-pentylhexyl, 1-n-hexylheptyl, 1-n-heptyloctyl, 1-n-octylnonyl, 6-methoxyhexyl, and 2-phenyl ethyl.

$m_1$ represents an average addition mole number of ethylene oxide, and is from 2 to 40, preferably from 3 to 30, and particularly preferably from 3 to 20.

Of the compounds represented by the general formula (I), the compound represented by the following general formula (I-1) is particularly preferable.

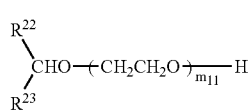

Formula (I-1)

In the general formula (I-1), $R^{22}$ and $R^{23}$ each represent a saturated hydrocarbon group having from 4 to 10 carbon atoms, and the total of the carbon atoms of $R^{22}$ and $R^{23}$ are from 8 to 18. $m_{11}$ represents an average addition mole number of ethylene oxide, and is from 3 to 20. Examples of the hydrocarbon group having from 4 to 10 carbon atoms represented by $R^{22}$ and $R^{23}$ include each group of n-butyl, i-butyl, n-pentyl, n-hexyl, n-octyl, 2-ethylhexyl, n-nonyl and n-decyl. The total of the carbon atoms of $R^{22}$ and $R^{23}$ are from 8 to 18, and preferably from 8 to 16. $m_{11}$ is from 3 to 20, preferably from 5 to 20, and more preferably from 6 to 18.

Specific examples of the compound represented by the general formula (I) are shown below, but the invention is not construed as being limited thereto.

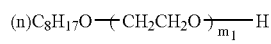

W1-1, 2

W1-1: $m_1 = 5$
W1-2: $m_1 = 10$

W1-3, 4

W1-3: $m_1 = 10$
W1-4: $m_1 = 15$

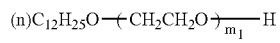

W1-5~7

W1-5: $m_1 = 10$
W1-6: $m_1 = 15$
W1-7: $m_1 = 20$

W1-8

W1-9

W1-10, 11

W1-10: $m_1 = 12$
W1-11: $m_1 = 25$

W1-12

Specific examples of the compound represented by general formula (I) are shown in Table 1 below, but the invention is not construed as being limited thereto.

TABLE 1

| No. | $R^{22}$ | $R^{23}$ | $m_{11}$ |
|---|---|---|---|
| W1-13 | (n)C$_4$H$_9$ | (n)C$_4$H$_9$ | 3 |
| W1-14 | (i)C$_4$H$_9$ | (i)C$_4$H$_9$ | 5 |
| W1-15 | (i)C$_4$H$_9$ | (i)C$_4$H$_9$ | 9.5 |
| W1-16 | (i)C$_4$H$_9$ | (i)C$_4$H$_9$ | 11.4 |
| W1-17 | (n)C$_5$H$_{11}$ | (n)C$_5$H$_{11}$ | 8 |
| W1-18 | (n)C$_5$H$_{11}$ | (n)C$_5$H$_{11}$ | 10 |
| W1-19 | (n)C$_5$H$_{11}$ | (n)C$_5$H$_{11}$ | 11.4 |
| W1-20 | (n)C$_5$H$_{11}$ | (n)C$_5$H$_{11}$ | 13.5 |
| W1-21 | (n)C$_5$H$_{11}$ | (n)C$_6$H$_{13}$ | 15 |
| W1-22 | (n)C$_6$H$_{13}$ | (n)C$_6$H$_{13}$ | 10 |
| W1-23 | (n)C$_6$H$_{13}$ | (n)C$_6$H$_{13}$ | 13.6 |
| W1-24 | (n)C$_6$H$_{13}$ | (n)C$_6$H$_{13}$ | 15.8 |
| W1-25 | (n)C$_6$H$_{13}$ | (n)C$_7$H$_{15}$ | 16 |
| W1-26 | (n)C$_7$H$_{15}$ | (n)C$_7$H$_{15}$ | 15 |
| W1-27 | (n)C$_7$H$_{15}$ | (n)C$_7$H$_{15}$ | 16.5 |
| W1-28 | (n)C$_8$H$_{17}$ | (n)C$_8$H$_{17}$ | 14 |
| W1-29 | (n)C$_8$H$_{17}$ | (n)C$_8$H$_{17}$ | 17.6 |
| W1-30 | (n)C$_8$H$_{17}$ | (n)C$_{10}$H$_{21}$ | 20 |

The compound represented by the general formula (II) is described below.

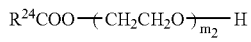

Formula (II)

In the general formula (II), R24 represents an alkyl group having from 5 to 40 carbon atoms, and preferably from 5 to 30 carbon atoms, may be linear or branched, and may be substituted.

Examples of the group that can be substituted on the alkyl group represented by $R^{24}$ include an aryl group (for example, each group of phenyl, o-tolyl, p-tolyl and p-t-butylphenyl), an alkoxy group (for example, each group of methoxy, ethoxy and n-butoxy), and a halogen atom (for example, a chlorine atom and a bromine atom). Specific examples of the alkyl group represented by $R^{24}$ include each group of n-pentyl, n-hexyl; n-octyl, n-decyl, n-dodecyl, n-pentadecyl, n-octadecyl, 2-ethylhexyl, 1-ethylpentyl, 1-n-butylheptyl, 1-n-hexylnonyl, 1-n-heptyldecyl, 1-n-octyldodecyl, 1-n-decyltetradecyl, 6-methoxyhexyl, and 2-phenyl ethyl.

$m_2$ represents an average addition mole number of ethylene oxide, and is from 2 to 40, preferably from 3 to 30, and particularly preferably from 4 to 20.

Of the compounds represented by the general formula (II), the compound represented by the following general formula (II-1) is particularly preferable.

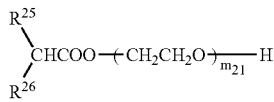

Formula (II-1)

In the general formula (II-1), $R^{25}$ and $R^{26}$ each represent a saturated hydrocarbon group having from 2 to 20 carbon atoms, and preferably from 4 to 13 carbon atoms. Examples of the hydrocarbon group having from 2 to 20 carbon atoms represented by $R^{25}$ and $R^{26}$ include each group of ethyl, n-butyl, i-butyl, n-pentyl, n-hexyl, n-heptyl, n-octyl, 2-ethylhexyl, n-nonyl, n-decyl, n-dodecyl, n-hexadecyl, and n-octadecyl. $M_{21}$ represents an average addition mole number of ethylene oxide group, and is from 2 to 40, and preferably from 3 to 30.

Specific examples of the compound represented by the general formula (II) are shown below, but the invention is not construed as being limited thereto.

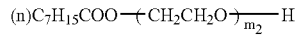
W2-1, 2
W2-1: $m_2 = 10$
W2-2: $m_2 = 15$

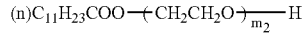
W2-3~5
W2-3: $m_2 = 10$
W2-4: $m_2 = 15$
W2-5: $m_2 = 20$

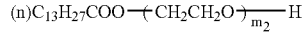
W2-6~7
W2-6: $m_2 = 10$
W2-7: $m_2 = 15$

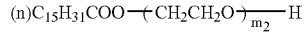
W2-8, 9
W2-8: $m_2 = 10$
W2-9: $m_2 = 15$

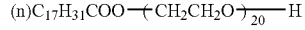
W2-10

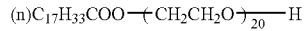
W2-111

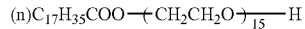
W2-12

Examples of the compound represented by the general formula (II-1) include one terminal ester of a polyethylene oxide of 2-butyloctanoic acid, and a polyethylene oxide adduct of undecan-6-ol. Specific examples of the compound represented by the general formula (II-1) are shown in Table 2 below, but the invention is not construed as being limited thereto.

TABLE 2

| No. | $R^{25}$ | $R^{26}$ | $m_{21}$ |
|---|---|---|---|
| W2-13 | $C_2H_5$ | $C_4H_9$ | 3 |
| W2-14 | $C_2H_5$ | $C_4H_9$ | 5 |
| W2-15 | $C_4H_9$ | $C_6H_{13}$ | 9.5 |
| W2-16 | $C_6H_{13}$ | $C_8H_{17}$ | 5 |
| W2-17 | $C_6H_{13}$ | $C_8H_{17}$ | 8 |
| W2-18 | $C_6H_{13}$ | $C_8H_{17}$ | 10 |
| W2-19 | $C_6H_{13}$ | $C_8H_{17}$ | 11.4 |
| W2-20 | $C_6H_{13}$ | $C_8H_{17}$ | 12.5 |
| W2-21 | $C_6H_{13}$ | $C_8H_{17}$ | 15 |
| W2-22 | $C_6H_{13}$ | $C_8H_{17}$ | 25 |
| W2-23 | $C_7H_{15}$ | $C_9H_{19}$ | 14 |
| W2-24 | $C_7H_{15}$ | $C_9H_{19}$ | 15 |
| W2-25 | $C_7H_{15}$ | $C_9H_{19}$ | 20 |
| W2-26 | $C_7H_{15}$ | $C_9H_{19}$ | 25 |
| W2-27 | $C_8H_{17}$ | $C_{10}H_{21}$ | 30 |
| W2-28 | $C_{10}H_{21}$ | $C_{12}H_{25}$ | 20 |
| W2-29 | $C_{10}H_{21}$ | $C_{12}H_{25}$ | 25 |
| W2-30 | $C_{10}H_{21}$ | $C_{13}H_{27}$ | 20 |
| W2-31 | $C_{10}H_{21}$ | $C_{13}H_{27}$ | 25 |
| W2-32 | $C_{10}H_{21}$ | $C_{13}H_{27}$ | 40 |

The compound represented by the formula (I) or the formula (II) can be synthesized using the conventional methods, and can be obtained by the method described in, for example, Takehiko Fujimoto, *Manual of New Surfactant* (1992), pages 94-107.

The compound represented by the general formula (III) is described below.

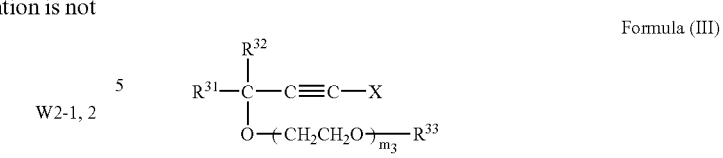
Formula (III)

In the formula, $R^{31}$ and $R^{32}$ each independently represent an alkyl group having from 1 to 18 carbon atoms.

Explaining in more detail, $R^{31}$ and $R^{32}$ each independently represent an alkyl group having from 1 to 18 carbon atoms (for example, each group of methyl, ethyl, n-propyl, butyl, hexyl, octyl, decyl, and dodecyl), and may be substituted. Examples of the substituent include an alkyl group (for example, each group of methyl, ethyl and isopropyl), an alkoxy group (for example, a methoxy group and an ethoxy group), and a halogen atom (for example, a chlorine atom and a bromine atom). Of those, an unsubstituted linear alkyl group or an unsubstituted branched alkyl group, having from 1 to 12 carbon atoms is preferable as $R^{31}$ and $R^{32}$, and particularly preferable examples thereof include methyl, ethyl, n-butyl, 2-methylbutyl, and 2,4-dimethylpentyl.

$R^{32}$ represents an alkyl group having from 1 to 6 carbon atoms, or a phenyl group, and the alkyl group or phenyl group may be substituted.

Examples of the substituent for the alkyl group of $R^{33}$ include an alkyl group (for example, each group of methyl, ethyl and isopropyl), an alkoxy group (for example, a methoxy group and an ethoxy group), and a phenyl group. Examples of the substituent for the phenyl group of $R^{33}$ include an alkyl group (for example, each group of methyl, ethyl and isopropyl), an alkoxy group (for example, a methoxy group and an ethoxy group), and a halogen atom (for example, a fluorine atom, a chlorine atom and a bromine atom). Of $R^{33}$, a hydrogen atom or an alkyl group having from 1 to 4 carbon atoms is preferable, and a hydrogen atom is particularly preferable.

X represents a hydrogen atom, or a group of

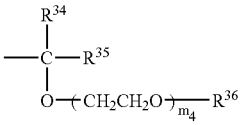

$R^{34}$ and $R^{35}$ each independently represent an alkyl group having from 1 to 18 carbon atoms. The preferable substituents of $R^{34}$ and $R^{35}$ and specific examples thereof are the substituents and specific examples selected from the same groups of the above-described $R^{31}$ and $R^{32}$. $R^{36}$ represents a hydrogen atom, an alkyl group having from 1 to 6 carbon atoms, or a phenyl group, and the preferable substitutents and specific examples thereof are the substituents and specific examples selected from the same groups of the above-described $R^{33}$.

$m^3$ and $m^4$ reach represent an average addition mole number of the ethylene oxide group, and $m^3+m^4$ is from 0 to 100, preferable from 0 to 50, and particularly preferably from 0 to 40.

Herein, when $m^3$ is zero, $R^{33}$ represents a hydrogen atom, and when $m^4$ is zero, $R^{36}$ represents a hydrogen atom. Further, when X represents a hydrogen atom, $m^3$ is from 1 to 100, preferably from 1 to 50, and particularly preferably from 1 to 40.

Of the compounds represented by the general formula (III), the compound represented by the following general formula (III-1) is particularly preferable.

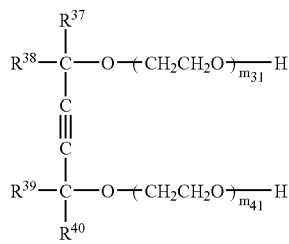

Formula (III-1)

In the formula, $R^{37}$, $R^{38}$, $R^{39}$ and $R^{40}$ each independently represent an alkyl group having from 1 to 6 carbon atoms, and preferably from 1 to 4 carbon atoms. $m_{31}$, and $m_{41}$ each represent the addition mole number of the ethylene oxide group, and the total thereof is a number of from 0 to 40, and preferably from 2 to 20.

The specific examples of the compound represented by the general formula (III) or the general formula (III-1 are shown below, but the invention is not construed as being limited thereto.

W5-1

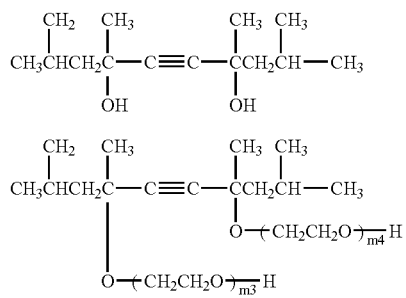

W5-2~6

W5-2: $m_3 + m_4 = 1.3$
W5-3: $m_3 + m_4 = 3.5$
W5-4: $m_3 + m_4 = 10$
W5-5: $m_3 + m_4 = 20$
W5-6: $m_3 + m_4 = 30$

W5-7, 8

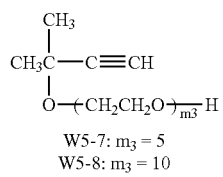

W5-7: $m_3 = 5$
W5-8: $m_3 = 10$

W5-9, 10

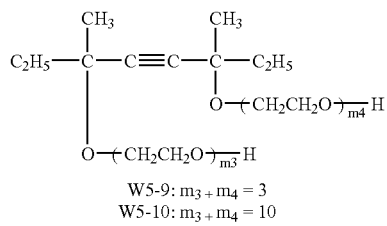

W5-9: $m_3 + m_4 = 3$
W5-10: $m_3 + m_4 = 10$

W5-11

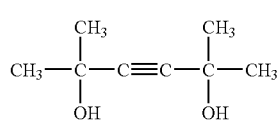

W5-12

W5-13, 14

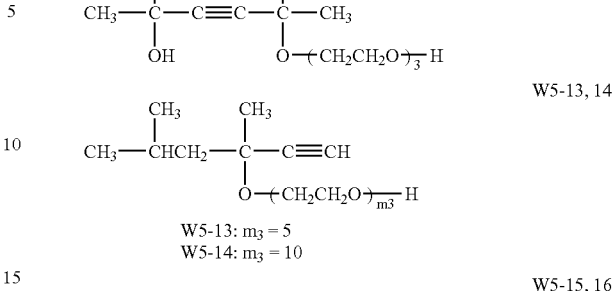

W5-13: $m_3 = 5$
W5-14: $m_3 = 10$

W5-15, 16

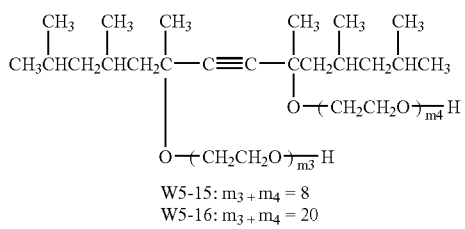

W5-15: $m_3 + m_4 = 8$
W5-16: $m_3 + m_4 = 20$

W5-17, 18

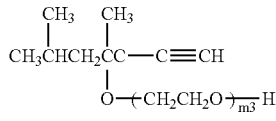

W5-17: $m_3 = 5$
W5-18: $m_3 = 10$

W5-19

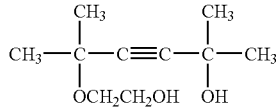

W5-20

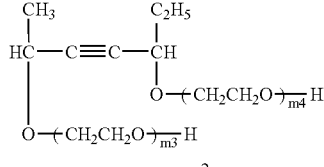

$m_3 + m_4 = 2$

The compound represented by the general formula (III) or the general formula (III-1) can be synthesized using the conventional methods, and can be obtained by the method described in, for example, Takehiko Fujimoto, *Manual of New Surfactant* (1992), pages 94-107.

The surfactant contained in the ink of the invention is preferably that precipitation or separation from the ink is difficult to occur, and foaming property is small. The betaine surfactant and the nonionic surfactant are preferable from those standpoints. Of those, the nonionic surfactant is preferable from the standpoint of foaming property. As the nonionic surfactant wherein a hydrophobic site is two chains or a hydrophobic site is branched, the compound represented by the general formula (I) or the general formula (II-1) is preferable, and as the nonionic surfactant having a hydrophilic group in the vicinity of the center of a hydrophobic site, the compound represented by the general formula (III-1) is preferable.

When the nonionic surfactant is used in the ink used in the invention, its content is from 0.01 to 20 mass %, preferably from 0.01 to 15 mass %, more preferably from 0.01 to 10 mass %, and particularly preferably from 0.01 to 5 mass %. Where only the nonionic surfactant is used in the ink and its concentration is less than 0.01 mass %, there is the tendency that printing quality remarkably deteriorates, such as decrease in discharge stability, generation of bleeding when mixing, or generation of beard. Further, when the surfactant in the ink is larger than 20 mass %, there is the case that printing becomes poor due to, for example, adhesion of the ink on a hard surface when discharging. From this standpoint, a static surface tension is 20 mN/m or higher, and preferably 25 mN/m or higher, at 25° C. Further, at 25° C., 60 mN/m or lower is preferable, 50 mN/m or lower is more preferable, and 40 mN/m or lower is particularly preferable. The static surface tension will be described hereinafter.

Further, in the ink of the invention, it is possible to co-use the above-described betaine surfactant and nonionic surfactant, and also possible to co-use a different kind of a surfactant other than those.

By co-using such a different kind of a surfactant, the effect of the surfactant of the invention may be reinforced by, for example, adjusting liquid physical properties of the ink, such as a surface tension, improving a discharge stability of the ink, improving water resistance of the image, and improving bleeding prevention of the ink printed.

Examples of the surfactant that can be used together with the above-described surfactants include anionic surfactants such as an aliphatic acid salt, an alkylsulfuric ester salt, an alkylbenzenesulfonic acid salt, an alkylnaphthalenesulfonic acid salt, dialkylsulfosuccinic acid salt, an alkylphosphoric ester salt, a naphthalenesulfonic acid formalin condensate, and a polyoxyethylenealkylsulfuric acid salt; cationic surfactants such as an aliphatic amine salt, a quaternary ammonium salt, and an alkylpyridium salt; fluorine-based compounds; and silicon-based compounds. Those can be used alone or as mixtures of two or more thereof.

Specific examples include anionic surfactants such as sodium dodecysulfate, sodium dodecysulfonate, and sodium alkylbenzenesulfonate; and cationic surfactants such as cetylpyridium chloride, trimethylcetylammonium chloride, and tetrabutylammonium chloride.

Those surfactants that may be co-used can be added within a range that the effect of the invention is not lost. The content is from 0.001 to 15 mass %, preferably from 0.005 to 10 mass %, and further preferably from 0.01 to 5 mass %, to the ink, and are used in a range not exceeding the concentration of the above-described betaine surfactant and nonionic surfactant. The total content of the surfactants is from 0.01 to 20 mass %, preferably from 0.01 to 15 mass %, and further preferably from 0.01 to 5 mass %, to the ink. Preferably, only the above-described betaine surfactant and nonionic surfactant are substantially used as the surfactant.

In the invention, where it is required to emulsify and disperse a coloring material described hereinafter, the surfactant is used in the case of using as a surface tension modifier. Therefore, further explanation of the surfactant will be made in the respective item.

Examples of the water-miscible organic solvent that can be used in the invention include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol, diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyl diethanolamine, N-ethyl diethanolamine, morpholine, N-ethylmorpholine, ethylenediamine, diethylene triamine, triethylene tetramine, polyethyleneimine, and tetramethylpropylenediamine), and other polar solvents (such as formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). Those water-miscible organic solvents may be used as mixtures of two or more thereof.

When the azo dye is an oil-soluble dye, it can be prepared by dissolving the oil-soluble dye in a high boiling organic solvent, and emulsification dispersing in an aqueous medium.

The high boiling organic solvent used in the invention has a boiling point of 150° C. or higher, and preferably 170° C. or higher.

Examples of the high boiling organic solvent include phthalic esters (for example, dibutyl phthalate, dioctyl phthalate, dicyclohexyl phthalate, di-2-ethylhexyl phthalate, decyl phthalate, bis(2,4-di-tert-amylphenyl)isophthalate, and bis(1,1-diethylpropyl)phthalate), esters of phosphoric acid or phosphone (for example, diphenyl phosphate, triphenyl phosphate, tricresyl phosphate, 2-ethylhexyl diphenyl phosphate, dioctylbutyl phosphate, tricyclohexyl phosphate, tri-2-ethylhexyl phosphate, tridodecyl phosphate, and di-2-ethylhexylphenyl phosphate), benzoic esters (for example, 2-ethylhexyl benzoate, 2,4-dichlorobenzoate, dodecyl benzoate, and 2-ethylhexyl-p-hydroxybenzoate), amides (for example, N,N-diethyl dodecaneamide, and N,N-diethyl laurylamide), alcohols or phenols (for example, isostearyl alcohol, and 2,4-di-tert-amylphenol), aliphatic esters (for example, dibutoxyethyl succinate, di-2-ethylhexyl succinate, 2-hexyldecyl tetradecanoate, tributyl citrate, diethyl azelate, isostearyl lactate, and trioctyl citrate), aniline derivatives (for example, N,N-dibutyl-2-butoxy-5-tert-octyl aniline), chlorinated paraffins (paraffins having a chlorine content of from 10 to 80%), trimesic esters (for example, tributyl trimesate), dodecylbenznen, diisopropyl naphthalene, phenols (for example, 2,4-di-tert-amylphenol, 4-dodecyloxyphenol, 4-dodecyloxycarbonyl phenol, and 4-(4-dodecyloxyphenylsulfonyl)phenol), carboxylic acids (for example, 2-(2,4-di-tert-amylphenoxy-butyric acid, and 2-ethoxyoctanedecanoic acid), and alkyl phosphoric acids (for example, di-2(ethylhexyl)phosphoric acid, and diphenyl phosphoric acid). The high boiling organic solvent can be used in a mass ratio of from 0.01 to 3 times, and preferably from 0.01 to 1.0 times, to the oil-soluble dye.

Those high boiling organic solvents may be used alone or as mixtures of two or more thereof (for example, tricresyl phosphate and dibutyl phthalate, trioctyl phosphate and di(2-ethylhexyl)sebacate, and dibutyl phthalate and poly(N-t-butylacrylamide)).

Compounds other than the high boiling organic solvents used in the invention, and/or methods for synthesizing those high boiling organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, and 5,013,639; European Patent Nos. 276,319 A, 286,253 A, 289,820 A, 309,158 A, 309,159 A, 309,160 A, 309,160 A, 509,311 A, and 510, 576 A; East German Patent. Nos. 147,009, 157, 147, 159,573, and 225,240 A; British Patent No. 091,124 A; JP-A-48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, and 64-68745; and JP-A-1-101543, 1-102454, 2-792, 2-4239, 2-43541, 4-29237, 4-30165, 4-232946, and 4-346338.

The high boiling organic solvent is used in a mass ratio of from 0.01 to 3.0 times, and preferably from 0.01 to 1.0 times, to the oil-soluble dye.

In the invention, the oil-soluble dye and the high boiling organic solvent are used by emulsion dispersing in an aqueous medium. In emulsion dispersing, a low boiling organic solvent can be used depending to the case from the standpoint of emulsifiability. The low boiling organic solvent is an organic solvent having a boiling point of about 30° C. or higher and about 150° C. or lower under atmospheric pressure. Examples of such an organic solvent preferably used include esters (for example, ethyl acetate, butyl acetate, ethyl propionate, β-ethoxyethyl acetate, and methyl cellosolve acetate), alcohols (for example, isopropyl alcohol, n-butyl alcohol, and secondary butyl alcohol), ketones (for example, methyl isobutyl ketone, methyl ethyl ketone, and cyclohexane), amides (for example, dimethylformamide, and N-methylpyrrolidone), ethers (for example, tetrahydrofuran, and dioxane). However, the invention is not limited to those.

Emulsification dispersing is conducted by dispersing an oil phase obtained by dissolving a dye in a high boiling organic solvent, or according to the case, a mixed solvent of the high boiling organic solvent and a low boiling organic solvent, in an aqueous phase mainly comprising water, thereby forming fine oil droplets of the oil phase. In this case, if required and necessary, additives such as surfactants, wetting agents, dye stabilizers, emulsification stabilizers, preservatives, and mildewproofing agents, can be added to the aqueous phase, the oil phase, or both.

As the emulsification method, a method of adding an oil phase to an aqueous phase is general, but a so-called phase inversion emulsification method of adding dropwise an aqueous phase to an oil phase can also preferably be used. Even where the azo dye used in the invention is water-soluble, and the additive is oil-soluble, the above-described emulsification method can be applied.

In emulsification dispersing, various surfactants can be used. For example, anionic surfactants such as a fatty acid salt, an alkylsulfuric ester salt, an alkylbenzenesulfonic acid salt, an alkylnaphthalenesulfonic acid salt, a dialkylsulfosuccinic acid salt, an alkylphosphoric ester salt, a naphthalenesulfonic acid formalin condensate, and a polyoxyethylenealkylsulfuric ester salt; and nonionic surfactants such as a polyoxyethylene alkyl ether, a polyoxyethylene alkyl allyl ether, a polyoxyethylene fatty ester, a sorbitan fatty acid ester, polyoxyethylene sorbitan fatty acid ester, a polyoxyethylene alkylamine, a glycerin fatty acid ester, and an oxyethylene oxypropylene block copolymer are preferable. Further, SUR-FYNOLS (Air Products & Chemicals) which is an acetylene-based polyoxyethylene oxide surfactant is also preferably used. Further, an amine oxide-based ampholytic surfactant such as N,N-dimethyl-N-alkylamine oxide is also preferable.

Further, compounds described in JP-A-59-157636, pages 37-38, and Research Disclosure No. 308119 (1989) as a surfactant can also be used.

Further, for the purpose of attempting stabilization just after emulsification, a water-soluble polymer can be used in combination with the above-described surfactant. It is preferable to use a polyvinyl alcohol, a polyvinyl pyrrolidone, a polyethylene oxide, a polyacrylic acid, a polyacryl amine and their copolymers as the water-soluble polymer. Further, for stabilization of dye dispersed products, a polyvinyl obtained by polymerization of acrylic esters, methacrylic esters, vinyl esters, acrylamides, methacrylamides, olefins, styrenes, vinyl ethers, and acrylonitriles, that do dot substantially dissolve in an aqueous medium can be co-used. Those polymers preferably contain —$SO_3^-$ or —$COO^-$. In the case of co-using such a polymer that does not substantially dissolve in an aqueous medium, the polymer is used in an amount of preferably 20 mass % or less, and more preferably 10 mass % or less, of the high boiling organic solvent.

Where the oil-soluble dye or the high boiling organic solvent is dispersed by emulsification dispersing to prepare an aqueous ink, control of its particle size is particularly important. In forming an image by ink-jet, it is essential to decrease the average particle size in order to increase color purity or density. It is preferably 1 μm or less, and more preferably from 5 to 100 nm, in terms of a volume average particle diameter.

For the measurement method of a volume average particle diameter and particle distribution of the dispersed particles, a static light diffusion method, a dynamic light diffusion method, a centrifugal precipitation method, and the method described in *Experimental Chemistry Course*, $4^{th}$ edition, pages 417-418, are used. Thus, conventional methods can easily be used for the measurement. For example, an ink is diluted with distilled water such that the particle concentration in the ink is from 0.1 to 1 mass %, and the measurement can easily be made with a commercially available particle-diameter measuring instrument (for example, MICROTRACK UPA, a product of Nikkiso Co.). Further, a dynamic light diffusion method utilizing laser Doppler effect can measure small size of the particle diameter, and is particularly preferable.

The volume average particle diameter is an average particle diameter weighted by particle volume. In aggregation of particles, the diameter of individual particle is multiplied by the volume of the particle, and the total is divided by the total volume of particles. The volume average particle diameter is described in Soichi Muroi, *Chemistry of Polymer Latex*, page 119, Koubunnshikannkoukai).

It was apparent that the presence of course particle give rise to a great problem in printing performance. That is, it was apparent that the course particles clog nozzles of a head, or even if not clog, forms staining, and as a result, insufficient discharge or slippage of discharge occurs, giving great influence to printing performance. To prevent this, it is important to suppress particles of 5 μm or more to 10 particles or less, and particles of 1 μm or less to 1,000 particles or less, in 1 μl of ink when forming an ink.

A method of removing those course particles can use the conventional centrifugal separation method, microfiltration method and the like. Those separation means may be conducted just after emulsification dispersing, or just before filling in an ink cartridge after various addition such as a wetting agent and a surfactant to an emulsification dispersed product.

The means effective to decrease the average particle size and lose course particles can use a mechanical emulsifier.

The emulsifier can use the conventional apparatuses such as a simple stirrer, an impeller stirring system, an in-line stirring system, a mill system such as a colloidal mill, a ultrasonic wave system, and the like. Use of a high pressure homogenizer is particularly preferable.

Detailed mechanism of the high pressure homogenizer is described in, for example, U.S. Pat. No. 4,533,254, and JP-A-6-47264. The commercially available apparatuses are Gaulin homogenizer (A.P.V GOULIN INC.), microfluidizer (MICROFLUIDEX INC.), Altimizer (Sugino Machine), and the like.

Further, a high pressure homogenizer equipped with a mechanism which forms fine particles in ultrahigh pressure jet stream as described in U.S. Pat. No. 5,720,551 is particularly effective in emulsification dispersing of the invention. An example of this emulsifier using ultrahigh pressure jet stream includes DeBEE 2000 (BEE INTERNATIONAL LTD.).

Pressure in emulsifying with high pressure emulsification dispersing device is 50 MPa or higher, preferably 60 MPa or higher, and more preferably 180 MPa or higher.

For example, in a method of, for example, emulsifying with a stirring emulsifier, and then passing through a high pressure homogenizer, it is a particularly preferable method to co-use at least two kinds of emulsifiers. Further, a method of once emulsification dispersing with those emulsifiers, adding additives such as a setting agent and a surfactant, and then filling an ink in a cartridge is also a preferable method.

In the case of containing the low boiling organic solvent in addition to the high boiling organic solvent, it is preferable to remove the low boiling organic solvent from the standpoints of stability and safe health of an emulsified product. A method of removing the low boiling solvent can use conventional various methods depending on the kind of solvent. That is, the methods are an evaporation method, a vacuum evaporation method, an ultrafiltration method, and the like. This removal step of the low boiling organic solvent is preferably conducted as quickly as possible just after emulsification.

Additives such as a dry inhibitor for preventing clogging of an ink at injection nozzles due to dry, a penetration enhancer for well permeating an ink in papers, an ultraviolet absorber, an antioxidant, a viscosity modifier, a surface tension modifier, a dispersing agent, a dispersion stabilizer, a mildewproofing agent, a rust preventive, a pH adjustor, a defoaming agent, and a chelating agent can appropriately be selected, and used in the ink for ink-jet recording obtained in the invention.

A water-soluble organic solvent having vapor pressure lower than water is preferable as the dry inhibitor used in the invention. Examples of the dry inhibitor include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylol propane; lower alkyl ethers of polyhydric alcohols, such as ethylene glycol monomethyl (or ethyl) ether, diethylene glycol monomethyl (or ethyl) ether, and triethylene glycol monomethyl (or ethyl) ether; heterocycles such as 2-pyrrolidone, N-methyl-2-pyrrolidone, 1,3-dimethyl-2-imidazolidinone, and N-ethyl morpholine; sulfur-containing compounds such as sulfolane, dimethylsulfoxide, and 3-sulfolene; polyfunctional compounds such as diacetone alcohol, and diethanolamine; and urea derivatives. Of those, polyhydric alcohols such as glycerin, and diethylene glycol are more preferable. Further, the dry inhibitors may be used alone or as mixtures of two or more thereof. Those dry inhibitors are preferably contained in the ink in an amount of from 10 to 50 mass %.

Examples of the penetration enhancer used in the invention include alcohols such as ethanol, isopropanol, butanol, di(tri) ethylene glycol monobutyl ether, and 1,2-hexanediol; sodium laurysulfate; sodium oleate; and nonionic surfactants. Those exhibit sufficient effect when containing in an ink in an amount of from 10 to 30 mass %, and are preferably used in a range of the addition amount that does cause bleeding of print or print through.

Examples of the ultraviolet absorber used to improve storage stability of an image in the invention include benzotriazole compounds as described in, for example, JP-A-58-185677, 61-190537, 2-781, 5-197075, and 9-34057; benzophenone compounds as described in, for example, JP-A-46-2784, and 5-194483, and U.S. Pat. No. 3,214,463; cinnamic acid compounds as described in; for example, JP-B-48-30492, and 56-21141, and JP-A-10-88106; triazine compounds as described in, for example, JP-A-4-298503, 8-53427, 8-239368, and 10-182621, and JP-T-8-501291; compounds described in Research Disclosure No. 24239; and compounds that emit fluorescence by absorbing ultraviolet rays, represented by stylbene type and benzoxazole type compounds, i.e., so-called fluorescent brighteners.

In the invention, various organic and metal complex discoloration inhibitors can be used as the antioxidant used for improving storage stability of an image. Examples of the organic discoloration inhibitor include hydroquinones, alkoxyphenols, dialkoxyphenols, phenols, anilines, amines, indans, chromans, alkoxyanilines, and heterocycles. Examples of the metal complex include nickel complex and zinc complex. More specifically, the compounds described in the patents cited in Research Disclosure No. 17643, VIII, Item I or J, No. 15162, No. 18716, page 650, the left-hand column, No. 36544, page 527, No. 307105, page 872, and No. 15162, and the compounds included in the general formulae and compound examples described in JP-A-62-215272, pages 127 to 137 can be used.

The ink of the invention preferably contains antiseptics from the standpoint of preventing corrosion of the ink. In the invention, the antiseptics mean materials having the function to prevent generation and growth of microorganisms, particularly bacteria/fungus (molds) (called mildewproofing agents).

The following materials can effectively be used as the antiseptics useful in the invention.

Compounds containing heavy metal ions (such as silver ion-containing compounds, and copper complex compounds) or their salts can be mentioned as the inorganic antiseptics. Example of the organic antiseptic that can be used include quaternary ammonium salts (such as tetrabutylammonium chloride, diisopropylammonium nitrite, cetylpyridium chloride, dicyclohexylammonium chloride, and benzyltrimethylammonium chloride), phenol derivatives (such as phenol, cresol, butylphenol, xylenol, and bisphenol), phenoxyether derivatives (such as phenoxyethanol), heterocyclic compounds (such as benzotriazole, Proxel, and 1,2-benzoisothiazolin-3-on), acid amides, carbamic acids, carbamates, amidine-guanidines, pyridines (such as sodium pyridinethion-1-oxide), diazines, triazines, pyrrole-imidazoles, oxasoloxxadines, pentaerythritol tetranitrate, benzotriazoles, thiazole-thiadiazines, thioureas, thiosemicarbazides, dithiocarbamates, sulfides, sulfoxides, sulfones, sulfamides, antibiotics (such as penicillin, and tetracycline), sodium dehydroacetate, sodium benzoate, ethyl p-hydroxybenzoic ester, acidic sulfite, sodium thiosulfate, ammonium thioglycolate, 1,2-benzisothiazolin-3-one) and its salt. Materials described in, for example, *Antibaterial and Antifungal Handbook* (Gihodo Shuppan Co., 1986), and *Antibaterial and Antifungal*

*Dictionary* (The Society for Antibacterial and Antifungal Agents, Japan, Editing Committee) can also be used as the anticeptics.

Those compounds can use various types of, for example, an oil-soluble structure and a water-soluble structure. Water-soluble compounds are preferable, and 1,2-benzisothiazolin-3-one (for example, Proxel$^{TR}$) and benzotriazole can particularly preferably be used.

Above all, in the invention, when at least two kind of those antiseptics are used together, the discharge stability of the ink after passing a long-term is markedly improved, and thus the effect of the invention is further well exhibited. In the case of combining two kinds or more, it is preferable that the respective antiseptics have a skeleton of different chemical structure. Further, in the case of containing two kinds or more of the antiseptics, it is preferable that at least one kind of the antiseptics is a heterocyclic compound. Preferable combinations include a combination of a heterocyclic compound and an antibiotic, and a combination of a heterocyclic compound and a phenol derivative. Ratio of contents in the case of combining two kinds of antiseptics is not particularly limitative, but is preferably in a range of antiseptic A/antiseptic B=0.01 to 100 (mass ratio).

The amount of the antiseptics added can be in a wide range, but is from 0.001 to 10 mass %, preferably from 0.02 to 5.00 mass %, and more preferably from 0.1 to 5 mass %.

The pH regulator used in the invention can preferably be used in the points of regulating pH and imparting dispersion stability, and it is preferable that pH of the ink at 25° C. is regulated to from 4 to 11. Where the pH is lower than 4, solubility of the dye decreases, and nozzles may easily be clogged. Where the pH exceeds 11, there is the tendency that water resistance deteriorates. As the pH regulator, examples of a basic compound include organic bases, and inorganic alkalis, and examples of an acidic compound include organic acids and inorganic acids.

Examples of the organic base include triethanolamine, diethanolamine, N-methyl diethanolamine, and dimethyl ethanolamine. Examples of the inorganic alkali include alkali metal hydroxides (for example, sodium hydroxide, lithium hydroxide, and potassium hydroxide), and carbonates (for example, sodium carbonate, and sodium hydrogencarbonate), and ammonium. Examples of the organic acid include acetic acid, trifluoroacetic acid, and an alkylsulfonic acid. Examples of the inorganic acid include hydrochloric acid, sulfuric acid, and phosphoric acid.

In the method of producing an ink for ink-jet, comprising dissolving and/or dispersing at least one dye represented by the general formula (1) according to the invention, stabilization is effectively attempted by a step adding at least ultrasonic vibration, and discharge stability and hue are improved.

Further, in the invention, the ink prevents to generate gas bubbles by a pressure applied in the recording head. Therefore, the production method is preferable that ultrasonic wave energy equal to or higher than the energy received in the recording head is previously added in the production step of the ink to remove gas bubbles.

The ultrasonic vibration uses an ultrasonic wave having a frequency of 20 kHz or higher, preferably 40 kHz or higher, and more preferably 50 kHz or higher. Further, energy applied to a liquid by ultrasonic vibration is generally $2\times10^7$ J/m$^3$ or higher, preferably $5\times10^7$ J/m$^3$ or higher, and more preferably $1\times10^8$ J/m$^3$ or higher. Further, the time of the ultrasonic vibration applied is generally from about 10 minutes to about 1 hour.

The step of applying the ultrasonic vibration exhibits the effect at any time so long as the step is conducted after introducing the dye into a medium. However, applying the ultrasonic vibration in dissolving and/or dispersing the dye in a medium is preferable in that the effect of removing gas bubbles is further increased, and dissolution and/or dispersion of the dyestuff in a medium by the ultrasonic vibration is promoted.

That is, the step of applying at least the ultrasonic vibration can be conducted at any time even during or in the course of the step of dissolving and/or dispersing the dye in a medium. In short, the step of applying at least the ultrasonic vibration can optionally be conducted one time or more until obtaining a product after ink preparation.

In the invention, the step of dissolving and/or dispersing the dye in a medium preferably has a step of dissolving the dye in a part of the whole medium, and a step of mixing the residual medium. It is preferable to apply the ultrasonic vibration to at least the above any step, and it is further preferable to apply at least the ultrasonic vibration to the step of dissolving the dye in a part of the whole medium. The step of mixing the residual solvent may be a single step or multiple steps.

Further, it is preferable to co-use deaeration under heating or deaeration under reduced pressure in the ink production according to the invention, because this increases the effect of removing gas bubbles in the ink. It is preferable that the deaeration under heating or deaeration under reduced pressure is conducted simultaneous with or after the step of mixing the residual medium.

Means for evolving ultrasonic vibration in the step of applying the ultrasonic vibration includes the conventional apparatuses such as an ultrasonic disperser.

In the invention, the medium is preferably an aqueous medium which is water or a mixed solvent of water and a waster-miscible organic solvent.

In preparing the ink according to the invention, the step of removing contaminants that are a solid component by filtration is important to improve stability of the ink and to improve hue. This operation uses a filtration filter. In this case, the filtration filter uses a filter having an effective diameter of 1 μm or less, preferably 0.3 μm or less and 0.05 μm or more, and particularly preferably 0.3 μm or less and 0.25 μm or more. Material for the filter can use various materials, but particularly in the case of an ink of a water-soluble dye, it is preferable to use a filter prepared for an aqueous solvent. Of those, it is particularly preferable to use a jacket type filter prepared with a polymer material, that is difficult to generate dusts. As the filtration method, it may be passed through a jacket by solution sending, or it is possible to use any method of filtration under pressure and filtration under reduced pressure.

Further, after filtration, in many cases air is entrapped in the solution. There are many cases that bubbles due to the air cause turbulence of image in the ink-jet recording. Therefore, a defoaming step is separately provided in the invention. The defoaming method can use various methods such as ultrasonic defoaming and defoaming under reduced pressure.

Those works prevent contamination of dusts during working. Therefore, it is preferable to conduct the work utilizing a space such as a clean room and clean bench. In the invention, this work is conducted in a space having class 100 or lower as a degree of cleaning.

Viscosity of the ink of the invention is preferably from 1 to 30 mPa·s, more preferably from 2 to 15 mPa·s, and particularly preferably from 2 to 10 mPa·s at 25° C. Where the viscosity exceeds 30 mPa·s, a fixing rate of a recoding image becomes slow, and a discharge performance also lowers. Where the viscosity is less than 1 mPa·s, the recorded image bleeds, so that appearance quality lowers.

The viscosity can freely be adjusted by the amount of an ink solvent added. Examples of the ink solvent include glycerin, diethylene glycol, triethanolamine, 2-pyrrolidone, diethylene glycol monobutyl ether, and triethylene glycol monobutyl ether.

The measurement method of viscosity is described in detail in JIS Z8803, but the viscosity can easily be measured with commercially available viscometers. For examples, there are B-type viscometer and E-type viscometer, products of Tokyo Keiki Co., as a rotary type. In the invention, the viscosity was measured with Vibration type VM-100A-L Model, a product of Yamaichi Electronics Co. Unit of viscosity is Pascal second (Pa·s), but generally uses milli Pascal second (mPa·s).

It is preferable that the ink for ink-jet recording used in the invention has a static surface tension at 25° C. of from 25 to 50 mN/m. Further, it is preferable that the static surface tension at 25° C. is from 30 to 40 mN/m. Where the static surface tension of the ink exceeds 50 mN/m, printing quality remarkably deteriorates, such as decrease in discharge stability, generation of bleeding when mixing colors, generation of whiskers (for example, where black characters are printed on cyan solid, bleeding in a string form may generate from the black characters). Further, where the static surface tension of the ink is lower than 25 mN/m, there is the possibility that an ink adheres to a hard surface when discharging, and printing becomes poor.

A capillary rising method, a dropping method, a hanging ring method, and the like are known as the measurement method of static surface tension. In the invention, a vertical plate method is used as the measurement method of static surface tension. The theory of the vertical plate method is described below.

When a part of a thin plate of glass of platinum is dipped in a liquid and is vertically hung, a surface tension acts downwardly on the portion that a liquid level and the plate contact. This surface tension can be measured by balancing an upward force hanging the plate.

A dynamic surface tension at 25° C. of the ink used in the invention is preferably from 25 to 50 mN/m, and more preferably from 30 to 40 mN/m. Where the dynamic surface tension of the ink exceeds 50 mN/m, printing quality remarkably deteriorates, such as decrease in discharge stability, generation of bleeding when mixing colors, generation of whiskers. Further, where the dynamic surface tension of the ink is lower than 25 mN/m, there is the possibility that an ink adheres to a hard surface when discharging, and printing becomes poor.

A vibration jet method, a meniscas dropping method, a maximum bubble pressure method and the like as described in, for example, *New Experimental Chemistry Course*, Vol. 18, Interface and Colloid, pages 69-90 (1977), Maruzen Co., are known as the measurement method of dynamic surface tension. Further, a liquid film destructive method as described in JP-A-3-2064 is also known. In the invention, a bubble pressure differential method is used as the measurement of dynamic surface tension. The measurement theory and method are described below.

A solution having a surfactant added thereto is stirred to form a uniform solution. When bubbles are formed in the solution, fresh gas-liquid interface is formed, and surfactant molecules in the solution are concentrated on the surface of water at a constant rate. When bubble rate (formation rate of bubbles) is varied, if the formation rate is slow, many surfactants are concentrated on the surface of bubbles. As a result, the maximum bubble pressure just before bursting bubbles becomes small, and the maximum bubble pressure (surface tension) to the bubble rate can be detected. In the measurement method of dynamic surface tension in the invention, bubbles are formed in a solution using large and small two probes, pressure difference in the maximum bubble pressure state between the two probes is measured, and a dynamic surface tension is calculated.

The static surface tension and the dynamic surface tension can be adjusted by using a surface tension regulator, and can be adjusted to the above ranges.

The surface tension regulator includes nonionic, cationic or anionic surfactants. Examples of the anionic surfactant include fatty acid salts, alkylsulfuric ester salts, alkylarylsulfonic acid salts (for example, alkylbenzenesulfonic acid salt and petroleum sulfonic acid salt), dialkylsulfosucinic acid salts, alkylphosphoric ester salts, naphthalenesulfonic acid formalin condensates, and polyoxyethylenealkylsulfuric ester salts. Examples of the nonionic surfactant include acetylene diols (for example, 2,4,7,9-tetramethyl-5-decin-4,7-diol), polyoxyethylenealkyl ethers (for example, polyoxyethylenedecyl ether, and ethylene oxide adduct of acetylene diol), polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymers. Of those, the nonionic surfactant represented by the general formula (I), (II) or (III), which is described as being preferable to use in combination with the magenta dye of the general formula (I), particularly the nonionic surfactant represented by the general formula (I) or (II), is preferable as the surface tension regulator for the purpose of adjusting the static surface tension and the dynamic surface tension.

Further, an amine oxide type ampholytic surfactant such as N,N-dimethyl-alkylamine oxide is preferable. Further, the compounds described as the surfactant in JP-A-59-157636, pages (37) to (38), and Research Disclosure No. 308119 (1989) can also be used.

From that precipitation from an ink and separation are difficult to occur, and foamability is small, anionic surfactants in which a hydrophobic site is two chains or the hydrophobic site is branched, anionic or nonionic surfactants having hydrophilic groups in the vicinity of the center of a hydrophobic site, and nonionic surfactants in which a hydrophobic site is two chains or the hydrophobic site is branched (the example is the nonionic surfactant represented by the general formula (II) or (III)) are preferable.

For this purpose, the content of the surfactant is from 0.001 to 15 mass %, preferably from 0.005 to 10 mass %, and more preferably from 0.01 to 5 mass %.

It is preferable that the ink of the invention has electroconductivity measured at 25° C. in a range of from 0.01 to 10 S/m. The particularly preferable range is that the electroconductivity is in a range of from 0.05 to 5 S/m.

The electroconductivity can be measured by an electrode method using the commercially available saturated potassium chloride.

The electrodonductivity can be controlled by an ion concentration in an aqueous solution. Where a salt concentration is high, desalting can be made using an ultrafiltration membrane. Further, where the electroconductivity is adjusted by adding a salt or the like, it can be adjusted by adding various organic salts or inorganic salts.

Examples of the inorganic salt that can be used include inorganic compounds such as a potassium halide, a sodium halide, sodium sulfate, potassium sulfate, sodium hydrogensulfate, potassium hydrogensulfate, sodium nitrate, potassium nitrate, sodium hydroghencarbonate, potassium hydrogencarbonate, sodium phosphate, sodium monohydrogenphosphate, boric acid, potassium dihydrogenphosphate, and sodium dihydrogenphosphate, and organic compounds such as sodium acetate, potassium acetate, potassium tartrate, sodium tartrate, sodium benzoate, potassium benzoate, sodium p-tluenesulphonate, potassium saccharate, potassium phthalate, and sodium picolinate.

Further, the electroconductivity can be adjusted by selecting an aqueous medium components described hereinafter.

It is preferable that the ink of the invention has a rate of change of viscosity at 10° C. to viscosity at 25° C. is 250% or less, and a rate of change of surface tension at 10° C. to surface tension at 25° C. is 130% or less. Where the rate of change of viscosity exceeds 250% or the rate of change of surface tension exceeds 130%, the discharge stability markedly deteriorates. To obtain stable discharge performance under various environments, it is very important that variation of physical properties is small as possible. In particular, viscosity and surface tension should severely be controlled.

The rate of change of viscosity at 10° C. to viscosity at 25° C. is more preferably 200% or less, and further preferably 190% or less, and the rate of change of surface tension at 10° C. to surface tension at 25° C. is more preferably 125% or less, and further preferably 120% or less.

In the invention, the rate of change of viscosity at 10° C. to viscosity at 25° C. and the rate of change of surface tension at 10° C. to surface tension at 25° C. are calculated by the following equations.

Rate of change of viscosity at 10° C. to viscosity at 25° C. (%)=(Viscosity at 10° C.)/(Viscosity at 25° C.)×100

Rate of change of surface tension at 110° C. to surface tension at 25° C. (%)=(Surface tension at 10° C.)/(Surface tension at 25° C.)×100

An image obtained using the ink for ink-jet recording containing the magenta dye according to the invention and having the above described composition and ink properties suppresses bleeding of ink to low level. In the typical embodiment of the invention, bleeding to an image receiving material having an image receiving layer containing white inorganic pigment particles, on a support is a level that cannot visually be detected in a distance of distinct vision. Further, to an image receiving material having a gelatin-containing hard layer as an image recording layer, the bleeding is in a level that cannot visually be detected in a distance of distinct vision. In particular, where stored under high humidity and high temperature, a picture drawn by the magenta ink according to the invention has excellent resistance to bleeding.

The cause of bleeding relates to various factors such as the content and kind of auxiliary solvents added to adjust physical properties of ink and prevent ink from drying (for example, glycerin, diethylene glycol, triethylene glycol monobutyl ether), the amount of residual solvent, image structure, and overlapping condition of secondary colors (red and blue). To improve bleeding in ink formulation, it is effective to decrease the amount of auxiliary solvents used and optimize the surface tension of ink (from 30 to 37 mN/m; and preferably from 30 to 35 mN/m), other than selection of the dye.

The degree of bleeding varies depending on the image receiving paper, but the ink of the invention has the characteristic that even if the kind of image receiving paper is changed, the bleeding does not occur. To improve bleeding by ink formulation, it is preferable to use a dye having low solubility of a dye therein. In the case of the dye of the general formula (1), it is preferable to use, for example, glycerin or PFG (propylene glycol monopropyl ether). An alternative method for improving bleeding is to strengthen a mordanting force, and an anchor compound for mordanting is introduced. Specifically, mutual action of a mordant and a dye is strengthened by using the betaine dye.

The preparation method of the ink for ink jet is described in detail in, for example, JP-A-5-148436, 5-295312, 7-97541, 7-82515 and 7-118584, and such a preparation method can be utilized in the preparation of the ink for ink-jet recording of the invention.

Recording papers and recording films drown by the ink of the invention are described below. The invention can use conventional materials to be recorded, that is, plain papers, resin-coated papers, ink-jet-only papers described in, for example, JP-A-8-169172, 8-27693, 2-276670, 7-276789, 9-323475, 62-238783, 10-153989, 10-217597, and 10-337947, films, electrophotographic shared papers, fabrics, glasses, metals, and pottery.

Recording papers and recording films used to conduct ink-jet printing using the ink of the invention are described below. A support in the recording paper and recording film comprises a chemical pulp such as LBKP and NBKP; a mechanical pulp such as GP, PGW, RMP, TMP, CTMP, CMP, and CGP; a recycled pulp such as DIP, or the like. If necessary, additives such as the conventional pigments, binders, sizing agents, fixing agents, cationizing agents, and paper strength reinforcing agents can be added, and supports produced by various apparatuses such as a fourdrinier and a cylinder paper machine can be used. Other than those supports, the support can be any of plastic films and sheets, and it is desirable that the thickness is from 10 to 250 μm, and the weight is from 10 to 250 g/m$^2$.

An image receiving layer and a back coat layer are formed on the support, and the thus-treated support may directly be used as the image receiving material of the ink of the invention, or after providing a size press or an anchor coat layer with a polyvinyl alcohol or the like, an image receiving layer and a back coat layer may be provided to form an image receiving material. Further, the support may be subjected to a flattening treatment with a calendar device such as a machine calendar, a TG calendar, and a soft calendar.

In the invention, papers and plastic films, both sides of which being laminated with a polyolefin (for example, polyethylene, polystyrene, polybutene and their copolymers) or polyethylene terephthalate, are more preferably used as the support. It is preferable that white pigments (for example, titanium oxide and zinc oxide) or tinting dyes (for example, cobalt blue, ultramarine blue, and neodymium oxide) are added to the polyolefin.

The image receiving layer provided on the support is described below. The image receiving layer contains porous materials or aqueous binders. Further, it is preferable for the image receiving layer to contain pigments. White pigments are preferable as the pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic pigments such as styrene pigments, acrylic pigments, urea resins and melamine resins. Porous inorganic pigments are particularly preferable, and in particular, a synthetic amorphous silica having a large pore area is preferable. The synthetic amorphous silica can use either of silicic anhydride obtained by a dry production process (gas phase process) and aqueous silicic acid obtained by a wet production process.

As the recording paper contain the above pigment in the image receiving layer, specifically, materials described in, for example, JP-A-10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314 can be used.

Examples of the aqueous binder contained in the image receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinyl pyrrolidone, polyalkylene oxide, and polyalkylene oxide derivatives; and water-dispersible polymers such as styrene butadiene latex, and acrylic emulsion. Those aqueous binders can be used alone or as mixtures of two or more thereof. In the invention, of those, polyvinyl alcohol and silanol-modified polyvinyl alcohol are particularly preferable from the points of adhesion to the pigment and peeling resistance of the ink receiving layer.

The image receiving layer can contain a mordant, a water resistant additive, a light resistance improver, a gas resistance improver, a surfactant, a hardener and other additives, other than the pigments and aqueous binders.

It is preferable that the mordant added to the image receiving layer is immobilized. To achieve this, a polymer mordant is preferably used from the point of prevention of bleeding.

The polymer mordant is described in, for example, JP-A-48-28315, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236; and U.S. Pat. Nos. 2,484,430, 2,548,564, 3,148,061, 3,309,690, 4,115,124, 4,124,386, 4,193,800, 4,273,853, 4,283,305, and 4,450,224. An image receiving material containing the polymer mordant described in JP-A-1-161236 is particularly preferable. When the polymer mordant described in JP-A-1-161236 is used, an image having excellent image quality without bleeding is obtained, and further light resistance of an image is improved.

A water resistant additive is effective to make the image water resistant. In particular, a cationic resin is desirable as the water resistant additive. Examples of the water resistant additive include polyamidepolyamine epichlorohydrin, polyethylene imine, polyamine sulfone, dimethyldiallylammonium chloride polymerer substance, and cationic polyacrylamide. The content of those cationic resin is preferably from 1 to 15 mass %, and particularly from 3 to 10 mass %, to the whole solid content of the ink receiving layer.

Examples of the light resistance improver and gas resistance improver include a phenol compound, a hindered phenolic compound, a thioether compound, a thiourea compound, a thiocyanic acid compound, an amine compound, a hindered amine compound, a TEMPO compound, a hydrazine compound, a hydrazide compound, an amine compound, a vinyl group-containing compound, an ester compound, an amide compound, an ether compound, an alcohol compound, a sulfinic acid compound, sugars, a water-soluble reducing compound, an organic acid, an inorganic acid, hydroxyl group-containing compound, a benzotriazole compound, a benzophenone compound, a triazine compound, a heterocyclic compound, a water-soluble metal salt, an organic metal compound, and a metal complex.

Examples of those specific compounds include the compounds described in, for example, JP-A-10-182621, JP-A-2001-260519, JP-A-2000-260519, JP-B-4-34953, JP-B-4-34513, JP-B-4-34512, JP-A-11-170685, JP-A-60-67190, JP-A-7-276808, JP-A-2000-94829, JP-T-8-512190, and JP-A-11-321090.

The surfactant functions as a coating aid, a peeling improver, a slip improver or an antistatic agent. The surfactant is described in, for example, JP-A-62-173463 and 62-183457.

An organofluoro compound may be used in place of the surfactant. It is preferable that the organofluoro compound is hydrophobic. Examples of the organofluoro compound include fluorine surfactants, oily fluorine compounds (for example, fluorine oil), and solid fluorine compound resins (for example, ethylene tetrafluoride resin). Materials described in, for example, JP-B-57-9053 (columns 8 to 17), JP-A-61-20994 and JP-A-62-135826.

As a hardener, materials described in, for example, JP-A-10-119423 and JP-A-2001-310547 can be used.

Other additives added to the image receiving layer include a pigment dispersant, a thickener, a defoaming agent, a dye, a fluorescent brightener, a preservative, a pH regulator, a matt agent, a hardener, and the like. The ink receiving layer may be a single layer or two layers.

A back coat layer may be formed on the recoding paper and the recording film. Examples of the component that can be added to this layer include a white pigment, an aqueous binder and other components.

Examples of the white pigment containing the back coat layer include white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseuboehmite, aluminum hydroxide, alumina, lithopone, zeolite, hydrolytic halloysite, magnesium carbonate, and magnesium hydroxide; and organic pigments such as a styrenic plastic pigment, an acrylic plastic pigment, a polyethylene, a microcapsule, an urea resin, and a melamine resin.

Examples of the aqueous binder contained in the back coat layer include water-soluble polymers such as a styrene/maleic acid salt copolymer, a styrene/acrylic acid salt copolymer, a polyvinyl alcohol, a silanol-modified polyvinyl alcohol, a starch, a cationized starch, casein, gelatin, carboxymethyl cellulose, hydroxyethyl cellulose, and polyvinyl pyrrolidone; and water-dispersible polymers such as a styrene butadiene latex, and an acrylic emulsion. Examples of other component contained in the back coat layer include a defoaming agent, a foam inhibitor, a dye, a fluorescent brightener, a preservative, and a water resistant additive.

A fine polymer particle-dispersed material may be added to structural layers (including the back coat layer) of the ink-jet recording papers and recording films. The fine polymer particle-dispersed material is used for the purpose of improving film properties such as dimensional stabilization, curl prevention, adhesion prevention, and film breakage prevention. The fine polymer particle-dispersed material is described in, for example, JP-A-62-245258, 62-1316648, and 62-110066. When the fine polymer particle-dispersed material having a low glass transition temperature (40° C. or lower) is added to a layer containing the mordant, the layer can be prevented from breakage or curling. Further, even when the fine polymer particle-dispersed material having a high glass transition temperature is to the back coat layer, curling can be prevented.

The ink-set of the invention includes the aforesaid ink as magenta ink. In addition, an ink that has another color (yellow and cyan) except for magenta is not restricted and is capable of applying an ink known in public.

The ink-jet recording method applied to the ink of the invention is not particularly limited, and the conventional methods such as a charge control method in which an ink is discharged utilizing static attraction, a drop-on-demand method in which vibration pressure of a piezoelectric element is utilized (pressure pulse method), an acoustic ink-jet method in which an electric signal is changed acoustic beam, an ink is irradiated with the acoustic beam, and thus irradiation pressure is utilized, a thermal ink-jet (bubble jet) method in which an ink is heated to form gas bubbles, and pressure thus generated is utilized, and the like are used.

The ink-jet recording method includes a method of ejecting many inks having a low concentration called a photoink in a small volume, a method of improving an image quality using a plurality of inks having substantially the same hue, but having different density, and a method of using a colorless and transparent ink.

EXAMPLES

The present invention is specifically described based on the Examples, but the invention is not limited to those Examples in any way.

Example 1

150 cc of ultrapure water (specific resistance value: 18 MΩ or higher) was added to 17.5 g of a magenta dye (M–1), and the dye was dissolved under stirring for 10 minutes while applying sound wave vibration using a ultrasonic washing machine (2510J-DTH Model, a product of BRANSON, 42 kHz, 125W). The following components were added to the dye solution, and deionized water added to make 1 liter. The resulting solution was mixed under stirring for 1 hour while heating at 30 to 40° C. The solution was filtered with a microfilter having an average pore diameter of 0.25 μm under reduced pressure to prepare an ink liquid for light magenta (LM-101).

| | |
|---|---|
| Glycerin (GR) | 102 g/l |
| Triethylene glycol (TEG) | 19 g/l |
| Triethylene glycol monobutyl ether (TGB) | 104 g/l |
| 1,2-Hexanediol | 12 g/l |
| 2-Pyrrolidone | 11 g/l |
| Triethanolamine (TEA) | 2.0 g/l |
| Benzotriazole | 0.08 g/l |
| 1,2-benzoisothiazolin-3-one (PROXEL XL2) | 1.0 g/l |

500 cc of ultrapure water (specific resistance value: 18 MΩ or higher) was added to 68.0 g of a magenta dye (M-1), and the dye was dissolved under stirring for 10 minutes while applying sound wave vibration using the ultrasonic washing machine. The following components were added to the dye solution, and deionized water added to make 1 liter. The resulting solution was mixed under stirring for 1 hour while heating at 30 to 40° C. The solution was filtered with a microfilter having an average pore diameter of 0.25 μm under reduced pressure to prepare an ink liquid for magenta (M-101).

| | |
|---|---|
| Glycerin (GR) | 120 g/l |
| Triethylene glycol (TEG) | 101 g/l |
| Triethylene glycol monobutyl ether (TGB) | 113 g/l |
| 2-Pyrrolidone | 33 g/l |
| Triethanolamine (TEA) | 2.0 g/l |
| Benzotriazole | 0.08 g/l |
| 1,2-benzoisothiazolin-3-one (PROXEL XL2) | 1.0 g/l |

Inks LM-102 to 122 and M-102 to 122 having the same composition were prepared except that with respect LM-101 and M-101, the kind of dye was changed or a surfactant was added as shown in Table 3.

TABLE 3

| Ink | Dye | Surfactant | |
|---|---|---|---|
| LM-101, M-101 (Comparison) | M-1 | None | |
| LM-102, M-102 (Comparison) | M-2 | None | |
| LM-103, M-103 (Comparison) | M-3 | None | |
| LM-104, M-104 (Comparison) | M-4 | X-3 | 10 g/l |
| LM-105, M-105 (Comparison) | M-4 | W5-4 | 10 g/l |
| LM-106, M-106 (Comparison) | M-5 | X-3 | 10 g/l |
| LM-107, M-107 (Comparison) | M-5 | W5-4 | 10 g/l |
| LM-108, M-108 (Comparison) | M-6 | X-3 | 10 g/l |
| LM-109, M-109 (Comparison) | M-5 | W5-4 | 10 g/l |
| LM-110, M-110 (Invention) | M-1 | W-1 | 10 g/l |
| LM-111, M-111 (Invention) | M-1 | W-12 | 10 g/l |
| LM-112, M-112 (Invention) | M-1 | X-1 | 10 g/l |
| LM-113, M-113 (Invention) | M-1 | X-3 | 10 g/l |
| LM-114, M-114 (Invention) | M-2 | X-3 | 10 g/l |
| LM-115, M-115 (Invention) | M-3 | X-3 | 10 g/l |
| LM-116, M-116 (Invention) | M-1 | X-9 | 10 g/l |
| LM-117, M-117 (Invention) | M-1 | W1-18 | 10 g/l |
| LM-118, M-118 (Invention) | M-1 | W2-18 | 10 g/l |
| LM-119, M-119 (Invention) | M-1 | W5-4 | 10 g/l |
| LM-120, M-120 (Invention) | M-1 | X-3 &W5-4 | 10 g/l & 5 g/l |
| LM-121, M-121 (Invention) | M-1/M-5 = 2/1 | X-3 | 10 g/l |
| LM-122, M-122 (Invention) | M-1/M-6 = 2/1 | X-3 | 10 g/l |

M-1

M-2

-continued

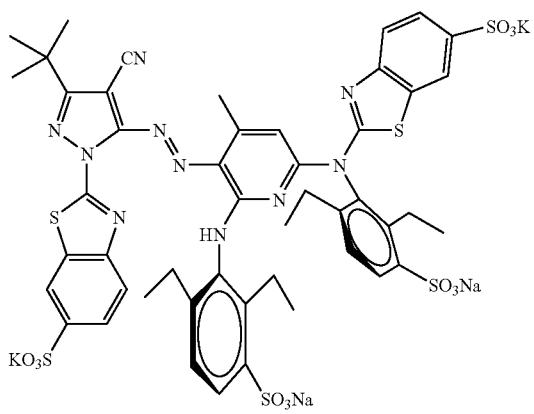
M-3

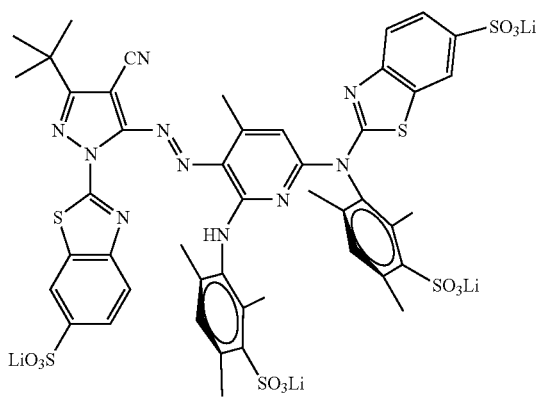
M-4

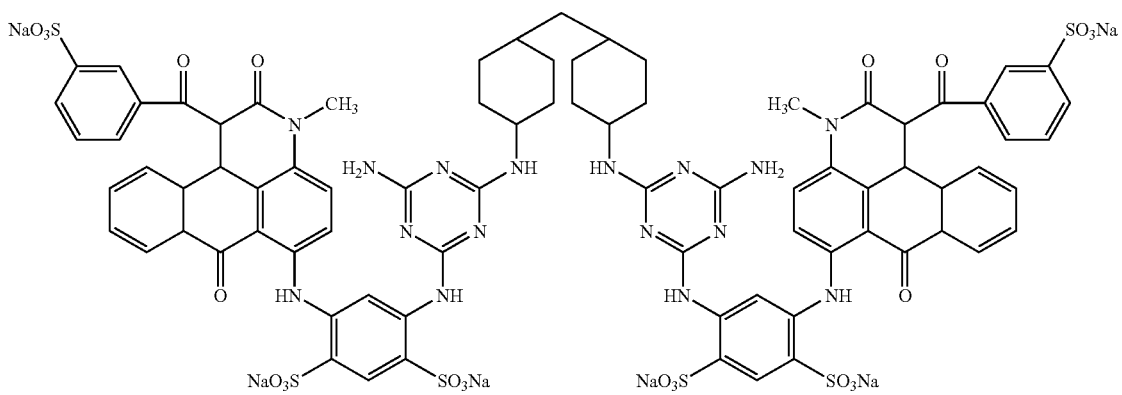
M-5

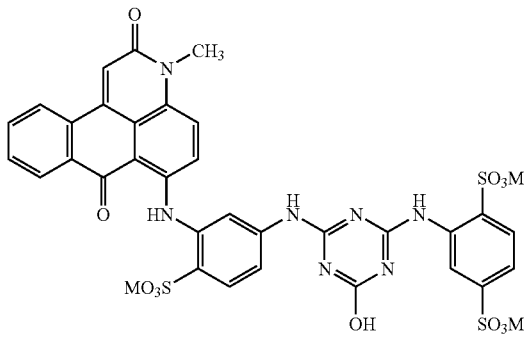
M-6

Viscosity of those inks was measured with vibration type M-100A-L Model (a product of Yamaichi Electronics Co.). Static surface tension was measured with an automatic surface-tension balance CBVP-A3 Model (a product of Kyowa Interface Science Co.). Viscosity and surface tension of LM-101 to 122 and M-101 to 122 measured at 25° C. are shown in Table 4.

TABLE 4

| | Viscosity (mPa·s) | | Surface tension (mN/m) | |
|---|---|---|---|---|
| | LM | M | LM | L |
| LM-101, M-101 (Comparison) | 4.2 | 4.4 | 40.2 | 40.4 |
| LM-102, M-102 (Comparison) | 4.3 | 4.3 | 41.2 | 40.9 |
| LM-103, M-103 (Comparison) | 4.2 | 4.4 | 40.7 | 40.5 |
| LM-104, M-104 (Comparison) | 4.8 | 5.3 | 34.2 | 34.3 |
| LM-105, M-105 (Comparison) | 4.4 | 4.7 | 32.7 | 32.8 |
| LM-106, M-106 (Comparison) | 4.6 | 5.4 | 34.4 | 34.5 |
| LM-107, M-107 (Comparison) | 4.3 | 4.4 | 33.0 | 32.8 |
| LM-108, M-108 (Comparison) | 4.7 | 5.4 | 33.7 | 33.9 |
| LM-109, M-109 (Comparison) | 4.3 | 4.4 | 33.0 | 32.8 |
| LM-110, M-110 (Invention) | 4.5 | 5.7 | 33.6 | 32.9 |
| LM-111, M-111 (Invention) | 4.6 | 5.5 | 33.0 | 32.8 |
| LM-112, M-112 (Invention) | 4.6 | 5.4 | 32.8 | 33.0 |
| LM-113, M-113 (Invention) | 4.5 | 5.6 | 32.6 | 33.1 |

TABLE 4-continued

|  | Viscosity (mPa·s) | | Surface tension (mN/m) | |
| --- | --- | --- | --- | --- |
|  | LM | M | LM | L |
| LM-114, M-114 (Invention) | 4.7 | 5.6 | 32.7 | 32.8 |
| LM-115, M-115 (Invention) | 4.6 | 5.7 | 32.7 | 32.9 |
| LM-116, M-116 (Invention) | 4.5 | 5.7 | 32.8 | 32.8 |
| LM-117, M-117 (Invention) | 4.2 | 4.7 | 34.2 | 34.0 |
| LM-118, M-118 (Invention) | 4.3 | 4.4 | 33.9 | 34.0 |
| LM-119, M-119 (Invention) | 4.3 | 4.5 | 34.1 | 34.1 |
| LM-120, M-120 (Invention) | 4.8 | 5.7 | 32.6 | 32.9 |
| LM-121, M-121 (Invention) | 4.5 | 5.5 | 33.2 | 33.5 |
| LM-122, M-122 (Invention) | 4.6 | 5.5 | 32.9 | 33.4 |

LM-101 to 122 and the corresponding M-101 to 122 were combined to prepare ink sets 101 to 122, respectively. Those ink sets 101 to 122 were charged in light magenta and magenta cartridges of an ink-jet printer PM-G800 (Seiko Epson Corporation). In this operation, the step of from dissolution of a dye to ink charging were carried out in a space having cleanness of 1,000 or lower using a clean bench.

The ink cartridge prepared was mounted on PM-G800 printer, and an image was printed on an ink-jet paper "Gasai", glossy finish, a product of Fuji Photo Film Co., with only light magenta and magenta inks. The following evaluation was made.

1) With respect to discharge stability, a cartridge was set in a printer. After confirming discharging state of ink from all nozzles, 20 papers (A4 size) were output, and evaluated by the following criteria.

A: No turbulent printing from initiation of printing to completion thereof.

B: Output having turbulent printing occurs.

C: Turbulent printing from initiation of printing to completion thereof.

2) With respect to bleeding of thin lines, thin line pattern of magenta was printed, and the printing was visually evaluated.

A: No observation of bleeding

B: Slight bleeding is observed, but the printing is legible.

C: Illegible due to bleeding.

3) With respect to water resistance, the image obtained was immersed in deionized water for 10 seconds, and bleeding of image was evaluated.

4) With respect to image storage stability, a printing sample of a solid image was prepared, and the following evaluation was made.

(a) With respect to light fastness, image density (represented by Ci) just after printing was measured with a reflection densitometer (X-Rite 310 TR), and the image was irradiated with xenon light (85,000 lux) using Weather-O-Meter, a product of Atlas, for 10 days. The image density (represented by Cf) was again measured to obtain a dye residual ratio (100×Cf/Ci), and evaluation was made. With respect to the image residual ratio, evaluation was made at three points of 1, 1.5 and 2. When the image residual ratio was 70% or higher at any density, it was evaluated as A, when the image residual ratio is less than 70% at two points, it was evaluated as B, and when the image residual ratio was less than 70% at any density, it was evaluated as C.

(b) With respect to ozone ($O_3$) resistance, a gloss photo paper having the image formed thereon was placed in a box having an ozone gas concentration of 5.0 ppm, and allowed to stand for 7 days. The image density before and after allowing to stand in an ozone gas was measured with a reflection densitometer (X-Rite 310 TR), and was evaluated as a dyestuff residual ratio. The reflection density was measured at three points of 1, 1.5 and 2. Ozone gas concentration in the box was set using an ozone gas monitor (Model: OZG-EM-01, a product of Applics).

Evaluation was made in three grades such that when the dye residual ratio was 80% or higher at any density, it was evaluated as A, when the dye residual ratio is less than 80% at two points, it was evaluated as B, and when the dye residual ratio was less than 80% at any density, it was evaluated as C.

The results obtained are shown in Table 5.

TABLE 5

| Ink set | Dye | Surfactant | Discharge stability | Light fastness | Ozone resistance | Water resistance | Bleeding of thin line | Remarks |
| --- | --- | --- | --- | --- | --- | --- | --- | --- |
| 101 | M-1 | None | B | A | A | B | B | Comparison |
| 102 | M-2 | None | B | A | A | B | B | Comparison |
| 103 | M-3 | None | B | A | A | B | B | Comparison |
| 104 | M-4 | X-3 | A | B | B | A | A | Comparison |
| 105 | M-4 | W5-4 | A | B | B | B | B | Comparison |
| 106 | M-5 | X-3 | A | A | B | C | A | Comparison |
| 107 | M-5 | W5-4 | A | A | B | C | A | Comparison |
| 108 | M-6 | X-3 | A | C | B | C | B | Comparison |
| 109 | M-6 | W5-4 | A | C | B | C | B | Comparison |
| 110 | M-1 | W-1 | A | A | A | A | A | Invention |
| 111 | M-1 | W-12 | A | A | A | A | A | Invention |
| 112 | M-1 | X-1 | A | A | A | A | A | Invention |
| 113 | M-1 | X-3 | A | A | A | A | A | Invention |
| 114 | M-2 | X-3 | A | A | A | A | A | Invention |
| 115 | M-3 | X-3 | A | A | A | A | A | Invention |
| 116 | M-1 | X-9 | A | A | A | A | A | Invention |
| 117 | M-1 | W1-18 | A | A | A | A | A | Invention |
| 118 | M-1 | W2-18 | A | A | A | A | A | Invention |
| 119 | M-1 | W5-4 | A | A | A | A | A | Invention |
| 120 | M-1 | X-3 &W5-4 | A | A | A | A | A | Invention |
| 121 | M-1/M-5 = 2/1 | X-3 | A | A | A | B | A | Invention |
| 122 | M-1/M-6 = 2/1 | X-3 | A | B | A | B | A | Invention |

It is seen from Table 5 that in the ink sets (110 to 122) using the dye and surfactant of the invention, an image having excellent discharge stability and water resistance, and having no bleeding is obtained, and weatherability (light fastness and ozone resistance) are particularly excellent.

Further, even when the image receiving paper used in the invention is replaced with a photographic paper, a product of Seiko Epson Corporation, and PR101, a product of Canon Co., the same effect as in the above effect is obtained.

Example 2

The same ink set prepared in Example 1 was charged in a cartridge of a ink-jet printer Pixus 8600i (a product of Canon Co.), and an image was printed on an ink-jet paper "Gasai", photograph finish, a product of Fuji Photo Film Co., using the printer. The evaluation as in Example 1 was made. As a result, the same result as in Example 1 was obtained. Further, even when the image receiving paper was a photographic paper, a product of Seiko Epson Corporation, PR101, a product of Canon Co., and a photo paper (premium plus (glossy)), a product of Hewlett-Packard, the same effect was obtained.

Example 3

(Preparation of Each Ink Composition)

Each component was mixed based on the formulation shown in Tables 6, 7 and 8 below, and stirred at room temperature for 30 minutes. The solution obtained was filtered using a membrane filter having an opening of 1.0 μm to obtain each ink composition. In Tables 6, 7 and 8, the numerical value in each component shows mass % of each component when the mass of an ink composition is 100%. The term "remainder" showing the amount of water shows the amount that the sum of water and components other than water is 100%.

TABLE 7

|  | LC-1 | LC-2 | LC-3 | LC-4 | LC-5 |
|---|---|---|---|---|---|
| CYAN-1 | 1.7 |  |  |  |  |
| CYAN-2 |  | 1.7 |  |  |  |
| CYAN-3 |  |  | 1.7 |  |  |
| CYAN-4 |  |  |  | 1.7 |  |
| CYAN-5 |  |  |  |  | 1.5 |
| Glycwrin | 11 | 11 | 11 | 11 | 11 |
| Triethylene glycol | 4.5 | 4.5 | 2 | 4.5 | 3.5 |
| Propylene glycol |  |  | 2.5 |  | 1.0 |
| TEGmBE | 10 | 10 | 10 | 10 | 10 |
| Surfinol 465 (*1) | 1 | 1 | 1 | 1 | 1 |
| Urea | 2.5 | 2.5 | 2.5 | 2.5 | 2.5 |
| 1,2-Hexanediol | 3.4 |  | 3.4 | 3.4 | 3.4 |
| 2,5-dimethyl-2,5-Hexanediol |  | 3.4 |  |  |  |
| Triethanolamine | 0.2 | 0.2 | 0.2 | 0.2 | 0.2 |
| Proxel XL2 (*2) | 0.1 | 0.1 | 0.1 | 0.1 | 0.1 |
| Water | Remainder | Remainder | Remainder | Remainder | Remainder |

(*1): Product of Air Products and Chemicals, Inc.
(*2): Product of Avecia
Unit: mass %

TABLE 8

|  | B-1 | B-2 | B-3 | B-4 | B-5 |
|---|---|---|---|---|---|
| Black-1 | 6 |  |  |  |  |
| Black-2 |  | 6 |  |  |  |
| Black-3 |  |  | 6 |  |  |
| Black-4 |  |  |  | 6 |  |
| Black-5 |  |  |  |  | 6 |
| Black-6 (Color correction dye) | 1.5 | 1.2 | 1 | 0.5 |  |
| Glycerin | 10 | 10 | 10 | 10 | 10 |
| Triethylene glycol | 2 | 2 | 2 | 2 | 2 |
| TEGmBE | 8 | 8 | 8 | 8 | 8 |

TABLE 6

|  | Y-1 | Y-2 | Y-3 | Y-4 | Y-5 | C-1 | C-2 | C-3 | C-4 | C-5 |
|---|---|---|---|---|---|---|---|---|---|---|
| YELLOW-1 | 5 |  |  |  |  |  |  |  |  |  |
| YELLOW-2 |  | 5 |  |  |  |  |  |  |  |  |
| YELLOW-3 |  |  | 5 |  |  |  |  |  |  |  |
| YELLOW-4 |  |  |  | 1 |  |  |  |  |  |  |
| YELLOW-5 |  |  |  |  | 1.5 |  |  |  |  |  |
| YELLOW-6 |  |  |  |  | 1.5 |  |  |  |  |  |
| YELLOW-7 |  |  |  |  | 0.5 |  |  |  |  |  |
| CYAN-1 |  |  |  |  |  | 5 | 4.5 | 4 |  |  |
| CYAN-2 |  |  |  |  |  |  | 0.5 | 1 |  |  |
| CYAN-3 |  |  |  |  |  |  |  |  |  |  |
| CYAN-4 |  |  |  |  |  |  |  |  | 5 |  |
| CYAN-5 |  |  |  |  |  |  |  |  |  | 5 |
| Glycerin | 12 | 12 | 12 | 12 | 12 | 12 | 12 | 12 | 12 | 12 |
| Triethylene glycol | 10 | 10 | 10 | 10 | 10 | 11 | 11 | 11 | 11 | 11 |
| Propylene glycol |  |  |  | 3 | 5 |  | 2 |  |  |  |
| TEGmBE | 10 | 10 | 10 | 7 | 5 | 9 | 9 | 9 | 9 | 9 |
| Surfinol 465 (*1) | 1 | 1 | 1 | 1 | 1 | 1 | 1 | 1 | 1 | 1 |
| Urea | 2 | 2 | 2 | 2 | 2 | 2 | 2 | 2 | 2 | 2 |
| 1,2-Hexanediol |  |  | 2 | 3 | 3 | 2 | 2 |  | 2 | 2 |
| 2,5-dimethyl-2,5-hexanediol |  | 2 |  |  |  |  |  | 2 |  |  |
| Triethanolanime | 0.1 | 0.1 | 0.1 | 0.1 | 0.1 | 0.1 | 0.1 | 0.1 | 0.1 | 0.1 |
| 2-Pyrrolidone |  |  |  |  |  | 4 | 4 | 4 | 4 | 4 |
| PROXEL XL2 (*2) | 0.3 | 0.3 | 0.3 | 0.3 | 0.3 | 0.3 | 0.3 | 0.3 | 0.3 | 0.3 |
| Water | Remainder | Remainder | Remainder | Remainder | Remainder | Remainder | Remainder | Remainder | Remainder | Remainder |

(*1): Product of Air Products and Chemicals, Inc
(*2): Product of Avecia
Unit: mass %

TABLE 8-continued
|  | B-1 | B-2 | B-3 | B-4 | B-5 |
|---|---|---|---|---|---|
| Surfinol (*1) | 1 | 1 | 1 | 1 | 1 |
| Urea | 5 | 3 | 3 | 3 | 3 |
| 1,2-hexanediol | 3 | 3 | 3 | 3 | 3 |
| PROXEL (*2) | 0.3 | 0.3 | 0.3 | 0.3 | 0.3 |
TABLE 8-continued
|  | B-1 | B-2 | B-3 | B-4 | B-5 |
|---|---|---|---|---|---|
| Water | Remainder | Remainder | Remainder | Remainder | Remainder |
(*1): Product of Air and Chemicals, Inc.
(*2): Product of Avecia
Unit: mass %
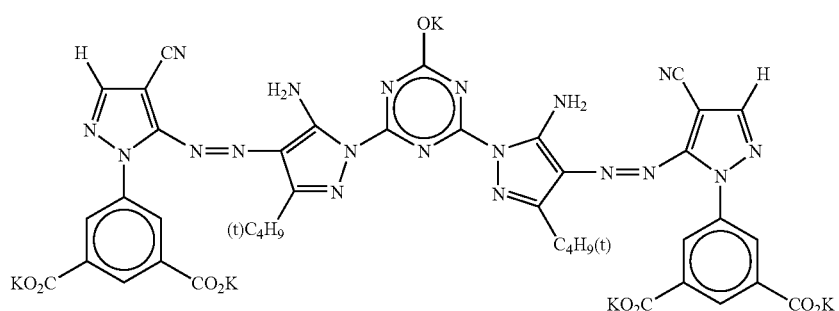
(YELLOW-1)
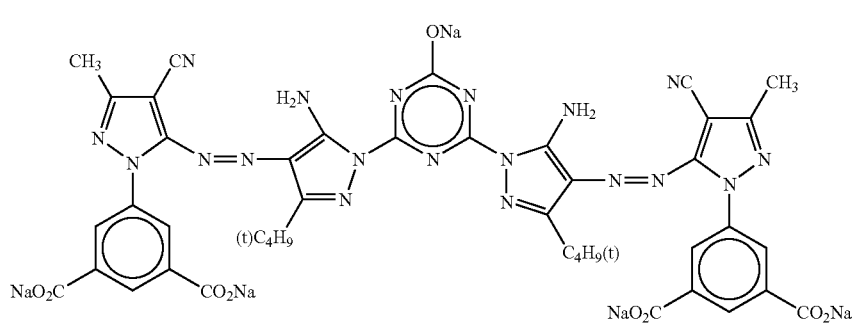
(YELLOW-2)
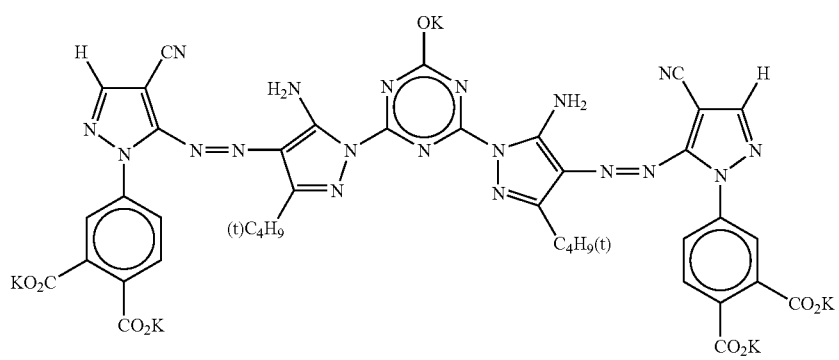
(YELLOW-3)
(YELLOW-1) to (YELLOW-3) can be synthesized by the synthesis method described at paragraphs [0090] to [0094] of EP 1,619,224A.
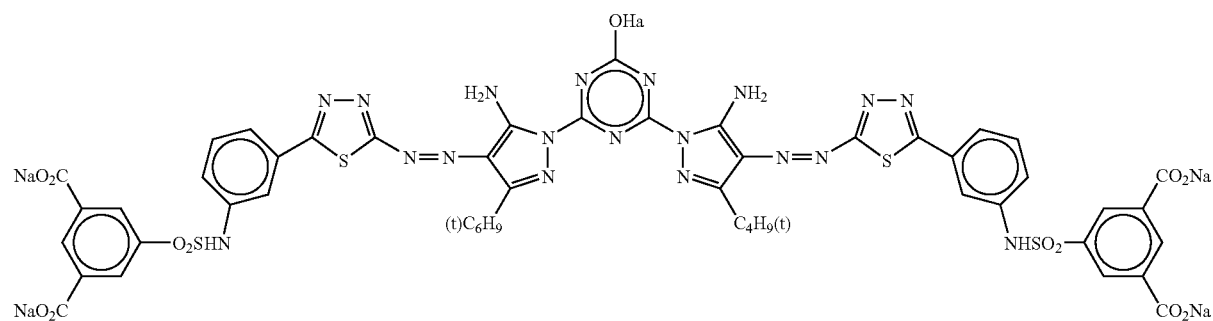

(YELLOW-5): C.I. Direct Yellow 132
(YELLOW-6): C.I. Direct Yellow 86
(YELLOW-7): C.I. Direct Yellow 58

In Tables 6 and 7, the compounds represented by the following (CYAN-1), (CYAN-2), (CYAN-3), (CYAN-5) and (CYAN-5) were used as the cyan dye. In (CYAN-1) to (CYAN-4), the constitution of structure of rings A to D in the chemical formula was shown together with the chemical formula. (CYAN-4) is a mixture of compounds I, II and III that the rings A to D are the different constitution of the structures a, b and c shown in the chemical formula.

(CYAN-1)

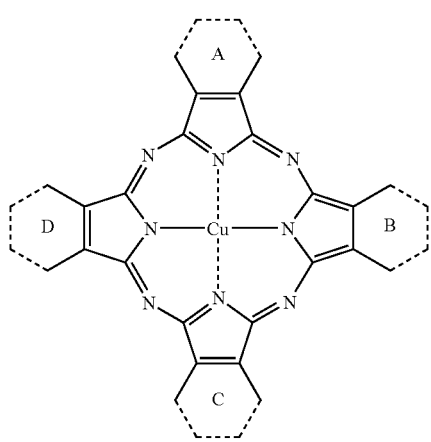

One of rings A to D is

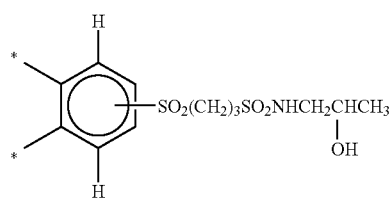

and the remaining three rings are

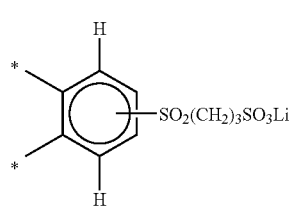

*means a bonding position of a phthalocyanine ring (CYAN-2)

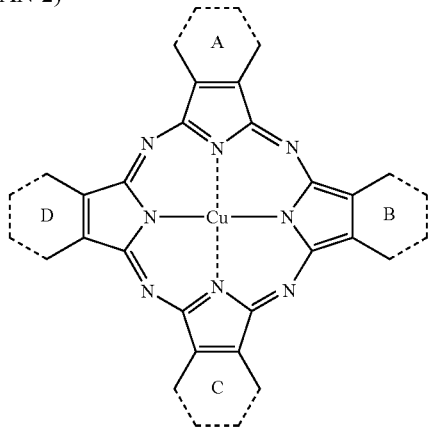

Two of rings A to D are

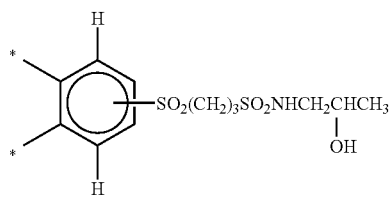

and the remaining two rings are

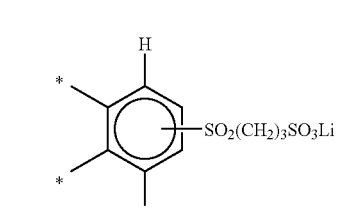

*means a bonding position of a phthalocyanine ring (CYAN-3)

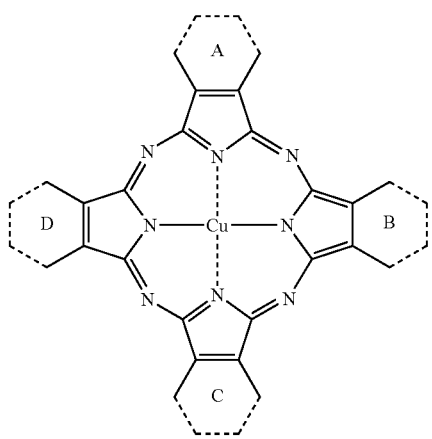

One of rings A to D is
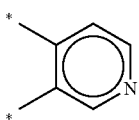
and the remaining three rigs are
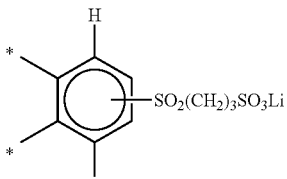
*means a bonding position of a phthalocyanine ring
(CYAN-4)
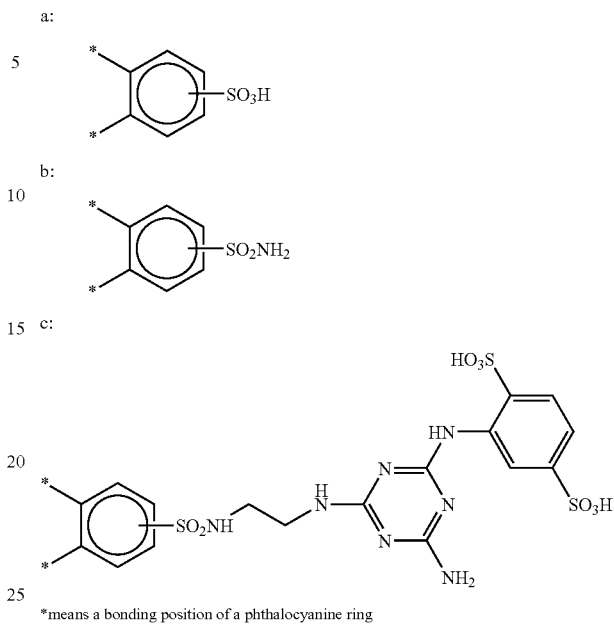
*means a bonding position of a phthalocyanine ring
Mixture of the following compounds I to III
| | |
|---|---|
| $c=0$, $a+b=4$ | I. |
| $c=1$, $a+b=3$ | II. |
| $c=2$, $a+b=2$ | III. |
(CYAN-5): C.I. Direct Blue 199 was used.
(Black-1)
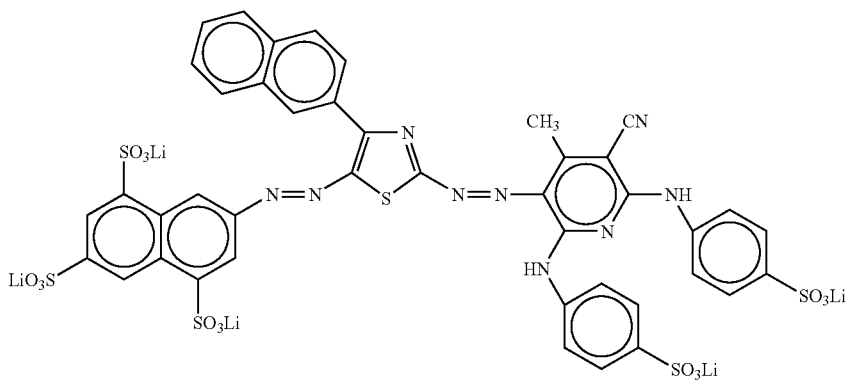

-continued
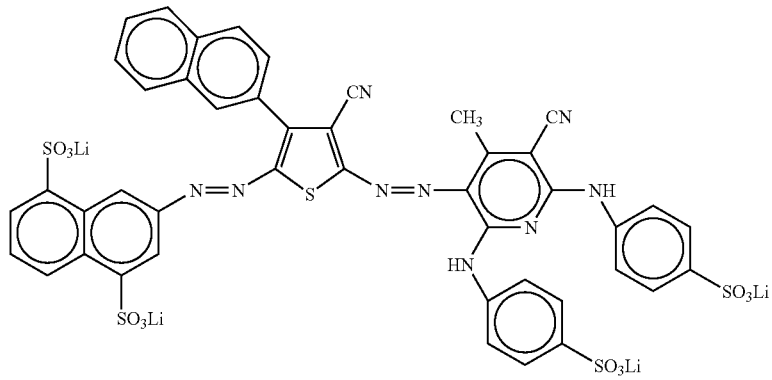
(Black-2)
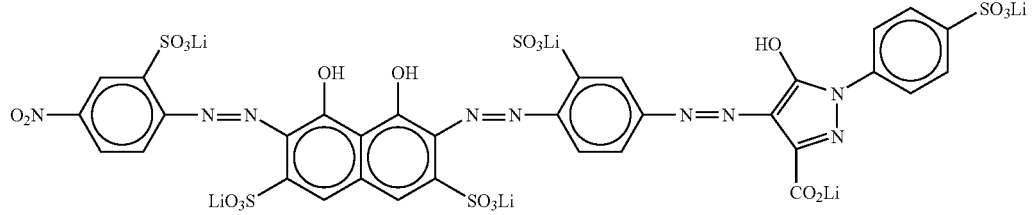
(Black-3)
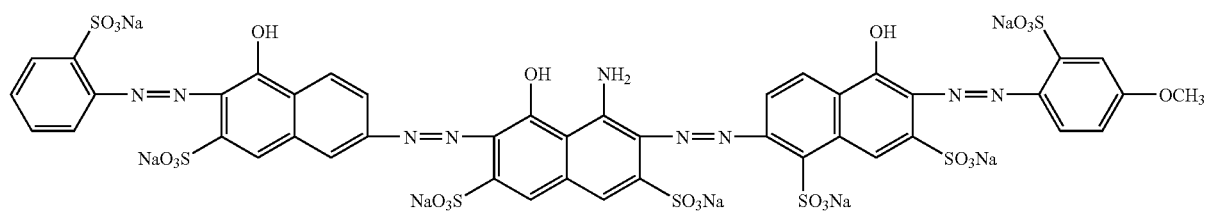
(Black-4)
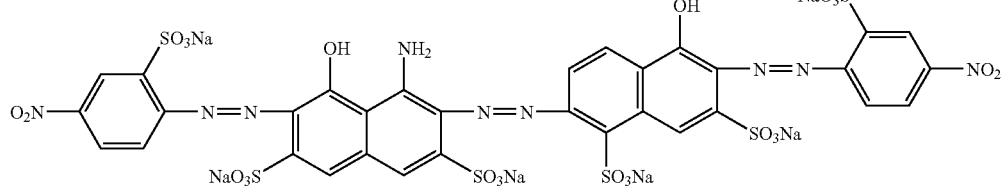
(Black-5)
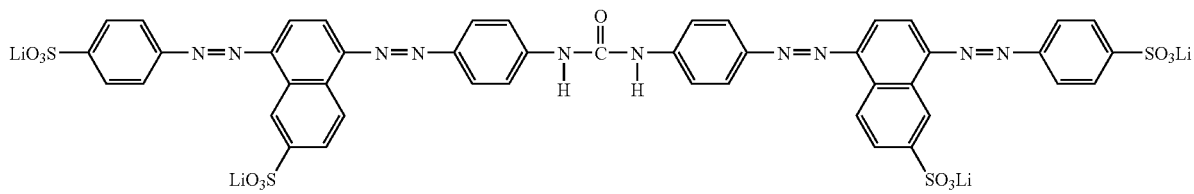
(Black-6)
Each ink set of ink sets 201 to 210 was prepared with a combination shown in Table 9 using each ink composition prepared.
TABLE 9
|  | Yellow | Light magenta | Magenta | Light cyan | Cyan | Black |
|---|---|---|---|---|---|---|
| Ink set 201 | Y-1 | LM-120 | M-120 | LC-1 | C-1 | B-1 |
| Ink set 202 | Y-2 | LM-120 | M-120 | LC-2 | C-2 | B-2 |
| Ink set 203 | Y-3 | LM-120 | M-120 | LC-3 | C-3 | B-3 |
| Ink set 204 | Y-4 | LM-120 | M-120 | LC-4 | C-4 | B-4 |
| Ink set 205 | Y-5 | LM-120 | M-120 | LC-5 | C-5 | B-5 |

TABLE 9-continued

|  | Yellow | Light magenta | Magenta | Light cyan | Cyan | Black |
|---|---|---|---|---|---|---|
| Ink set 206 | ICY32 (Epson) | ICLM32 (Epson) | ICM32 (Epson) | ICLC32 (Epson) | ICC32 (Epson) | ICBk32 (Epson) |
| Ink set 207 (Comparison) | BCI-Y (Canon) | BCI-7PM (Canon) | BCI-7M (Canon) | BCI-7PC (Canon) | BCI-7C (Canon) | BCI-7Bk (Canon) |
| Ink set 208 (Comparison) | Y-1 | LM-105 | M-1 | LC-1 | C-1 | B-1 |
| Ink set 209 (Comparison) | Y-2 | LM-105 | M-2 | LC-2 | C-2 | B-2 |
| Ink set 210 (Comparison) | Y-3 | LM-105 | M-3 | LC-3 | C-3 | B-3 |

Those inks were charged in the corresponding ink cartridges of an ink-jet printer PMG820, a product of Seiko Epson Corporation. In the ink set 6, genuine inks for PMG820 were used as they are, except for magenta and light magenta inks. In ink set 7, inks of each color of BCI-7 that are the inks of Canon Co. were removed, and were charged in cartridges for PMG820. Those ink cartridges were mounted on PMG820, and printing was conducted. The following evaluation was made.

1) Regarding bleeding of thin lines, a thin line pattern was printed on a background of a gray solid image of $D_{vis}$=1.0, and was visually evaluated. ($D_{vis}$ means a visual density based on ISO5).

A: Bleeding is not observed.

B: Bleeding is slightly observed, but legible.

C: Illegible due to bleeding.

2) Regarding light fastness, a gray solid image printed sample was prepared, and the following evaluation was made.

(a) With respect to light fastness, image density Ci ($D_G$) just after printing was measured with a reflection densitometer (X-Rite 310 TR), and the image was irradiated with xenon light (85,000 lux) using Weather-O-Meter, a product of Atlas, for 10 days. The image density Cf ($D_G$) was again measured to obtain a residual ratio (100×Cf/Ci) of the magenta dye in the gray image, and evaluation was made. With respect to the dye residual ratio, evaluation was made at three points of 1, 1.5 and 2 of reflection density. When the dye residual ratio was 70% or higher at any density, it was evaluated as A, when the dye residual ratio is less than 70% at two points, it was evaluated as B, and when the dye residual ratio was less than 70% at any density, it was evaluated as C.

(b) With respect to ozone ($O_3$) resistance, a gloss photo paper having the image formed thereon was placed in a box having an ozone gas concentration of 5.0 ppm, and allowed to stand for 7 days. The image density before and after allowing to stand in an ozone gas was measured with a reflection densitometer (X-Rite 310 TR), and was evaluated as a dyestuff residual ratio as same as in the light fastness. The reflection density was measured at three points of 1, 1.5 and 2. Ozone gas concentration in the box was set using an ozone gas monitor (Model: OZG-EM-01, a product of Applics).

Evaluation was made in three grades such that when the dyestuff residual ratio was 80% or higher at any density, it was evaluated as A, when the dyestuff residual ratio is less than 80% at two points, it was evaluated as B, and when the dyestuff residual ratio was less than 80% at any density, it was evaluated as C.

The results obtained are shown in Table 10.

TABLE 10

|  | Light fastness | Ozone resistance | Bleeding of thin line |
|---|---|---|---|
| Ink set 201 | A | A | A |
| Ink set 202 | A | A | A |
| Ink set 203 | A | A | A |
| Ink set 204 | A | A | A |
| Ink set 205 | A | A | A |
| Ink set 206 | A | A | A |
| Ink set 207 | A | A | A |
| Ink set 208 (Comparison) | B | B | B |
| Ink set 209 (Comparison) | B | B | B |
| Ink set 210 (Comparison) | B | B | B |

It is seen from the results of Table 10 that in the ink sets of the invention, even in full color printing, there is no bleeding of thin lines as same as in the results of Example 1, and weatherability (light fastness and ozone resistance) is excellent.

In Table 9, M120 and LM120 were replaced with the ink of the invention prepared in Example 1, and the same test was conducted. As a result, the same results as in Table 10 were obtained.

Further, even when the image receiving paper used in the invention is replaced with a photographic paper, a product of Seiko Epson Corporation, and PR101, a product of Canon Co., the same effect as in the above effect is obtained.

Example 4

The same ink as prepared in Example 3 was charged in a cartridge of an ink-jet printer Pixus 8660i (a product of Canon Co.), and an image was pprinted on an ink-jet paper "Gasai", photograph finish, a product of Fuji Photo Film Co., suing the printer. The same evaluation as in Example 3 was made. As a result, the same effects as in Example 3 were obtained. Further, even when the image receiving paper was a photo paper, a product of Seiko Epson Corporation, and a premium plus photo paper (gloss), a product of Hewlett-Packard, the same effects were obtained.

The present application claims foreign priority based on Japanese Patent Application (JP 2005-156190) filed May 27, 2005, Japanese Patent Application (JP 2005-306412) filed Oct. 20, 2005, and Japanese Patent Application (JP 2006-053251) filed Feb. 28, 2006, the contents of which is incorporated herein by reference.

What is claimed is:

1. An ink for ink-jet recording, comprising:
at least one azo dye represented by formula (1); and
at least one betaine surfactant,

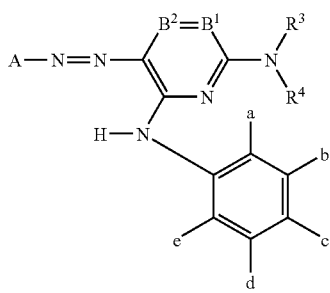

Formula (1)

wherein A represents a five-membered heterocyclic group; $B^1$ and $B^2$ each represent one of —$CR^1$= and —$CR^2$=, or one of $B^1$ and $B^2$ represent nitrogen atom and other represents one of —$CR^1$= and —$CR^2$=; $R^3$ and $R^4$ each independently represent one member selected from the group consisting of a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsufonyl group, and an sulfamoyl group; $R^1$ and $R^2$ each independently represent one member selected from the group consisting of a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group, and a heterocyc lie thio group; $R^1$ and $R^2$ may be combined to form one of a five- membered ring and six-membered ring; $R^3$ and $R^4$ may be combined to form one of a five-membered ring and six-membered ring; a and e each independently represent one of an alkyl group, an alkoxy group and a halogen atom, and in case that both a and e are an alkyl group, the total number of carbon atoms constituting the alkyl group is 3 or more, and a and e may be further substituted; b, c and d each independently is the same as defined in $R^1$ and $R^2$, a and b may be condensed with each other to form a cyclic structure, and e and d may be condensed with each other to form a cyclic structure; the compound represented by the formula (1) has at least one ionic hydrophilic group.

2. The ink for ink-jet recording as claimed in claim 1, wherein the azo dye is represented by formula (2):

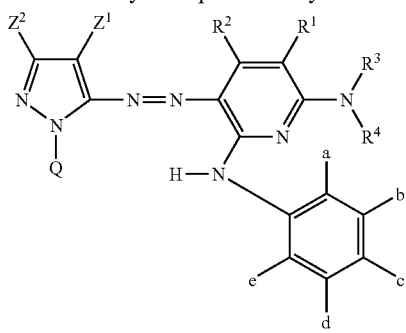

Formula (2)

wherein $Z^1$ represents an electron attractive group having a Hammett's substituent constant, $\sigma_p$ value, of 0.20 or more; $Z^2$ represents one member selected from the group consisting of a hydrogen atom, an aliphatic group, an aromatic group, and a heterocyclic group; $R^1$, $R^2$, $R^3$, $R^4$, a, b, c, d and e each are the same as defined in the formula (1); and Q represents one member selected from the group consisting of a hydrogen atom, an aliphatic group, an aromatic group, and a heterocyclic group; the compound of the formula (2) has at least one ionic hydrophilic group.

3. The ink for ink-jet recording as claimed in claim 1, wherein the betaine surfactant comprises: a cationic site being a quaternary nitrogen atom; and an anionic site being one of a carboxyl group and a sulfo group.

4. The ink for ink-jet recording as claimed in claim 1, wherein the betaine surfactant is one of a first compound having an imidazolium structure, the imidazolium structure substituted one of a carboxyl-containing alkyl group and a sulfo-containing alkyl group on N-position thereof; and a second compound having an ammonium structure, the ammonium structure substituted one of a carboxyl group-containing alkyl group and a sulfo group-containing alkyl group on N-position thereof.

5. The ink for ink-jet recording as claimed in claim 4, wherein the first compound is a compound represented by formula (A):

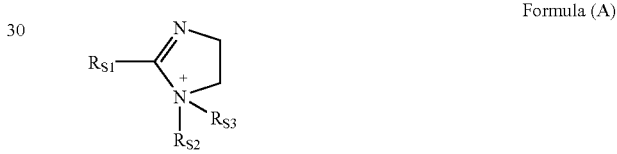

Formula (A)

wherein $R_{S1}$, and $R_{S2}$ each represent an alkyl group, and $R_{S3}$ represents one of a carboxyl-containing alkyl group and a sulfo-containing alkyl group.

6. The ink for ink-jet recording as claimed in claim 4, wherein the second compound is a compound represented by formula (B):

Formula (B)

wherein $R_{S4}$, $R_{S5}$ and $R_{S6}$ each independently represent one member selected from the group consisting of an alkyl group, an aryl group and a heterocyclic group, and may be connected with each other to form a cyclic structure; and $R_{S7}$ represents one of a carboxyl-containing alkyl group and a sulfo-containing alkyl group.

7. The ink for ink-jet recording as claimed in claim 6, wherein $R_{S4}$, $R_{S5}$ and $R_{S6}$ each independently represent an alkyl group, and $R_{17}$ represents —L-COO— in which L represents a linking group.

8. The ink for ink-jet recording as claimed in claim 6, wherein L of substituent $R_{S7}$ represents $CH(R_{S8})$, and $R_{S8}$ represents one of a hydrogen atom and an alkyl group having carbon atoms of 8 or more, and either of $R_{S4}$, $R_{S5}$, $R_{S6}$ and $R_{S8}$ is an alkyl group having carbon atoms of 8 or more.

9. The ink for ink jet recording as claimed in claim 1, wherein the betaine surfactant comprises: at least one of a compound including carboxylic groups of two or more in one molecule thereof, and a salt of the compound.

10. The ink for ink-jet recording as claimed in claim 9, wherein the betaine surfactant is one member selected from the group consisting of an alkyliminodiacetic acid and a salt thereof; an alkylnitriletriacetic acid and a salt thereof; an alkylnitriletriacetic acid and a salt thereof, and an alkyliminotripropionic acid and a salt thereof.

11. The ink for ink-jet recording as claimed in claim 1, wherein the ink further comprises a nonionic surfactant which is a polyoxyethylene compound represented by one of formula (I) and (II):

Formula (I)

wherein $R^{21}$ represents an alkyl group having carbon atoms of 5 to 40, and $m_1$ represents an average addition mole number of ethylene oxide group, and the average addition mole number is from 2 to 40;

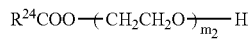

Formula (II)

wherein $R^{24}$ represents an alkyl group having carbon atoms of 5 to 40, and $m_2$ represents an average addition mole number of ethylene oxide group, and the average addition mole number is from 2 to 40.

12. The ink for ink-jet recording as claimed in claim 11, wherein the nonionic surfactant is a compound represented by formula (I-1):

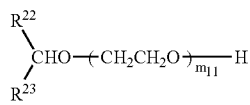

Formula (I-1)

wherein $R^{22}$ and $R^{23}$ each represent a saturated hydrocarbon having carbon atoms of 4 to 10, and the sum of carbon atoms of $R^{22}$ and $R^{23}$ is from 8 to 18, and $m_{11}$ represents an average addition mole number of ethylene oxide group, and the average addition mole number is from 3 to 20.

13. The ink for ink-jet recording as claimed in claim 11, wherein the nonionic surfactant is a compound represented by the following formula (II-1):

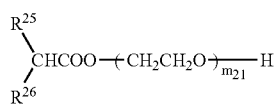

Formula (II-1)

wherein $R^{25}$ and $R^{26}$ each represent a saturated hydrocarbon having carbon atoms of 2 to 20, and $m_{21}$ represents an average addition mole number of ethylene oxide group, and the average addition mole number is from 2 to 40.

14. The ink for ink-jet recording as claimed in claim 1, wherein the ink further comprises a nonionic surfactant which is a compound represented by formula (III):

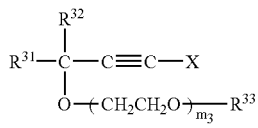

Formula (III)

wherein $R^{31}$ and $R^{32}$ each independently represent an alkyl group having carbon atoms of 1 to 18; $R^{33}$ represents one member selected from the group consisting of a hydrogen atom, an alkyl group having carbon atoms of 1 to 6, and a phenyl group; and X represents a hydrogen atom or

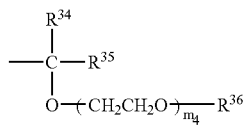

wherein $R^{34}$ and $R^{35}$ each independently represent an alkyl group having carbon atoms of 1 to 18; $R^{36}$ represents one member selected from the group consisting of a hydrogen atom, an alkyl group having carbon atoms of 1 to 6, and phenyl group; $m_3$ and $m_4$ each represent an average addition mole number of ethylene oxide group, and $m_3+m_4$ is from 0 to 100, with proviso that in case that $m_3$ is zero, $R^{33}$ represents a hydrogen atom, and in case that $m_4$ is zero, $R^{36}$ represents a hydrogen atom; and in case that X is a hydrogen atom, $m_3$ is from 0 to 100.

15. The ink for ink-jet recording as claimed in claim 14, wherein the nonionic surfactant is a compound represented by formula (III-1):

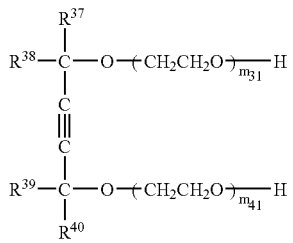

Formula (III-1)

wherein $R^{37}$, $R^{38}$, $R^{39}$ and $R^{40}$ each independently represent an alkyl group having carbon atoms of 1 to 6, and $m_3$, and $m_4$, each represent an average addition mole number of ethylene oxide group, and $m_{31}+m_{41}$ is from 0 to 40.

16. An ink-jet recoding method comprising discharging an ink for ink-jet recording as claimed in claim 1.

17. An ink-jet recoding method comprising discharging a droplet of an ink for ink-jet recording as claimed in claim 1 on a receiver material according to a recording signal, the receiver material comprising a support having an image-receiving layer, the image-receiving layer including a white inorganic pigment particle.

18. An ink set comprising an ink as claimed in claim 1.

* * * * *